(12) United States Patent
Bonney-Ache et al.

(10) Patent No.: US 11,948,473 B2
(45) Date of Patent: Apr. 2, 2024

(54) ASSIGNMENTS FOR CLASSROOMS

(71) Applicant: Dropbox, Inc., San Francisco, CA (US)

(72) Inventors: Kelly Bonney-Ache, San Francisco, CA (US); Ritu Moondra, San Francisco, CA (US); Calvin Low, San Francisco, CA (US); Kristen Witte, Austin, TX (US); David Fish, San Francisco, CA (US); Ian Macartney, San Francisco, CA (US); Ben Stern, New York, NY (US)

(73) Assignee: Dropbox, Inc., San Francisco, CA (US)

( * ) Notice: Subject to any disclaimer, the term of this patent is extended or adjusted under 35 U.S.C. 154(b) by 175 days.

(21) Appl. No.: 16/891,952

(22) Filed: Jun. 3, 2020

(65) Prior Publication Data

US 2020/0294412 A1 Sep. 17, 2020

Related U.S. Application Data

(63) Continuation of application No. 14/986,183, filed on Dec. 31, 2015, now Pat. No. 10,713,966.

(51) Int. Cl.
*G09B 7/02* (2006.01)
*G06F 3/0484* (2022.01)
(Continued)

(52) U.S. Cl.
CPC .............. *G09B 7/02* (2013.01); *G06F 3/0484* (2013.01); *G09B 5/00* (2013.01); *H04L 12/1822* (2013.01);
(Continued)

(58) Field of Classification Search
CPC ........... G09B 7/02; G09B 5/00; G06F 3/0484; H04L 12/1822; H04L 51/14; H04L 51/22;
(Continued)

(56) References Cited

U.S. PATENT DOCUMENTS 6,170,014 B1 1/2001 Darago et al.
6,675,145 B1 1/2004 Yehia et al.
(Continued)

FOREIGN PATENT DOCUMENTS

CN 103491143 A 1/2014
JP 2004038579 A 2/2004
(Continued)

OTHER PUBLICATIONS

Google Classroom, "Understanding the assignment flow", captured from https://support.google.com/edu/classroom/answer/6020260, Sep. 1, 2015 (Year: 2015).*

(Continued)

*Primary Examiner* — Meng Vang
*Assistant Examiner* — Chong G Kim
(74) *Attorney, Agent, or Firm* — Keller Preece PLLC

(57) ABSTRACT

A computer implemented method for distributing, collecting and monitoring assignments by a content management system. The method includes receiving a request for a file request from a teacher to distribute an assignment to one or more students. In response to receiving the request, the teacher is prompted for information associated with the assignment. The information can include a name for the assignment, an assignment file and a collection identifier. In response to receiving the information, one or more metadata tags are generated based on the received information. The file request is distributed along with the one or more metadata tags to the one or more student.

20 Claims, 44 Drawing Sheets

(51) Int. Cl.
*G09B 5/00* (2006.01)
*H04L 12/18* (2006.01)
*H04L 51/214* (2022.01)
*H04L 51/42* (2022.01)
*H04L 67/01* (2022.01)
*H04L 67/06* (2022.01)
*H04L 67/12* (2022.01)
*H04L 67/306* (2022.01)

(52) U.S. Cl.
CPC ............ *H04L 51/214* (2022.05); *H04L 51/42* (2022.05); *H04L 67/01* (2022.05); *H04L 67/06* (2013.01); *H04L 67/12* (2013.01); *H04L 67/306* (2013.01)

(58) Field of Classification Search
CPC ....... H04L 67/06; H04L 67/12; H04L 67/306; H04L 67/42
USPC ........................................................ 709/219
See application file for complete search history.

(56) References Cited

U.S. PATENT DOCUMENTS

| | | | |
|---|---|---|---|
| 6,859,812 B1 | 2/2005 | Poynor et al. | |
| 7,051,036 B2 | 5/2006 | Rosnow et al. | |
| 7,080,407 B1 | 7/2006 | Zhao et al. | |
| 7,103,714 B1 | 9/2006 | Jacobs et al. | |
| 7,158,120 B2 | 1/2007 | Griffin et al. | |
| 7,197,493 B2 | 3/2007 | Ashby et al. | |
| 7,219,136 B1 | 5/2007 | Danner et al. | |
| 7,260,607 B2 | 8/2007 | Aktas et al. | |
| 7,293,239 B2 | 11/2007 | Gorbet et al. | |
| 7,302,706 B1 | 11/2007 | Hicks et al. | |
| 7,440,930 B1 | 10/2008 | Brandt | |
| 7,444,390 B2 | 10/2008 | Tadayon et al. | |
| 7,529,797 B2 | 5/2009 | Tseng et al. | |
| 7,580,934 B2 | 8/2009 | Futatsugi | |
| 7,783,665 B1 | 8/2010 | Tormasov et al. | |
| 7,904,464 B2 | 3/2011 | Golwalkar et al. | |
| 8,265,968 B2 | 9/2012 | Yaskin et al. | |
| 8,266,246 B1 | 9/2012 | Cho et al. | |
| 8,341,219 B1 | 12/2012 | Young et al. | |
| 8,375,039 B2 | 2/2013 | Schwartz et al. | |
| 8,515,902 B2 | 8/2013 | Savage et al. | |
| 8,532,343 B1 | 9/2013 | Freedman | |
| 8,566,903 B2 | 10/2013 | Kisin et al. | |
| 8,612,470 B1 | 12/2013 | Fushman et al. | |
| 8,613,108 B1 | 12/2013 | Aggarwal et al. | |
| 8,639,781 B1 | 1/2014 | Motes et al. | |
| 8,640,251 B1 | 1/2014 | Lee et al. | |
| 8,707,459 B2 | 4/2014 | Brock et al. | |
| 8,719,173 B2 | 5/2014 | Beisty et al. | |
| 8,745,222 B2 | 6/2014 | Chi et al. | |
| 8,751,408 B2 | 6/2014 | Linton et al. | |
| 8,798,321 B2 | 8/2014 | Myers et al. | |
| 8,799,322 B2 | 8/2014 | Demilo et al. | |
| 8,861,804 B1 | 10/2014 | Johnson et al. | |
| 8,880,528 B2 | 11/2014 | Houston et al. | |
| 8,892,677 B1 | 11/2014 | Grove et al. | |
| 8,903,838 B2 | 12/2014 | Hunter et al. | |
| 8,925,106 B1 | 12/2014 | Steiner et al. | |
| 8,955,137 B2 | 2/2015 | Mousty et al. | |
| 8,997,180 B2 | 3/2015 | Cairns et al. | |
| 9,008,433 B2 | 4/2015 | Fork et al. | |
| 9,026,608 B1 | 5/2015 | Goldband et al. | |
| 9,063,956 B2 | 6/2015 | Johnson et al. | |
| 9,075,954 B2 | 7/2015 | Kirigin et al. | |
| 9,081,798 B1 | 7/2015 | Wong | |
| 9,122,645 B1 | 9/2015 | Amidon et al. | |
| 9,122,887 B2 | 9/2015 | Drewry et al. | |
| 9,219,830 B1 | 12/2015 | Ciorba et al. | |
| 9,223,554 B1 | 12/2015 | Lawson et al. | |
| 9,465,813 B1 | 10/2016 | Li et al. | |
| 9,626,340 B2 | 4/2017 | Kirigin | |
| 9,639,740 B2 | 5/2017 | Ganong et al. | |
| 9,646,027 B2 | 5/2017 | Zuckerberg et al. | |
| 9,692,826 B2 | 6/2017 | Zhang et al. | |
| 9,727,565 B2 | 8/2017 | Pesavento et al. | |
| 9,747,388 B2 | 8/2017 | Micucci et al. | |
| 9,813,499 B2 | 11/2017 | Daly, Jr. et al. | |
| 10,089,479 B2 | 10/2018 | Zhang et al. | |
| 10,091,296 B2 | 10/2018 | Zhang et al. | |
| 10,102,388 B2 | 10/2018 | Zhang et al. | |
| 10,108,806 B2 | 10/2018 | Zhang et al. | |
| 10,114,957 B2 | 10/2018 | Zhang et al. | |
| 10,162,972 B2 | 12/2018 | Zhang et al. | |
| 10,192,063 B2 | 1/2019 | Zhang et al. | |
| 10,204,230 B2 | 2/2019 | Zhang et al. | |
| 10,607,498 B2 | 3/2020 | Bonney-Ache et al. | |
| 2002/0055089 A1 | 5/2002 | Scheirer et al. | |
| 2002/0120757 A1 | 8/2002 | Sutherland et al. | |
| 2002/0156853 A1 | 10/2002 | Hyakutake et al. | |
| 2002/0182578 A1 | 12/2002 | Rachman et al. | |
| 2004/0049345 A1 | 3/2004 | McDonough et al. | |
| 2004/0153509 A1 | 8/2004 | Alcorn et al. | |
| 2004/0249487 A1 | 12/2004 | Ahlert et al. | |
| 2005/0004928 A1 | 1/2005 | Hamer et al. | |
| 2005/0014122 A1 | 1/2005 | Ruvinsky et al. | |
| 2005/0080861 A1 | 4/2005 | Daniell et al. | |
| 2005/0086296 A1* | 4/2005 | Chi .................. G06Q 10/10 709/219 |
| 2005/0246396 A1 | 11/2005 | Oreizy et al. | |
| 2005/0266388 A1 | 12/2005 | Gross et al. | |
| 2006/0035206 A1 | 2/2006 | Clark et al. | |
| 2006/0046239 A1* | 3/2006 | Allen .................. G09B 25/00 434/353 |
| 2006/0080432 A1 | 4/2006 | Spataro et al. | |
| 2006/0159109 A1 | 7/2006 | Lamkin et al. | |
| 2006/0168233 A1* | 7/2006 | Alcorn .................. G09B 7/02 709/226 |
| 2006/0185019 A1 | 8/2006 | Wong et al. | |
| 2006/0224602 A1 | 10/2006 | Rawat et al. | |
| 2007/0005707 A1 | 1/2007 | Teodosiu et al. | |
| 2007/0016575 A1 | 1/2007 | Hurst-Hiller et al. | |
| 2007/0038681 A1 | 2/2007 | Pierce et al. | |
| 2007/0067349 A1 | 3/2007 | Jhaveri et al. | |
| 2007/0094702 A1 | 4/2007 | Khare et al. | |
| 2007/0162524 A1 | 7/2007 | Coe et al. | |
| 2007/0185974 A1 | 8/2007 | Kawasaki | |
| 2007/0226368 A1 | 9/2007 | Strickland | |
| 2007/0255745 A1 | 11/2007 | Gargi | |
| 2007/0271344 A1 | 11/2007 | Danasekaran et al. | |
| 2008/0005113 A1 | 1/2008 | Li et al. | |
| 2008/0032739 A1 | 2/2008 | Hoodbhoy et al. | |
| 2008/0052349 A1 | 2/2008 | Lin et al. | |
| 2008/0077530 A1 | 3/2008 | Banas et al. | |
| 2008/0086511 A1 | 4/2008 | Takao et al. | |
| 2008/0144891 A1 | 6/2008 | Hwang et al. | |
| 2008/0193908 A1* | 8/2008 | Wang .................. G09B 7/00 434/365 |
| 2008/0235005 A1 | 9/2008 | Golan et al. | |
| 2008/0244591 A1 | 10/2008 | Sagara et al. | |
| 2008/0263103 A1 | 10/2008 | McGregor et al. | |
| 2009/0037520 A1 | 2/2009 | Loffredo et al. | |
| 2009/0063185 A1 | 3/2009 | Chang et al. | |
| 2009/0123021 A1 | 5/2009 | Jung et al. | |
| 2009/0138808 A1 | 5/2009 | Moromisato et al. | |
| 2009/0144283 A1 | 6/2009 | Clark et al. | |
| 2009/0172101 A1 | 7/2009 | Arthursson et al. | |
| 2009/0185723 A1 | 7/2009 | Kurtz et al. | |
| 2009/0199302 A1 | 8/2009 | So et al. | |
| 2009/0226872 A1 | 9/2009 | Gunther | |
| 2009/0267736 A1 | 10/2009 | Watanabe et al. | |
| 2009/0267738 A1 | 10/2009 | Liu et al. | |
| 2009/0287738 A1 | 11/2009 | Colbran et al. | |
| 2009/0288150 A1 | 11/2009 | Toomim et al. | |
| 2009/0307224 A1 | 12/2009 | Amin et al. | |
| 2009/0317786 A1 | 12/2009 | Alcorn et al. | |
| 2010/0011416 A1 | 1/2010 | Wagner et al. | |
| 2010/0011448 A1 | 1/2010 | Wagner et al. | |
| 2010/0070448 A1 | 3/2010 | Omoigui | |
| 2010/0082713 A1 | 4/2010 | Frid-Nielsen et al. | |
| 2010/0115396 A1 | 5/2010 | Byron et al. | |

(56) References Cited

U.S. PATENT DOCUMENTS

| | | |
|---|---|---|
| 2011/0022642 A1 | 1/2011 | Demilo et al. |
| 2011/0078097 A1 | 3/2011 | Thornton et al. |
| 2011/0081140 A1 | 4/2011 | Messier |
| 2011/0119594 A1 | 5/2011 | Tsao |
| 2011/0167353 A1 | 7/2011 | Grosz et al. |
| 2011/0211221 A1 | 9/2011 | Waesberghe |
| 2011/0219450 A1 | 9/2011 | McDougal et al. |
| 2011/0225239 A1 | 9/2011 | Kansal et al. |
| 2011/0239103 A1 | 9/2011 | Mercuri |
| 2011/0276637 A1 | 11/2011 | Thornton et al. |
| 2012/0041834 A1 | 2/2012 | McRae, II |
| 2012/0076367 A1 | 3/2012 | Tseng et al. |
| 2012/0110177 A1 | 5/2012 | Malobrodsky et al. |
| 2012/0124508 A1 | 5/2012 | Morin et al. |
| 2012/0131133 A1 | 5/2012 | Chen et al. |
| 2012/0143958 A1 | 6/2012 | Augustine |
| 2012/0185779 A1 | 7/2012 | Dugan et al. |
| 2012/0197980 A1 | 8/2012 | Terleski et al. |
| 2012/0203764 A1 | 8/2012 | Wood et al. |
| 2012/0213404 A1 | 8/2012 | Steiner |
| 2012/0216046 A1 | 8/2012 | McDougal et al. |
| 2012/0231438 A1 | 9/2012 | Fakhrai et al. |
| 2012/0233153 A1 | 9/2012 | Roman et al. |
| 2012/0239618 A1 | 9/2012 | Kung et al. |
| 2012/0246334 A1 | 9/2012 | Yang et al. |
| 2012/0250950 A1 | 10/2012 | Papakipos et al. |
| 2012/0264099 A1 | 10/2012 | Craft, IV et al. |
| 2012/0265758 A1 | 10/2012 | Han et al. |
| 2012/0281911 A1 | 11/2012 | Fung |
| 2012/0284357 A1 | 11/2012 | Meisels et al. |
| 2012/0331108 A1 | 12/2012 | Ferdowsi et al. |
| 2012/0331394 A1 | 12/2012 | Trombley-Shapiro et al. |
| 2013/0046833 A1* | 2/2013 | Riepling ............... H04L 63/107 709/206 |
| 2013/0058583 A1 | 3/2013 | Gallagher et al. |
| 2013/0080590 A1 | 3/2013 | Bockus, Jr. et al. |
| 2013/0132444 A1 | 5/2013 | Chen et al. |
| 2013/0179194 A1 | 7/2013 | Lorsch |
| 2013/0179947 A1 | 7/2013 | Kline, III et al. |
| 2013/0191445 A1 | 7/2013 | Gayman et al. |
| 2013/0218829 A1 | 8/2013 | Martinez |
| 2013/0239014 A1* | 9/2013 | Patil ................... G06F 3/0482 715/748 |
| 2013/0262588 A1 | 10/2013 | Barak et al. |
| 2013/0283142 A1 | 10/2013 | Farzin et al. |
| 2013/0309648 A1 | 11/2013 | Park et al. |
| 2013/0311565 A1 | 11/2013 | Barry et al. |
| 2013/0311986 A1 | 11/2013 | Arrouye et al. |
| 2013/0318589 A1 | 11/2013 | Ford et al. |
| 2013/0325665 A1 | 12/2013 | Shaffer et al. |
| 2013/0330019 A1 | 12/2013 | Kim et al. |
| 2013/0332575 A1 | 12/2013 | Song et al. |
| 2014/0006350 A1 | 1/2014 | Fukui et al. |
| 2014/0012927 A1 | 1/2014 | Gertzfield et al. |
| 2014/0025490 A1 | 1/2014 | Shekar et al. |
| 2014/0047498 A1 | 2/2014 | Malegaonkar et al. |
| 2014/0067865 A1 | 3/2014 | Kirigin et al. |
| 2014/0067929 A1* | 3/2014 | Kirigin ............... H04L 67/06 709/204 |
| 2014/0082071 A1 | 3/2014 | Rexer |
| 2014/0101434 A1 | 4/2014 | Senthurpandi et al. |
| 2014/0108956 A1 | 4/2014 | Varenhorst et al. |
| 2014/0122471 A1 | 5/2014 | Houston et al. |
| 2014/0122591 A1 | 5/2014 | Roche et al. |
| 2014/0122592 A1 | 5/2014 | Houston et al. |
| 2014/0142984 A1 | 5/2014 | Wright et al. |
| 2014/0165176 A1 | 6/2014 | Ow |
| 2014/0172799 A1 | 6/2014 | Dorman |
| 2014/0172985 A1 | 6/2014 | Lysenko |
| 2014/0181014 A1 | 6/2014 | Balakrishnan et al. |
| 2014/0181089 A1 | 6/2014 | Desmond et al. |
| 2014/0181123 A1 | 6/2014 | Tuffet et al. |
| 2014/0181697 A1 | 6/2014 | Kirigin |
| 2014/0188796 A1* | 7/2014 | Fushman ............ G06F 16/9535 707/624 |
| 2014/0189818 A1 | 7/2014 | Meyer |
| 2014/0195516 A1 | 7/2014 | Balakrishnan et al. |
| 2014/0201138 A1 | 7/2014 | Dorman et al. |
| 2014/0214694 A1 | 7/2014 | Shin et al. |
| 2014/0215551 A1 | 7/2014 | Allain et al. |
| 2014/0215568 A1 | 7/2014 | Kirigin et al. |
| 2014/0222917 A1 | 8/2014 | Poirier |
| 2014/0223355 A1 | 8/2014 | Raccah et al. |
| 2014/0229578 A1 | 8/2014 | Chu et al. |
| 2014/0229839 A1* | 8/2014 | Lynch ................... G06F 3/0482 715/736 |
| 2014/0250479 A1 | 9/2014 | Lee et al. |
| 2014/0258346 A1 | 9/2014 | Meltzer et al. |
| 2014/0258349 A1 | 9/2014 | Meltzer et al. |
| 2014/0258350 A1 | 9/2014 | Duval et al. |
| 2014/0258441 A1 | 9/2014 | L'Heureux et al. |
| 2014/0258972 A1 | 9/2014 | Savage et al. |
| 2014/0272895 A1 | 9/2014 | Feistritzer et al. |
| 2014/0281856 A1 | 9/2014 | Byrne et al. |
| 2014/0283125 A1 | 9/2014 | Stanley et al. |
| 2014/0289868 A1 | 9/2014 | Byrne et al. |
| 2014/0304618 A1 | 10/2014 | Carriero et al. |
| 2014/0310351 A1 | 10/2014 | Danielson et al. |
| 2014/0317031 A1 | 10/2014 | Babenko et al. |
| 2014/0330911 A1 | 11/2014 | Hunter et al. |
| 2014/0351541 A1 | 11/2014 | Angelo et al. |
| 2014/0351606 A1 | 11/2014 | Demilo et al. |
| 2014/0359023 A1* | 12/2014 | Homsany ............ H04L 12/1831 709/206 |
| 2014/0359465 A1 | 12/2014 | Litan et al. |
| 2014/0366159 A1 | 12/2014 | Cohen |
| 2014/0373147 A1 | 12/2014 | Seinfeld et al. |
| 2015/0006474 A1 | 1/2015 | Halder et al. |
| 2015/0032840 A1* | 1/2015 | Daly, Jr. ............... H04L 63/102 709/216 |
| 2015/0033362 A1 | 1/2015 | Mau et al. |
| 2015/0046557 A1 | 2/2015 | Rosenberg |
| 2015/0052613 A1 | 2/2015 | Maman, II et al. |
| 2015/0066941 A1 | 3/2015 | Martin |
| 2015/0067805 A1 | 3/2015 | Martin |
| 2015/0081207 A1 | 3/2015 | Briant |
| 2015/0082196 A1 | 3/2015 | Berger et al. |
| 2015/0086108 A1 | 3/2015 | Craig et al. |
| 2015/0118672 A1* | 4/2015 | Yeskel ................... G09B 5/00 434/362 |
| 2015/0134751 A1 | 5/2015 | Meyers, Jr. et al. |
| 2015/0135097 A1 | 5/2015 | Carriero et al. |
| 2015/0163206 A1 | 6/2015 | McCarthy et al. |
| 2015/0172356 A1* | 6/2015 | Lieu ................... H04L 63/08 709/219 |
| 2015/0189032 A1 | 7/2015 | Duquene et al. |
| 2015/0199598 A1 | 7/2015 | Iams et al. |
| 2015/0213236 A1 | 7/2015 | Gorodyansky et al. |
| 2015/0242444 A1 | 8/2015 | Campbell et al. |
| 2015/0242643 A1 | 8/2015 | Hankins, Jr. et al. |
| 2015/0242956 A1 | 8/2015 | Schultz et al. |
| 2015/0244798 A1 | 8/2015 | Bolotin et al. |
| 2015/0248384 A1 | 9/2015 | Luo et al. |
| 2015/0304437 A1 | 10/2015 | Vaccari et al. |
| 2015/0310188 A1 | 10/2015 | Ford et al. |
| 2016/0071424 A1* | 3/2016 | Harney ................... G09B 5/06 434/350 |
| 2016/0085769 A1 | 3/2016 | Penangwala et al. |
| 2016/0112360 A1 | 4/2016 | Brunn et al. |
| 2016/0127363 A1 | 5/2016 | Vea Orte et al. |
| 2016/0127498 A1 | 5/2016 | Parekh et al. |
| 2016/0132194 A1 | 5/2016 | Grue et al. |
| 2016/0134683 A1 | 5/2016 | Cyran et al. |
| 2016/0148298 A1 | 5/2016 | Tang et al. |
| 2016/0180733 A1 | 6/2016 | Foley, Jr. et al. |
| 2016/0306986 A1 | 10/2016 | Zhang et al. |
| 2016/0308807 A1 | 10/2016 | Zhang et al. |
| 2016/0308881 A1 | 10/2016 | Zhang et al. |
| 2016/0308883 A1 | 10/2016 | Zhang et al. |
| 2016/0308942 A1 | 10/2016 | Zhang et al. |
| 2016/0308943 A1 | 10/2016 | Zhang et al. |
| 2016/0308944 A1 | 10/2016 | Zhang et al. |
| 2016/0308945 A1 | 10/2016 | Zhang et al. |
| 2016/0308946 A1 | 10/2016 | Zhang et al. |

(56) References Cited

U.S. PATENT DOCUMENTS

| | | | |
|---|---|---|---|
| 2016/0308947 | A1 | 10/2016 | Zhang et al. |
| 2016/0308948 | A1 | 10/2016 | Zhang et al. |
| 2016/0308966 | A1 | 10/2016 | Zhang et al. |
| 2016/0308967 | A1 | 10/2016 | Zhang et al. |
| 2016/0371566 | A1 | 12/2016 | Jiang et al. |
| 2017/0046966 | A1 | 2/2017 | Velasquez et al. |
| 2017/0054789 | A1 | 2/2017 | Jneid et al. |
| 2017/0111362 | A1 | 4/2017 | Xie et al. |
| 2017/0149906 | A1 | 5/2017 | Demaris et al. |
| 2017/0177280 | A1 | 6/2017 | Robinson, III et al. |
| 2017/0244649 | A1* | 8/2017 | Rusinov ............... H04L 47/808 |
| 2017/0295238 | A1 | 10/2017 | Zhang et al. |
| 2018/0048698 | A1 | 2/2018 | Ferdowsi et al. |
| 2018/0150477 | A1 | 5/2018 | Jewell et al. |
| 2018/0189256 | A1* | 7/2018 | Gonzalez .............. G06F 40/177 |
| 2018/0278690 | A1 | 9/2018 | Zhang et al. |
| 2018/0349408 | A1 | 12/2018 | Jewell et al. |
| 2019/0042771 | A1 | 2/2019 | Zhang et al. |
| 2019/0042772 | A1 | 2/2019 | Zhang et al. |
| 2019/0050584 | A1 | 2/2019 | Zhang et al. |
| 2019/0065763 | A1 | 2/2019 | Berg |
| 2019/0121992 | A1 | 4/2019 | Zhang et al. |
| 2019/0121993 | A1 | 4/2019 | Zhang et al. |
| 2020/0285684 | A1 | 9/2020 | Hälikkäet al. |

FOREIGN PATENT DOCUMENTS

| | | | |
|---|---|---|---|
| JP | 2004326281 A | | 11/2004 |
| JP | 2005070846 A | | 3/2005 |
| JP | 2007226457 A | | 9/2007 |
| JP | 2008186239 A | | 8/2008 |
| JP | 2008257475 A | | 10/2008 |
| JP | 2009500698 A | | 1/2009 |
| JP | 2012073998 A | | 4/2012 |
| JP | 2014056454 A | | 3/2014 |
| WO | WO-2004077207 A2 | | 9/2004 |
| WO | WO-2009116054 A2 | | 9/2009 |
| WO | WO-2011150280 A1 | | 12/2011 |
| WO | WO-2015077894 A1 | | 6/2015 |
| WO | WO-2016168742 A1 | | 10/2016 |
| WO | WO-2016168748 A1 | | 10/2016 |

OTHER PUBLICATIONS

Blackwell, "EdTech Tips: Promoting Engagement Through Google Classroom", captured from https://www.gpb.org/blogs/education-matters/2015/11/30/edtech-tips-promoting-engagement-through-google-classroom, Nov. 30, 2015 (Year: 2015).*
Notice of Allowance from U.S. Appl. No. 17/123,788, dated Sep. 22, 2021, 17 pages.
Abazi-Bexheti L., "Development of a Learning Content Management System," WSEAS Transactions on Information Science & Applications, Issue 6, vol. 5, Jun. 2008, pp. 1001-1010.
Advisory Action for U.S. Appl. No. 14/960,841 dated May 10, 2017, 3 pages.
Advisory Action from U.S. Appl. No. 16/119,031, dated Apr. 22, 2020, 2 pages.
Agarwal A., "How to Let Others Upload Files to your Dropbox Account," Digital Inspiration, Jun. 22, 2015, downloaded online at http://www.labnol.org/internet/dropbox-upload-folder/18898/ on Sep. 21, 2015, 3 pages.
Aspera Inc., "IBM Aspera Faspex User Guide 3.9.1: All Platforms," an IBM Company, Emeryville, CA, May 29, 2015, downloaded online at http://download.asperasoft.com/download/docs/faspex/3.9.1/user/pdf2/Faspex_User_3.9.1.pdf on Sep. 22, 2015, 19 pages.
Bayardo R., et al., "Exploiting the Web for Point-in-Time File Sharing," Special Interest Tracks and Posters of the 14th International Conference on World Wide Web, WWW '05, May 10, 2005, pp. 1016-1017.
Brad, "What Are The Different Access Levels for Collaborators?," Box Community, Box, Inc., Los Altos, CA, Feb. 5, 2015, downloaded online at http://community.box.com/t5/Collaboration-and-Sharing/What-Are-The-Different-Access-Levels-For-Collaborators/ta-p/144 on Sep. 22, 2015, 4 pages.
Chen K., "Allow Anyone Upload Files Directly to Your Dropbox with DBInbox," Next of Windows, Nov. 18, 2014, retrieved from http://www.nextofwindows.com/allow-anyone-upload-files-directly-to-your-dropbox-with-dbinbox on Sep. 22, 2015, 4 pages.
Citrix Systems, Inc., "ShareFile for the enterprise: Share, store, sync, and secure data on any device, anywhere," Santa Clara, CA, 2015, downloaded from https://www.citrix.com/content/dam/citrix/en_us/documents/products-solutions/citrix-sharefile-en on Sep. 23, 2015, 4 pages.
CloudWok, "File uploads to your Cloud with CloudWok: Tour," 2015, downloaded from https://www.cloudwok.com/tour on Sep. 22, 2015, 5 pages.
Communication Pursuant to Article 94(3) for EP Application No. 18162839.7 dated Mar. 19, 2020, 14 pages.
Corrected Notice of Allowance from U.S. Appl. No. 15/633,415, dated Sep. 20, 2019, 15 pages.
Corrected Notice of Allowance from U.S. Appl. No. 16/149,027, dated Jan. 27, 2020, 2 pages.
Cozma N., "Add Expiration Dates for Shared Google Drive folders," CNET, Jan. 25, 2013, Retrieved from http://www.cnet.com/how-to/add-expiration-dates-for-shared-googledrive-folders/ on Jul. 16, 2015, 3 pages.
Drive Help, "Change Your Sharing Settings," Google Inc, 2015, retrieved from http://support.google.com/drive/answer/2494886?hl=en on Sep. 22, 2015, 4 pages.
EduGeek, "Student Drop box permissions" Jul. 2007 [retrieved on Jun. 14, 2019] retrieved from https://www.edugeek.neUforums/how-do-you-do/9710-student-drop-box-homework-folder-permissions.html on Jun. 14, 2019, 8 pages.
"Egnyte v. Dropbox: Comparing Dropbox and Egnyte White Paper," Jun. 30, 2013, retrieved form http://pages.egnyte.com/rs/egnyteinc/images/Comparing_Dropbox_and_Egnyte.pdf on Jul. 16, 2015, 9 pages.
Examination Report for Australian Application No. 2016248340 dated Oct. 29, 2018, 4 pages.
Examination Report for Australian Application No. 2016248345 dated Oct. 29, 2018, 4 pages.
Examination Report No. 3, for Australian Application No. 2016248345, dated Oct. 24, 2019, 5 pages.
Examination Report No. 4, for Australian Application No. 2016248340, dated Oct. 24, 2019, 5 pages.
Extended Search Report for EP Application No. 18162839.7 dated Apr. 20, 2018, 9 pages.
Final Office Action from U.S. Appl. No. 16/223,898, dated Aug. 3, 2020, 13 pages.
Final Office Action from U.S. Appl. No. 16/119,031, dated Jan. 3, 2020, 25 pages.
Final Office Action from U.S. Appl. No. 16/119,817, dated Jul. 14, 2020, 9 pages.
Github, "Feature Request: Allow Different Permissions for Subfolder #4579," Aug. 26, 2013, Retrieved from the Internet URL: https://github.com/owncloud/core/issues/4579 on Jul. 15, 2015, 8 pages.
Google Support, "Upload Files to Google Drive", Google Inc., Mountain View, CA, 2015, downloaded from https://support.google.com/a/answer/172541?hl=en on Sep. 16, 2015, 3 pages.
International Search Report and Written Opinion for PCT Application No. PCT/IB2015/053543 dated Jul. 31, 2015, 16 pages.
International Search Report and Written Opinion for PCT Application No. PCT/US2016/027950 dated Jul. 7, 2016, 11 pages.
International Search Report and Written Opinion for PCT Application No. PCT/US2016/027961 dated Jul. 7, 2016, 11 pages.
Iparadigms LLC, "iThenticate User Manual," Version 2.0.8, Feb. 4, 2014, downloaded from http://www.ithenticate.com/hs-fs/hub/92785/file-1384442395-pdf/iTh_documentation/iThenticate_Manual.pdf on Sep. 23, 2015, 68 pages.
Iparadigms, "Turnitin Instructor User Guide," iParadigrns, LLC. , Sep. 26, 2006, pp. 1-75.
Jones J.B., "Receive Files in Dropbox with FileStork," The Chronicle of Higher Education, Aug. 25, 2011, retrieved from https://www.

(56) References Cited

OTHER PUBLICATIONS chronicle.com/blogs/profhacker/receive-files-in-dropbox-with-filestork/35567 on Dec. 11, 2018, 6 pages.
Kishore, "How to Track when Someone Accesses a Folder on your Computer," retrieved from www.online-tech-tips.com, Aug. 3, 2014, 11 pages.
Lakshmanan L., "Box Sharing Guide," University of California San Francisco, San Francisco, CA, Apr. 14, 2014 downloaded at https://it.ucsf.edu/services/ucsf-box/box-sharing-guide on Sep. 22, 2015, 10 pages.
Lexis Nexis, "SafeAssign," 2009, retrieved from http://www.lexisnexis.com/documents/LawSchoolTutorials/20091102103551_small.pdf on Sep. 23, 2015, 4 pages.
Mangoapps, "Core Document Management Features," Bellevue, WA, 2015, downloaded online at http://www.mangoapps.com/core-document-features on Sep. 22, 2015, 11 pages.
Microsoft, "Description of security events in Windows 7 and in Windows Server 2008 R2," Feb. 2011, support.microsoft, retrieved from https://support.microsoft.com/en-us/help/977519/description-of-security-events-in-windows-7-and-in windows-server-2008 on Jun. 21, 2019, 31 pages.
Non-Final Office Action from U.S. Appl. No. 16/425,806, dated Aug. 3, 2020, 11 pages.
Non-Final Office Action from U.S. Appl. No. 16/223,898, dated Feb. 6, 2020, 14 pages.
Non-Final Office Action for U.S. Appl. No. 16/222,617 dated Feb. 6, 2020, 9 pages.
Non-Final Office Action from U.S. Appl. No. 15/221,556, dated Sep. 16, 2019, 21 pages.
Non-Final Office Action from U.S. Appl. No. 16/119,031, dated Jun. 12, 2020, 19 pages.
Non-Final Office Action from U.S. Appl. No. 16/119,031, dated Sep. 9, 2019, 12 pages.
Non-Final Office Action from U.S. Appl. No. 16/119,817, dated Jan. 22, 2020, 48 pages.
Non-Final Office Action from U.S. Appl. No. 16/160,623, dated Oct. 1, 2019, 9 pages.
Non-FinalOffice Action for U.S. Appl. No. 15/633,415 dated Mar. 25, 2019, 16 pages.
Notice of Allowance from U.S. Appl. No. 14/961,148, dated Jan. 17, 2020, 22 pages.
Notice of Allowance from U.S. Appl. No. 14/961,165, dated Jan. 21, 2020, 25 pages.
Notice of Allowance from U.S. Appl. No. 15/221,556, dated Apr. 10, 2020, 2 pages.
Notice of Allowance from U.S. Appl. No. 15/221,556, dated Jan. 22, 2020, 6 pages.
Notice of Allowance from U.S. Appl. No. 15/633,415, dated Nov. 20, 2019, 7 pages.
Notice of Allowance from U.S. Appl. No. 15/991,972, dated Sep. 11, 2019, 5 pages.
Notice of Allowance from U.S. Appl. No. 16/149,027, dated Nov. 14, 2019, 16 pages.
Notice of Allowance from U.S. Appl. No. 16/160,623, dated Feb. 3, 2020, 15 pages.
Notice of Allowance from U.S. Appl. No. 16/222,617, dated May 5, 2020, 8 pages.
Notice of Allowance from U.S. Appl. No. 16/222,617, dated May 18, 2020, 4 pages.
Notice of Allowance from U.S. Appl. No. 16/425,661, dated Aug. 18, 2020, 5 pages.
Notice of Allowance from U.S. Appl. No. 16/425,661, dated Aug. 28, 2020, 2 pages.
Notice of Allowance from U.S. Appl. No. 16/425,661, dated Jul. 2, 2020, 2 pages.
Notice of Allowance from U.S. Appl. No. 16/425,661, dated Jun. 8, 2020, 18 pages.
Notice of Allowance from U.S. Appl. No. 16/425,661, dated Jun. 24, 2020, 2 pages.
Notice of Allowance for U.S. Appl. No. 14/960,841 dated Dec. 1, 2017, 15 pages.
Notice of Allowance for U.S. Appl. No. 14/960,841 dated May 17, 2018, 5 pages.
Notice of Allowance for U.S. Appl. No. 14/960,984 dated Jan. 25, 2017, 5 pages.
Notice of Allowance for U.S. Appl. No. 14/960,984 dated Sep. 15, 2016, 6 pages.
Notice of Allowance for U.S. Appl. No. 14/961,000 dated Feb. 9, 2018, 4 pages.
Notice of Allowance for U.S. Appl. No. 14/961,000 dated Jan. 17, 2018, 9 pages.
Notice of Allowance for U.S. Appl. No. 14/961,000 dated Jun. 7, 2018, 8 pages.
Notice of Allowance for U.S. Appl. No. 14/961,107 dated Sep. 18, 2018, 8 pages.
Notice of Allowance for U.S. Appl. No. 14/961,119 dated Jun. 13, 2018, 15 pages.
Notice of Allowance for U.S. Appl. No. 14/961,130 dated May 22, 2018, 6 pages.
Notice of Allowance for U.S. Appl. No. 14/961,241 dated Oct. 5, 2018, 7 pages.
Notice of Allowance for U.S. Appl. No. 14/961,256 dated Jul. 31, 2018, 7 pages.
Notice of Allowance for U.S. Appl. No. 14/961,287 dated May 25, 2018, 14 pages.
Notice of Allowance for U.S. Appl. No. 15/633,415 dated Jul. 17, 2019, 7 pages.
Notice of Allowance for U.S. Appl. No. 15/991,972 dated May 23, 2019, 22 pages.
Office Action for European Application No. 16718956.2 dated May 23, 2019, 5 pages.
Office Action for European Application No. 16720012.0 dated May 23, 2019, 6 pages.
Office Action for U.S. Appl. No. 14/530,555 dated Feb. 5, 2015, 18 pages.
Office Action for U.S. Appl. No. 14/530,555 dated Jan. 14, 2016, 28 pages.
Office Action for U.S. Appl. No. 14/530,555 dated Jul. 9, 2015, 25 pages.
Office Action for U.S. Appl. No. 14/530,555 dated Oct. 19, 2015, 3 pages.
Office Action for U.S. Appl. No. 14/960,841 dated Aug. 14, 2017, 6 pages.
Office Action for U.S. Appl. No. 14/960,841 dated Feb. 19, 2016, 7 pages.
Office Action for U.S. Appl. No. 14/960,841 dated Feb. 28, 2017, 9 pages.
Office Action for U.S. Appl. No. 14/960,841 dated Jun. 13, 2016, 9 pages.
Office Action for U.S. Appl. No. 14/960,841 dated Nov. 4, 2016, 6 pages.
Office Action for U.S. Appl. No. 14/960,984 dated May 11, 2016, 9 pages.
Office Action for U.S. Appl. No. 14/961,000 dated Jan. 3, 2017, pages.
Office Action for U.S. Appl. No. 14/961,000 dated Jun. 5, 2017, 15 pages.
Office Action for U.S. Appl. No. 14/961,000 dated May 6, 2016, 17 pages.
Office Action for U.S. Appl. No. 14/961,015 dated Apr. 14, 2016, 36 pages.
Office Action for U.S. Appl. No. 14/961,015 dated Apr. 26, 2017, 31 pages.
Office Action for U.S. Appl. No. 14/961,015 dated Aug. 30, 2017, 26 pages.
Office Action for U.S. Appl. No. 14/961,015 dated Aug. 7, 2018, 29 pages.
Office Action for U.S. Appl. No. 14/961,015 dated Dec. 18, 2017, 33 pages.
Office Action for U.S. Appl. No. 14/961,015 dated Jan. 9, 2017, 21 pages.

(56) References Cited

OTHER PUBLICATIONS

Office Action for U.S. Appl. No. 14/961,015 dated Jul. 25, 2016, 40 pages.
Office Action for U.S. Appl. No. 14/961,107 dated May 24, 2018, 16 pages.
Office Action for U.S. Appl. No. 14/961,107 dated Oct. 26, 2017, 12 pages.
Office Action for U.S. Appl. No. 14/961,119 dated Mar. 14, 2018, 14 pages.
Office Action for U.S. Appl. No. 14/961,119 dated Sep. 25, 2017, 18 pages.
Office Action for U.S. Appl. No. 14/961,130 datd Apr. 24, 2017, 11 pages.
Office Action for U.S. Appl. No. 14/961,141 dated Apr. 21, 2017, 13 pages.
Office Action for U.S. Appl. No. 14/961,141 dated Jan. 25, 2019, 14 pages.
Office Action for U.S. Appl. No. 14/961,141 dated May 14, 2018, 11 pages.
Office Action for U.S. Appl. No. 14/961,141 dated Nov. 30, 2017, 15 pages.
Office Action for U.S. Appl. No. 14/961,141 dated Oct. 16, 2018, 10 pages.
Office Action for U.S. Appl. No. 14/961,148 dated Jul. 12, 2019, 14 pages.
Office Action for U.S. Appl. No. 14/961,148 dated Mar. 15, 2019, 19 pages.
Office Action for U.S. Appl. No. 14/961,148 dated Sep. 4, 2018, 19 pages.
Office Action for U.S. Appl. No. 14/961,165 dated Aug. 28, 2018, 16 pages.
Office Action for U.S. Appl. No. 14/961,165 dated Feb. 8, 2019, 16 pages.
Office Action for U.S. Appl. No. 14/961,165 dated Jun. 26, 2019, 13 pages.
Office Action for U.S. Appl. No. 14/961,241 dated Feb. 12, 2018, 18 pages.
Office Action for U.S. Appl. No. 14/961,241 dated Jun. 6, 2018, 9 pages.
Office Action for U.S. Appl. No. 14/961,241 dated Sep. 25, 2017, 17 pages.
Office Action for U.S. Appl. No. 14/961,256 dated May 29, 2018, 9 pages.
Office Action for U.S. Appl. No. 14/961,256 dated Oct. 19, 2017, 18 pages.
Office Action for U.S. Appl. No. 14/961,287 dated Nov. 30, 2017, 14 pages.
Office Action for U.S. Appl. No. 15/633,415 dated Jun. 5, 2018, 9 pages.
Office Action for U.S. Appl. No. 15/633,415 dated Oct. 19, 2018, 10 pages.
Office Action for U.S. Appl. No. 15/991,972 dated Jan. 29, 2019, 22 pages.
Oprisa C., et al., "From Plagiarism to Malware Detection," 2013 15th International Symposium on Symbolic and Numeric Algorithms for Scientific Computing, Timisoara, 2013, pp. 227-234.
Plone, "Collaboration Through Sharing," Plone Foundation, Fishers, 2010, retrieved from https://plone.org/documentation/manual/plone-4-user-manual/collaboration-and-workflow/collaboration-through-sharing on Sep. 22, 2015, 12 pages.
Rutgers, "Sakai Help: Assignment," www.rutgers.edu, Jun. 27, 2012, retrieved from http://rci.rutgers.edu/orit/sakai/helpdocs2/assignment.php on Apr. 15, 2017, pp. 1-18.
Rutgers, "Sakai Help: Dropbox," www.rutgers.edu, Jul. 11, 2012, retrieved from http://rci.rutgers.edu/orit/sakai/helpdocs2/dropbox.php on Apr. 15, 2017, pp. 1-7.
Sakai@Rutgers Help Documents, "Assignments," Rutgers University, 2015, retrieved from https://sakai.rutgers.edu/helpdocs/assignments.html on Sep. 23, 2015, 17 pages.
Second Examination Report for Australian Application No. 2016248340 dated Apr. 24, 2019, 4 pages.
Second Examination Report for Australian Application No. 2016248345 dated Apr. 24, 2019, 3 pages.
Skinner P., "Professors use plagiarism detection site to check students," DailytoReador.com, Feb. 27, 2012, retrieved from http://www.dailytoreadorcom/lavida/professors-use-plagiarism-detection-site-to-check-students/article_2c128776-61cf-11el001a4bcf6878.html on Apr. 15, 2017, pp. 1-4.
Smetters D.K., et al., "How Users Use Access Control," Soups 2009 Proceedings of the 5th Symposium on Usable Privacy and Security, 2009, Association for Computing Machinery, Jul. 15-17, 2009, 12 pages.
SmugMug, "Can Guests Upload Photos to My Site?," SmugMug Inc, Aug. 27, 2015, retrieved from http://help.smugmug.com/customer/portal/articles/526320-can-guests-upload-photos-to-my-site-on Sep. 21, 2015, pp. 1-2.
Supplemental Notice of Allowance from U.S. Appl. No. 15/991,972, dated Nov. 25, 2019, 5 pages.
Third Examination Report for Australian Application No. 2016248340 dated Jul. 26, 2019, 4 pages.
Western Digital Technologies, Inc., "WD My Cloud: Personal Cloud Storage User Manual," Irvine, CA, 2013, downloaded from http://www.wdc.com/wdproducts/library/UM/ENG/4779-705103.pdf on Sep. 23, 2015, 126 pages.
Wikipedia, "Inode—Wikipedia, The Free Encyclopedia," Feb. 18, 2014, retrieved from the Internet: https://web.archive.org/web/20140218234807/https://en.wikipedia.org/wiki/Inode, 4 pages.
Notice of Allowance from U.S. Appl. No. 16/119,031, dated Sep. 29, 2020, 5 pages.
Notice of Allowance from U.S. Appl. No. 16/506,313, dated Sep. 29, 2020, 2 pages.
Notice of Allowance for Office Action for U.S. Appl. No. 14/961,141 dated May 6, 2019, 10 pages.
Summons to attend oral proceedings pursuant to Rule 115(1) EPC for European application No. 18162839.7, dated Sep. 30, 2020, 15 pages.
Sur A., et al., "Visual Studio 2012 and .Net 4.5 Expert Development Cookbook," Packet publishing limited, Apr. 2013, 4 pages.
Final Office Action from U.S. Appl. No. 16/119,817, dated Apr. 12, 2021, 8 pages.
Non-Final Office Action from U.S. Appl. No. 16/119,817, dated Oct. 9, 2020, 10 pages.
Notice of Allowance from U.S. Appl. No. 16/425,806, dated Oct. 14, 2020, 8 pages.
Notification of Reason for Refusal for Japanese Application No. 2019-112094 dated Sep. 18, 2020, 9 pages.
Notice of Allowance from U.S. Appl. No. 14/986,183, dated Jun. 1, 2020, 5 pages.
Examination Report No. 3 for Australian Application No. 2019257407 dated Dec. 17, 2021, 6 pages.
Notice of Allowance from U.S. Appl. No. 16/144,816, dated Dec. 22, 2021, 12 pages.
Examination Report No. 1 for Australian Application No. 2019257407 dated Dec. 23, 2020, 6 pages.
Final Office Action from U.S. Appl. No. 16/144,816, dated Feb. 25, 2021, 34 pages.
Examination Report No. 2 for Australian Application No. 2019257407 dated Sep. 27, 2021, 9 pages.
Result of Consultation for European Application No. 18162839.7 dated May 18, 2021, 27 pages.
Non-Final Office Action from U.S. Appl. No. 16/144,816, dated Sep. 1, 2020, 17 pages.
Notice of Allowance from U.S. Appl. No. 16/506,313, dated Sep. 2, 2020, 18 pages.
Notice of Allowance from U.S. Appl. No. 16/119,817, dated Jul. 20, 2021, 11 pages.
Notice of Allowance from U.S. Appl. No. 16/119,817, dated Jul. 28, 2021, 3 pages.
Domenico F.D., et al., "Analysis of Commercial and Experimental E-learning Systems," The TISIP Foundation, Norway, 2005, retrieved from http://i-learn.uitm.edu.my/resources/journal/wp4-analysis-ofe-systems.pdf on Nov. 24, 2015, 117 pages.

(56) References Cited

OTHER PUBLICATIONS

Non-Final Office Action from U.S. Appl. No. 14/986,183, dated Dec. 20, 2019, 13 pages.
Notice of Allowance from U.S. Appl. No. 14/986,183, dated Mar. 27, 2020, 5 pages.
Notice of Allowance from U.S. Appl. No. 14/986,183, dated May 13, 2020, 2 pages.
Notice of Allowance from U.S. Appl. No. 14/986,183, dated May 20, 2020, 2 pages.
Notice of Allowance from U.S. Appl. No. 14/986,193, dated Feb. 27, 2020, 3 pages.
Notice of Allowance from U.S. Appl. No. 14/986,193, dated Nov. 20, 2019, 7 pages.
Office Action for U.S. Appl. No. 14/986,183 dated Dec. 26, 2017, 19 pages.
Office Action for U.S. Appl. No. 14/986,183 dated Jul. 12, 2019, 13 pages.
Office Action for U.S. Appl. No. 14/986,183 dated Jun. 16, 2017, 18 pages.
Office Action for U.S. Appl. No. 14/986,183 dated Mar. 21, 2019, 17 pages.
Office Action for U.S. Appl. No. 14/986,183 dated May 4, 2016, 19 pages.
Office Action for U.S. Appl. No. 14/986,183 dated Nov. 28, 2016, 19 pages.
Office Action for U.S. Appl. No. 14/986,193 dated Dec. 27, 2016, 15 pages.
Office Action for U.S. Appl. No. 14/986,193 dated Dec. 28, 2017, 15 pages.
Office Action for U.S. Appl. No. 14/986,193 dated Jun. 15, 2017, 14 pages.
Office Action for U.S. Appl. No. 14/986,193 dated May 6, 2016, 13 pages.
Office Action for U.S. Appl. No. 14/986,193 dated May 15, 2019, 12 pages.
Rouse et al."Compressed Folders," Aug. 13, 2004, retrieved from http://www.informit.com/articles/article.aspx?p=174350seqNum=3 on Jul. 8, 2019, 2 pages.
"UI Patterns: Input Prompt Design Pattern," Web Archive, retrieved from https://web.archive.org/web/20141220173222/http://ui-patterns.com/patterns/InputPrompt, Dec. 20, 2014, 6 pages.
Communication Pursuant to Article 94(3) EPC for European Application No. 16718956.2 dated Dec. 3, 2020, 9 pages.
Communication Pursuant to Article 94(3) EPC for European Application No. 16720012.0 dated Dec. 3, 2020, 9 pages.
Notice of Allowance from U.S. Appl. No. 16/223,898, dated Dec. 8, 2020, 7 pages.
Notice of Allowance from U.S. Appl. No. 17/538,860, dated Aug. 19, 2022, 17 pages.
Notice of Allowance from U.S. Appl. No. 17/538,860, dated Sep. 14, 2022, 13 pages.
Communication Pursuant to Article 94(3) EPC for European Application No. 16720012.0 dated Feb. 13, 2023, 6 pages.
Communication under Rule 71(3) EPC for European Application No. 16718956.2 dated Feb. 27, 2023, 158 pages.
Grolimund D., et al., "Cryptree: A Folder Tree Structure for Cryptographic File Systems," 25th IEEE Symposium on Reliable Distributed Systems (SRDS'06), Oct. 24, 2006, DOI: 10.1109/SRDS.2006.15, pp. 189-198.
Non-Final Office Action from U.S. Appl. No. 17/652,326, dated Jan. 3, 2023, 31 pages.
Notice of Allowance from U.S. Appl. No. 17/510,187, dated Jan. 10, 2023, 9 pages.
Notice of Allowance from U.S. Appl. No. 17/510,187, dated Mar. 17, 2023, 03 pages.
Notice of Allowance from U.S. Appl. No. 17/930,648, dated Mar. 8, 2023, 19 pages.
Notice of Allowance from U.S. Appl. No. 17/930,648, dated Mar. 16, 2023, 14 pages.
Zigkolis C., et al., "Detecting the Long-Tail of Points of Interest in Tagged Photo Collections," Proceedings of the 9th International Workshop on Content-Based Multimedia Indexing (CBMI), Jun. 13, 2011, 6 pages.
Non-Final Office Action from U.S. Appl. No. 17/510,187, dated Nov. 21, 2022, 12 pages.
Result of Consultation for European Application No. 16720012.0 dated Mar. 30, 2023, 3 pages.
Notice of Allowance from U.S. Appl. No. 17/930,648, dated Apr. 14, 2023, 14 pages.
Notice of Allowance from U.S. Appl. No. 17/930,648, dated Jun. 13, 2023, 17 pages.
Final Office Action from U.S. Appl. No. 17/652,326, dated Jun. 28, 2023, 28 pages.
Non-Final Office Action from U.S. Appl. No. 17/652,326, dated Nov. 29, 2023, 26 pages.

\* cited by examiner

○○○ ○ Chrome File Edit View History Bookmarks People Window Help ○ ⊙ ✱ □ ⊙ ▯ ⊛ ⊘ Fri 11:12 Q ≡

← → ⊛ ⊙ | Q https://www.dropbox.com/requests/homework1/Missingsubmissions

⬖

- ▭ Files
- ▤ Notes
- ↻ Carousel
- ⊘ Sharing
- ⊛ Links
- ▯ Events
- ▯ File requests
- ⇄ Assignments

3702

ⓘ Gabe Sanchez ▾

File Requests>Period 1 - Algebra 1 > Homework 1

Homework 1 change
Created 9/25/2015 7:47 AM

Lorem ipsum dolor sit amet, consectetur adipiscing elit. Cras ipsum Ligula, dapibus ut enim id, placerat fermentum felis. Duis elementum sodales consequat.

30 members

| Name ▾ | Status ▾ | Grade | Actions | Feedback Submitted |
|---|---|---|---|---|
| Chris Friedrich | ⓧ | | Request | - |
| Fred Matt | ⓧ | | Request | - |

[ Q Search ]

○ ○ ○ Chrome File Edit View History Bookmarks People Window Help  ○ ⊚ □3 ○ ⊛ ☒ ⓘ Fri 11:12 ◌ ⋮⋮⋮

◉ File requests - Dropbox ×

◌ https://www.dropbox.com/sharing/AlgebraPeriod1 — 4202

Sharing  ⊙ Gabe Sanchez ▽

▱

▤ Files
▥ Notes
⟳ Carousel
✎ Sharing
⊘ Links
▢ Events
▭ File requests
⟠ Assignments

| Shared Folder | Groups |

‹ Back to Groups

Algebra 1 – Period 1 change
Created 9/1/2015 7:03AM

16 members — 4204

| Name ▽ | Email | Joined — 4208 | | Add Members  ⋯ |
|---|---|---|---|---|
| | | | | Q Search |
| Ben Stern | b.stern@aps.edu | 9/6/2015 | ⚙ — 4210 | |
| | | | | ┌─ Remove User — 4214 |
| | | | | │ View Portfolio — 4216 — 4212 |
| Bob Cameron | bcam@aps.edu | 9/9/2015 | | |
| Chris Friedrich | cfried@aps.edu | 9/3/2015 | ⚙ | |
| Charles Maloney | c.maloney@aps.edu | 9/5/2015 | | |

Chrome  File  Edit  View  History  Bookmarks  People  Window  Help

File requests - Dropbox × https://www.dropbox.com/sharing/AlgebraPeriod1/BenStern — 4302

Sharing                                                            ⊙ Gabe Sanchez ▽

- Files
- Notes
- Carousel
- Sharing
- Links
- Events
- File requests
- Assignments

| Shared Folder | Groups |

‹ Back to Period- Algebra 1

Ben Stern change
Created 8/1/2015 9:11 PM
10 assignments — 4304

| Name ▽ | Modified — 4306 | Grade — 4308 | Share Portfolio — 4310 |

▽ Unit1

▽ Homeworks

| Homework1 | 9/2/2015 7:47 AM | 98/100 |
| Homework2 | 9/2/2015 8:15 AM | 100/100 |
| Group Homework | 9/2/2015 8:15 AM | 78/100 |

▽ Projects

| Final Project | 9/24/2015 10:13 AM | | |

ASSIGNMENTS FOR CLASSROOMS

CROSS REFERENCE TO RELATED APPLICATIONS

This application is a continuation of U.S. application Ser. No. 14/986,183, filed on Dec. 31, 2015, The aforementioned application is hereby incorporated by reference in its entirety.

TECHNICAL FIELD

The present technology pertains to using file requests for school assignments, and more specifically pertains to a user interface that creates a file request for school assignments, submitting a file, monitoring the status of the submissions and viewing the submissions using one or more metadata tags.

BACKGROUND

Conventional teacher-student software does not provide user friendly user interfaces. For teachers, conventional systems are typically class based and do not provide teachers with easy search features. For students, conventional systems are also typically class driven and do not provide students with the ability to see upcoming due dates in one user interface. Conventional student-teacher systems do not allow a student to maintain their own records.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for allowing teachers a means to distribute assignments and determine the assignment statuses in a variety of ways. Teachers are able to review assignment status on a per class basis, on a per assignment basis and a per student basis. For students, they are able to see all outstanding assignments via a user interface and are able to submit completed assignments using the same interface. To allow both the student and teacher features, assignments can include one or more metadata tags that can identify a school, teacher, class, term, assignment and student. By using metadata tags and identifiers, user interfaces or dashboards can display assignments and other information based on the metadata tags.

Disclosed are systems, methods, and non-transitory computer-readable storage media for allowing teachers a means to distribute assignments and determine the assignment statuses in a variety of ways. Students can submit assignments with the assignments being stored. In response to a release command, the stored assignments can be searched and identified. Students can be prompted to save or discard the released assignments.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 18 is a send file request UI rendering a list of email addresses in accordance with an exemplary embodiment;

FIG. 27 is a submission homepage UI rendering information for an assignment in accordance with an exemplary embodiment;

FIG. 30 is an updated submission homepage UI rendering information and a file for submitting an assignment in accordance with an exemplary embodiment;

FIG. 36 is a late submission UI rendering a listing of late submissions in accordance with an exemplary embodiment;

FIG. 37 is a missing submission UI rendering a listing of missing submissions in accordance with an exemplary embodiment;

FIG. 42 is a class UI rendering a scrollable list of students for a corresponding class in accordance with an exemplary embodiment;

FIG. 43 is an assignment UI rendering a list of assignments associated with a student in accordance with an exemplary embodiment;

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for teacher and student user interfaces that allow teachers to distribute, monitor and search student submissions. The submissions are in response to a file request. The file request allows a teacher to distribute an assignment to one or more students and is used to collect and monitor assignment statuses once disseminated to the students. A file request is generated in response to receiving responses to prompts and includes one or more metadata tags identifying at least one of a school, teacher, class, term and assignment. For example, the one or more metadata tags can identify the assignment. Students can respond to the file request and submit assignments. The assignments include one or more metadata tags identifying at least one of a school, teacher, class, term, assignment and student. For example, the one or more metadata tags identify the assignment and student. Teachers are able to view assignments based on class, student and assignment using the one or more metadata tags. Once assignments are submitted and stored, a teacher or administrator can release the stored assignments to the students. The release can be for a given student, class or school. Once the assignments are released, the student can elect to save the released assignments or discard them. If saved, the released assignments can be organized by school year and class.

Figure 1:
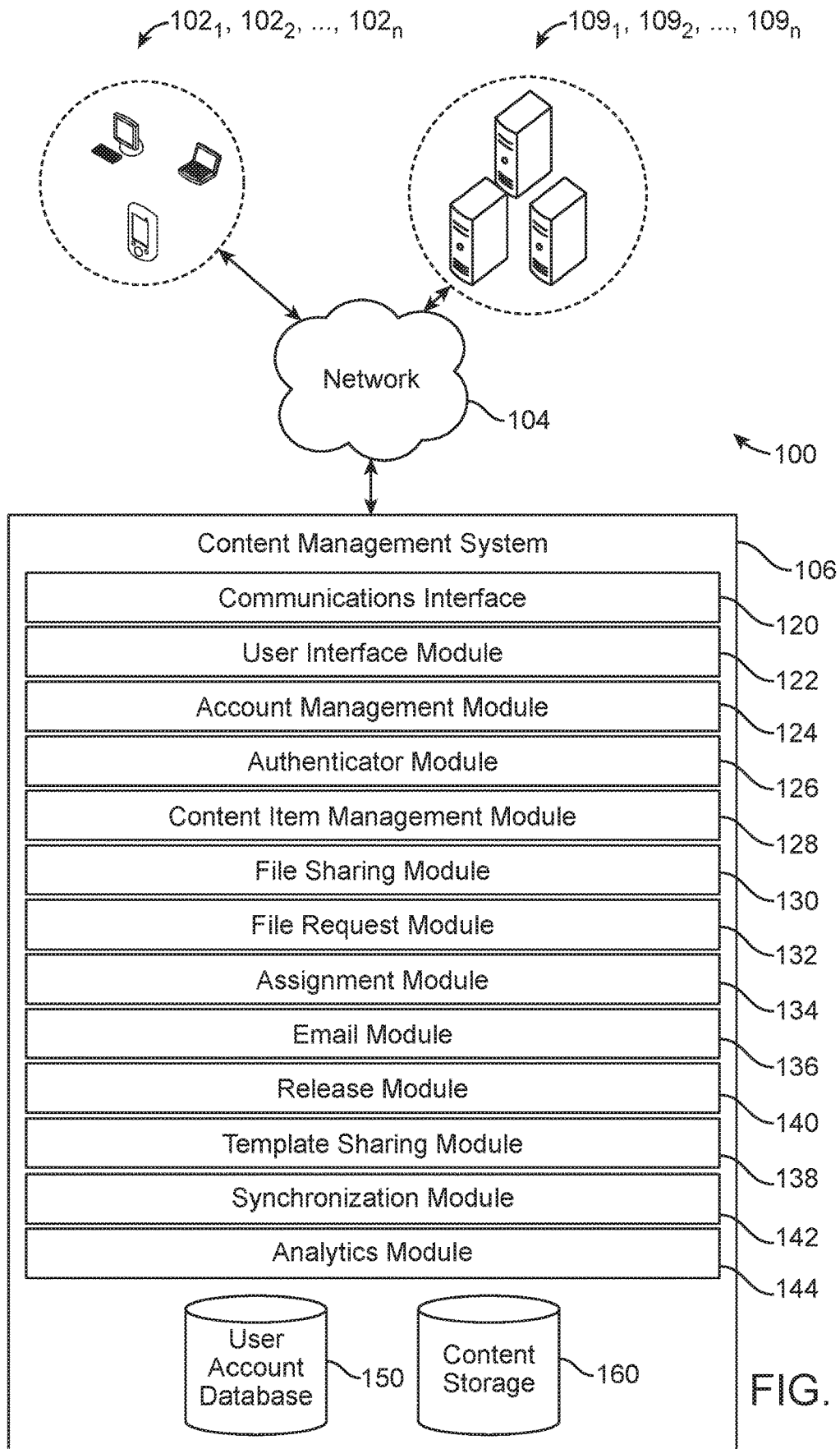
FIG. 1 is block diagram of a configuration of devices and a network in accordance with an exemplary embodiment.

With respect to implementing various embodiments of the disclosed technology, an exemplary system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device 102$_i$ can upload content to content management system 106 via network 104. The content can later be retrieved from content management system 106 using the same client device 102$_i$ or some other client device 102$_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content items, such as digital data, documents, text files, audio files, video files, etc., from one or more client devices 102 authorized on the account. The content items can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. Each of the shared folders or group folders can include one or more recipients associated with the folder. Each of the shared folders or group folders can include an email address for each of the associated recipients. The permissions for multiple users may be different for a shared folder.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device 102$_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content items from one or more client devices 102. The synchronization can be platform agnostic. That is, the content items can be synchronized across multiple client devices 102 of varying type, capabilities, operating systems, etc. For example, client device 102$_i$ can include client software, which synchronizes, via synchronization module 142 at content management system 106, content in client device 102$_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content items that have been updated at content management system 106 and synchronize those changes to the local folder. The client software can provide notifications of synchronization operations, and can provide indications of content statuses directly within the content management application. Sometimes client device 102$_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, content management module 128, file request module 132, assignment module 134, email module 136, release module 140, and analytics module 144. Authenticator module 125 can verify user credentials, security tokens, API calls, specific client devices, and so forth, to ensure only authorized clients and users can access files. Content item management module 128 can store the content items in the content storage 160. The content item management module 128 can include a content directory for identifying the location of each content item stored in content storage 160. File request module 132 can manage the file requests and interactions related to the file requests. Assignment module 134 can manage student submissions and interactions related to the submissions. Email module 136 can manage emailing file requests and notifications related to the file requests. Template sharing module 138 can enable a template sharer to share a file, such as a template file, with one or more recipients. For example, each recipient can receive an email message containing a link encoding a template file identifier and a template instance file can be created in response to the link being acted upon. Alternatively, each recipient can receive a link to a template instance file. When either of the links is acted upon, each recipient is able to access and modify their own template instance file. Release module 140 can manage releases of students' submissions and interactions related to the release of the students' submissions. Analytics module 144 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices $102_1$ of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage. A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

Figure 2A:
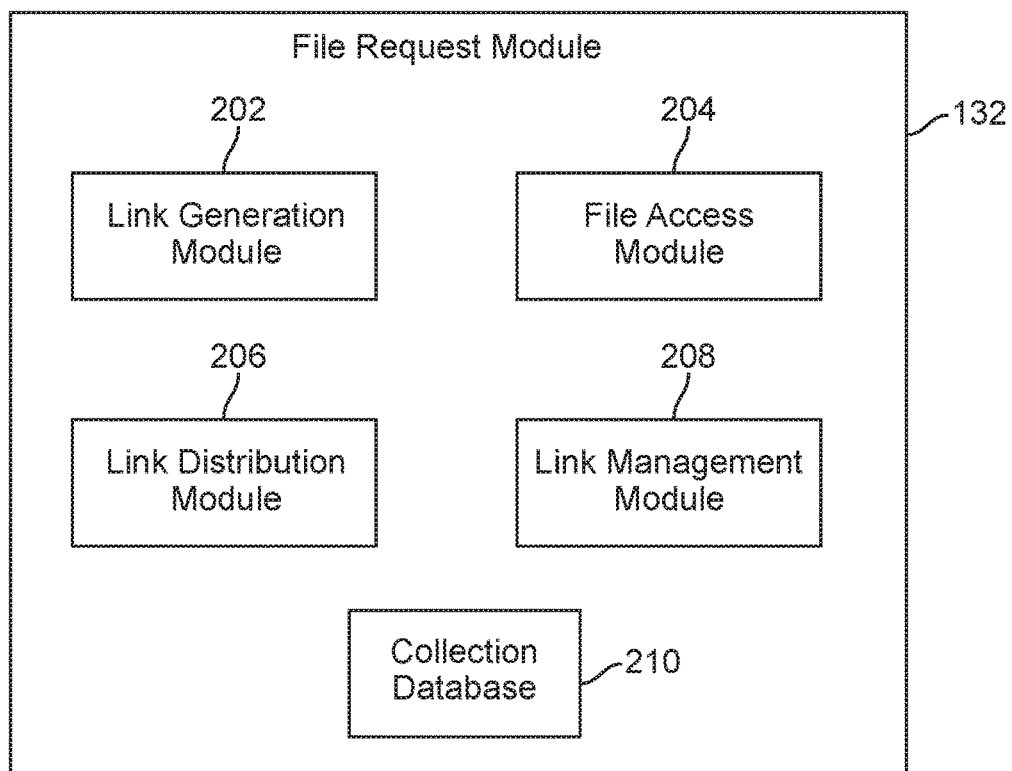
FIG. 2A is a block diagram of a file request module in accordance with an exemplary embodiment.
Figure 2B:
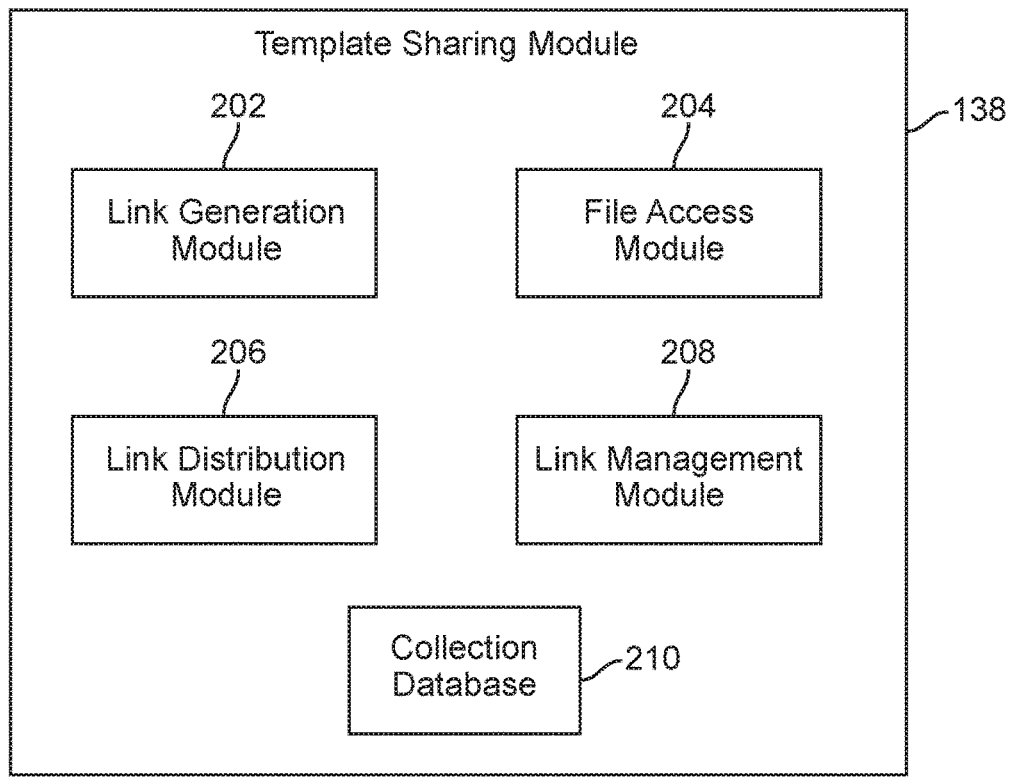
FIG. 2B is a block diagram of a template sharing module in accordance with an exemplary embodiment.

Referring to FIGS. 2A and 2B, block diagrams illustrating the components of file request module 132 and template sharing module 138 in accordance with an exemplary embodiment is illustrated. File request module 132 and template sharing module 138 contain similar modules that perform similar functions with file request module 132 handling file requests for files (e.g., non-template files) and template sharing module 138 handling file requests for template files. File request module 132 and template sharing module 138 enable a teacher to share a file or a template file, with one or more students in which each recipient receives a link. The link can encode a file identifier identifying a read only file or a template file identifier identifying a template file or a template instance file stored in the shared folder. The shared folder can store submissions, e.g., files and/or template instance files for the students and allows each student to modify their files or own template instance file. As a result, a teacher is able to share a read only file (e.g., instructions for an assignment) and/or a single template file (e.g., a test) with one or more students. For template files, the teacher has access to each student's template instance file. As shown, file request module 132 and template sharing module 138 can include a link generation module 202, a file access module 204, a link distribution module 206, a link management module 208 and a collection database 210. The link generation module 202 can generate a link encoding a file identifier (e.g., file link), a template file identifier (e.g., a template file link) or to a template instance file (e.g., a template file instance link) stored in the shared folder. The link distribution module 204 can distribute generated links to the students. The link management module 206 allows a teacher to access the file, template file and each of the template instance files. The link management module 206 allows a student to have access only to the file (e.g., read only file) and/or to a student's template instance file. The collection database 208 can maintain information about a file, template file and each template instance file and related information such as whether a shared folder is activated or deactivated.

Link generation module 202 is configured to generate a file link, template file link and/or template instance file links. In one or more embodiments, upon receiving a share as a template command, the link generation module 202 generates a template instance file, for each designated recipient associated with the shared folder. A unique file set descriptor for the file, template file or the template instance file set, and a unique file location path or URL that serves as the link. File request module 132 and template sharing module 138 saves an association of the file set descriptor and the file location path or URL to collection database 210. In some embodiments, the generated link can be independent of the file set descriptor so that the file set descriptor cannot be inferred from the link, and vice versa. An independent file set descriptor and file location path or URL prevents malfeasance by making it essentially impossible to guess or reverse engineer a sharable link if it is not already known. As an example, when sharing a folder "Homework 1" with a file id of 3D8B99, link generation module 202 might generate a unique (e.g., one-way pad, or a pseudo-random value) URL such as https://www.service.com/s/28rtiz608u2mnco/BBQ.pdf, where the URL component 28rtiz608u2mnco cannot be reverse-engineered, and accordingly create an entry <3D8B99, https://www.service.com/s/28rtiz608u2mnco/BBQ.pdf in collection database 210. In one embodiment, the generated link can further be shortened. In some embodiments, the generated URL https://www.service.com/s/28rtiz608u2mnco/BBQ.pdf can further be shortened using a link-shortening service to a shorter URL (e.g., http://db.tt/xOFounw), and an additional association between the original link and the shortened link can be added to collection database 210. In another embodiment, the file set can be directly associated with the shortened link rather than with an intermediate, longer generated link.

In other embodiments, a teacher can generate multiple different links to the same shared folder or shared folders. For example, the same shared folder can be used for different files and/or template files. In other embodiments, a teacher can deactivate a shared folder or shared folders. By deactivating a shared folder or shared folders, students can no longer upload a file to the shared folder or shared folders. In addition, students are prohibited access to the shared folder or shared folders that are designated as deactivated. Moreover, since a shared folder link is versatile, in some embodiments, the system may include reference to a particular relevant application, or applications, in a link by embedding an application identifier in the generated link. As an example, the generated link for a given shared folder could be the URL https://www.service.com?app=1ps3q/s/28rtiz608u2mnco/BBQ.pdf, which specifies (via the portion "app=1ps3q") that some application uniquely associated with the identifier "1ps3q" (e.g., Microsoft Word or Microsoft Visio) should be used to view a file in the shared folder. Alternatively, the association between the link and the application or application plug-in can be made as an entry in collection database 210, rather than by including an application identifier in the link. For example, in various embodiments, a teacher may generate a first link to a shared folder that specifies use of a first application for viewing a file in the shared folder, and a second link that specifies use of a second application for viewing a file in the shared folder. In this example, the collection database 210 would in turn contain two corresponding entries: i.e., <collection file identifier, first link identifier, first application identifier> and <collection file identifier, second link identifier, second application identifier>. In another embodiment, the link management module 208 may be configured to select the proper applications or application plug-ins to use in the file browser, e.g., based on the types of files in the shared folder. The link management module 208 may also allow teachers to specify which application should open a particular file or set of files when the files are accessed via a particular link.

To share a content item privately, file request module 132 and template sharing module 138 can be configured to add a user account identifier to the content entry associated with the content item, thus granting the added user account access to the content item. File request module 132 and template sharing module 138 can also be configured to remove user account identifiers from a content entry to restrict a user account's access to the content item. In one or more embodiments, the teacher can limit the sharing of a content item in one or more ways. For example, the teacher can limit sharing with students that are: members of an enterprise, students who have an account with the content management system 106, students who have an access password and/or based on an expiration date. An enterprise member is a member who has a user account that is associated with an enterprise account, such as a Dropbox for Business account. An enterprise member can be a student and the enterprise can be a school. Sharing can be limited to only students who have an account with the content management system 106 and prohibit users who do not have an account with the content management system 106. Sharing can be limited to students who enter a password associated with a file, e.g., a read-only file or template file. For example, a teacher can provide each student with a password in person and/or can send an email message containing the password to one or more students. Sharing can be limited based on a deadline. The deadline can be set by the teacher or can be a default deadline set by the content management system 106.

To share content publicly, file request module 132 and template sharing module 138 can be configured to generate a custom network address, such as a uniform resource locator (URL), which allows any web browser to access the content in content management system 106 without any authentication. To accomplish this, file request module 132 and template sharing module 138 can be configured to include content identification data in the generated URL, which can later be used to properly identify and return the requested content item. For example, file request module 132 and/or template sharing module 138 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, file request module 132 and template sharing module 138 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. File request module 132 and template sharing module 138 can be configured to change the value of the flag to 1 or true after generating a URL to the content item.

In some embodiments, file request module 132 and template sharing module 138 can also be configured to deactivate a generated URL. For example, each content entry can also include a URL active flag indicating whether the content should be returned in response to a request from the generated URL. For example, file request module 132 and template sharing module 138 can be configured to only return a content item requested by a generated link if the URL active flag is set to 1 or true. Thus, access to a content item for which a URL has been generated can be easily restricted by changing the value of the URL active flag. This allows a teacher to restrict access to the shared content item without having to move the content item or delete the generated URL. Likewise, file request module 132 and template sharing module 138 can reactivate the URL by again changing the value of the URL active flag to 1 or true. A teacher can thus easily restore access to the content item without the need to generate a new URL.

To share a content item as a template file, template sharing module 138 can be configured to save the template file and each template instance file. The template file and the template instance file can be stored in the content storage 160. In one or more embodiments, the template file is stored in a first database of the collection database 210 and each template instance file is stored in a second database of the collection database 210. Alternatively, the template file and each template instance file is stored in the same database, e.g., collection database 210. In one or more embodiments, each template instance file can be stored in a shared folder. A shared folder can be a folder that allows the teacher to access the template instance files. The shared folder can also provide an indication to identify whether the template instance files were modified.

Files can include metadata or one or more metadata tags, such as a file identifier and an owner identifier. Template files can also include template metadata or one or more template metadata tags, such as, a template name a template file identifier. The file identifier, e.g., a file id, can be a unique identifier assigned to the file or template file. The template name, e.g., a template file name, can be a format for naming each of the template instance files. The owner identifier, e.g., ownerid, can be an identifier that identifies the owner or creator of the template file. The template file identifier, e.g., fileid, can be a unique template file identifier that identifies the template file.

For each template instance file, the template instance file can include template instance metadata. The template metadata can include a template identifier, a student identifier and a template file identifier. The template identifier, e.g., a template id, can be a unique identifier assigned to the template instance file. The student identifier, e.g., userid, can be a unique identifier identifying the student associated with the template instance file. The template file identifier, e.g., template fileId, can be a unique identifier assigned to the template instance file after the template instance file has been modified.

To share a file, file request module 132 and template sharing module 138 can be configured to generate a custom network address for a shared folder, file or for each template instance file, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, file request module 132 and template sharing module 138 can be configured to include a user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, file request module 132 and template sharing module 138 can also be configured to record that a URL to the shared folder, file and/or to the content item has been created for each template instance file. In some embodiments, the content entry associated with a content item can include a URL flag indicating whether a URL to the shared folder and/or to the content item has been created. For example, the URL flag can be a Boolean value initially set to 0 or false to indicate that a URL to the shared folder and/or content item has not been created. File request module 132 and template sharing module 138 can be configured to change the value of the flag to 1 or true after generating a URL to the shared folder, file and/or content item.

In some embodiments, file request module 132 and template sharing module 138 can also be configured to deactivate a generated URL. For example, each shared folder, file and/or template instance file can also include a URL active flag indicating whether the content instance file should be returned in response to a request from the generated URL. For example, template sharing module 138 can be configured to only return a template instance file requested by a generated link if the URL active flag is set to 1 or true. Thus, access to a file or template instance file for which a URL has been generated can be easily restricted by changing the value of the URL active flag. This allows a teacher to restrict access to the shared folder, file and/or template instance files without having to move the shared folder, file and/or template instance file, or delete the generated URL. Likewise, file request module 132 and template sharing module 138 can reactivate the URL by again changing the value of the URL active flag to 1 or true. A teacher can thus easily restore access to the shared folder, file and/or content instance file without the need to generate a new URL.

Example User Experience

Figure 3:
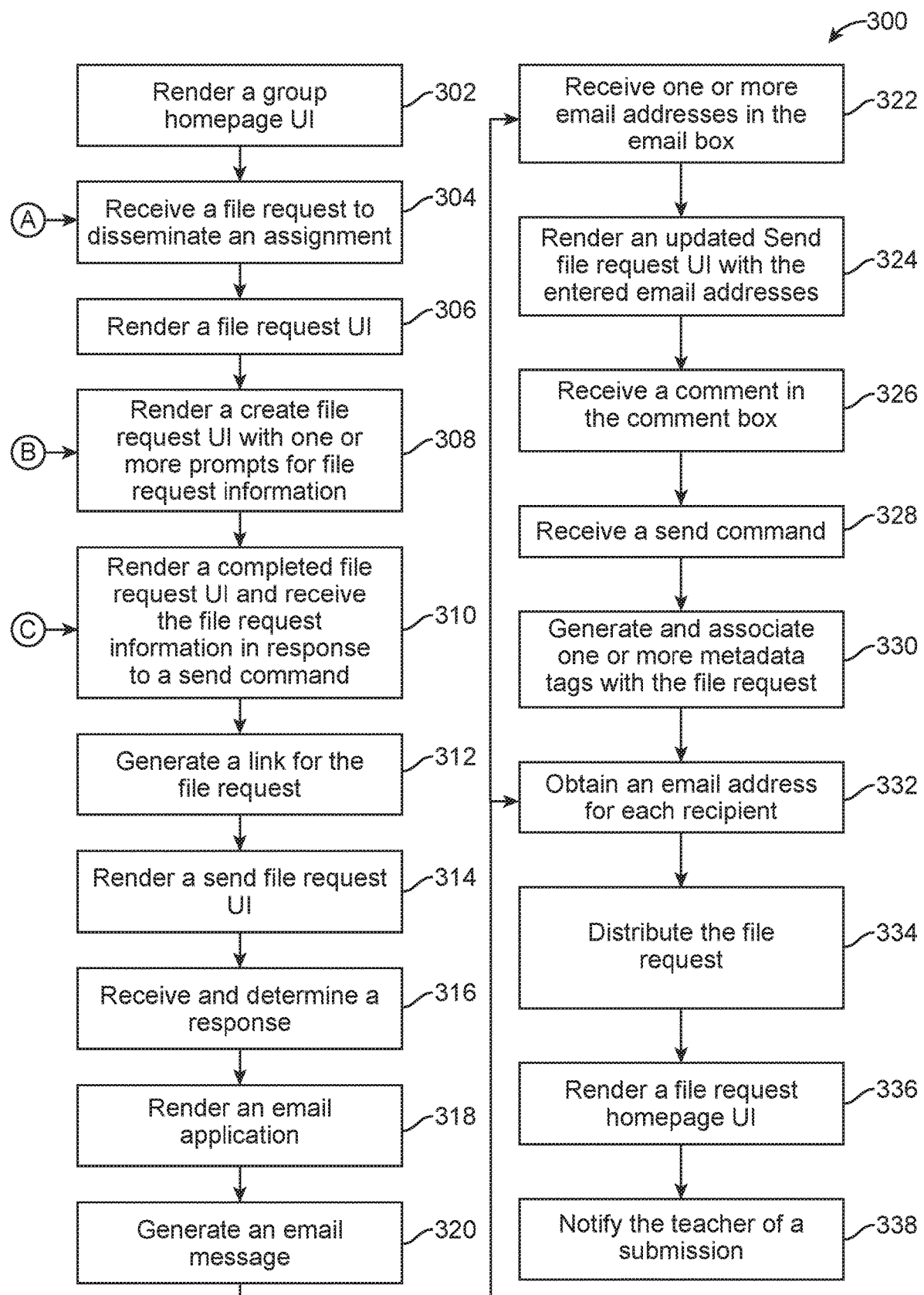
FIG. 3 is a flow diagram of a method for sharing an assignment in accordance with an exemplary embodiment.

Referring to FIG. 3, a flow diagram for sharing an assignment in accordance with an exemplary embodiment is illustrated. The exemplary method 300 is provided by way of example, as there are a variety of ways to carry out the method. The method 300 described below can be carried out using the configurations illustrated in FIG. 1 by way of example, and various elements of this figure are referenced in explaining exemplary method 300. Each block shown in FIG. 3 represents one or more processes, methods or subroutines, carried out in the exemplary method 300. The exemplary method 300 is described with respect to an application operating on a client device 102$_i$. However, one of ordinary skill in the art would recognize that the method 300 can be performed via a browser on a client device 102$_i$ as known in the art. The exemplary method 300 can begin at block 302.

Figure 4:
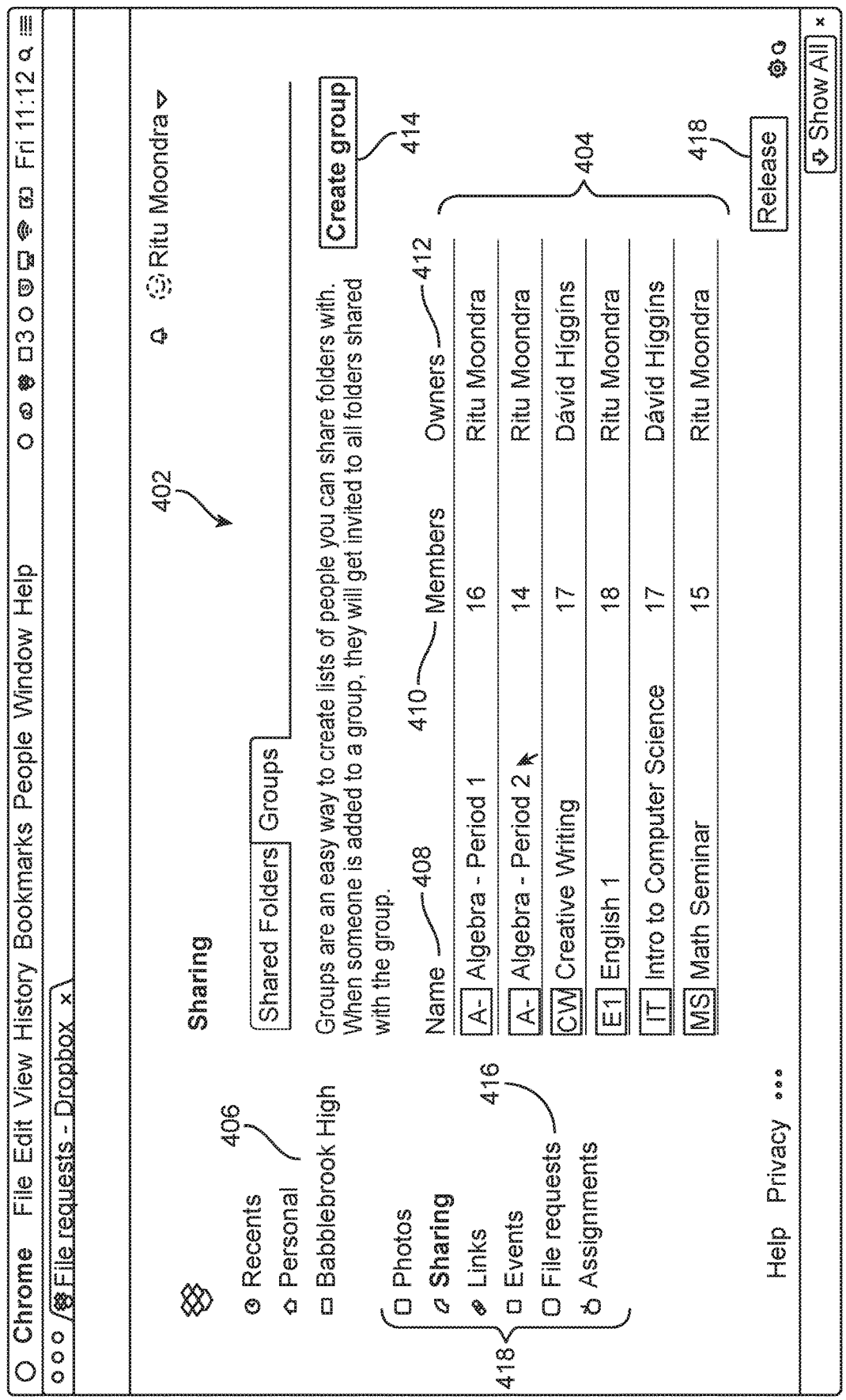
FIG. 4 is a group homepage user interface (UI) for viewing groups and shared folders in accordance with an exemplary embodiment.

At block 302, render a group homepage user interface (UI) or dashboard. For example, content management system renders a group homepage UI which lists one or more groups associated with an entity, such as a school. FIG. 4 shows a group homepage UI 402 which list six different groups 404 associated with a school, e.g., Babblebrook High School 406. As shown, six groups 404 are Algebra Period 1, Algebra Period 2, Creative Writing, English 1, Intro to Computer Science and Math Seminar. Each listing identifies the group 408, number of members 410 and owner of the group 412. The identified group is the name associated with the group and can be set when the group is formed. The members are the members/users who can access a shared folder. Members can be students, parents, and/or guardians. An owner can be an administrator, teacher and/or student. An owner can share content items with the members of a group. Groups provide a means to share folders and/or assignments with the entire group. The owner can specify whether a group should have edit access or view-only access. An owner can add a member to the group and the new member is automatically added to all shared folders for that group. In an exemplary embodiment, Algebra Period 1 has sixteen members and Ritu Moondra is the owner of the group. A teacher or administrator can create a group by selecting Create group button 414. If a teacher selects file requests menu option 416 rendered in side menu 418, method 300 can proceed to block 304.

Figure 5:
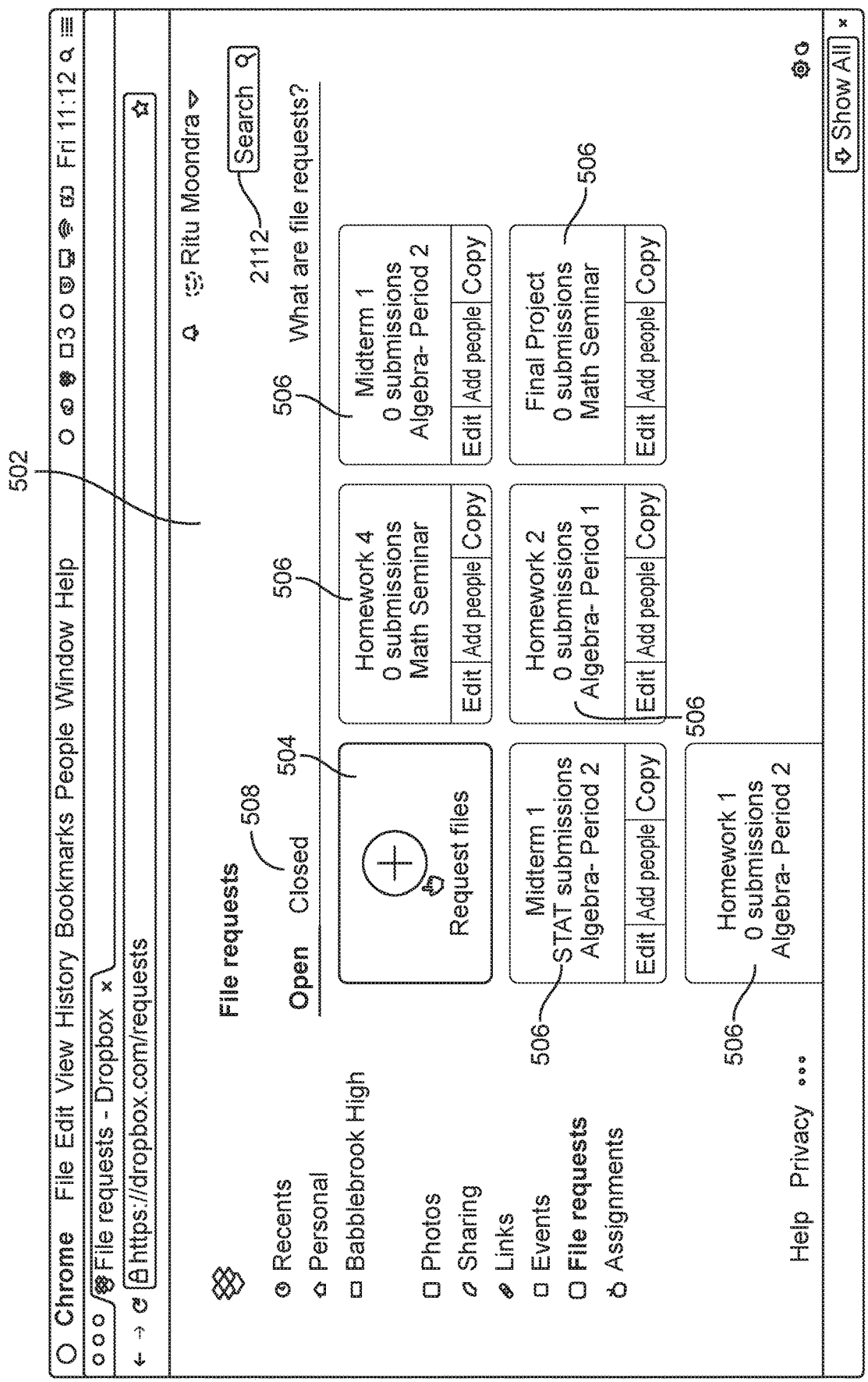
FIG. 5 is a file request UI rendering existing file requests and a file requests file icon to create a file request in accordance with an exemplary embodiment.

At block 304, receive a file request to disseminate or distribute an assignment. For example, content management system 106 and/or file request module 132 receives a file request to disseminate or distribute an assignment to one or more students. Once created, content management system 106 and/or file request module 132 can collect and monitor assignment statuses once the assignment is disseminated or distributed to the one or more students. FIG. 4 shows a file group homepage user interface (UI) 402, rendered on a client device $102_i$, which allows a teacher to select a file request menu option 416 that is displayed in side menu 418. In response to the selection of the file request menu option 416 from the side menu 418, file request UI 502 in FIG. 5 is rendered on client device $102_i$. After receiving a file request selection, method 300 can proceed to block 306.

At block 306, render a file request UI. For example, content management system 106 and/or file request module 132 causes the rendering of a file request UI on client device $102_i$. FIG. 5 shows a file request UI 502, rendered on client device $102_i$, which allows a teacher to send a file request. To create a file request, the user can select the Request files icon 504 as shown in the file request UI 502. As shown, the file request UI 502 displays the Request files icons 504 along with file request icons 506 for previous file requests. If there are no previous file requests, then only the Request files icon 504 is rendered. As shown, only open file request are shown. To view closed file requests, a teacher can select closed icon 508. After receiving a file request selection, method 300 can proceed to block 308.

Figure 6:
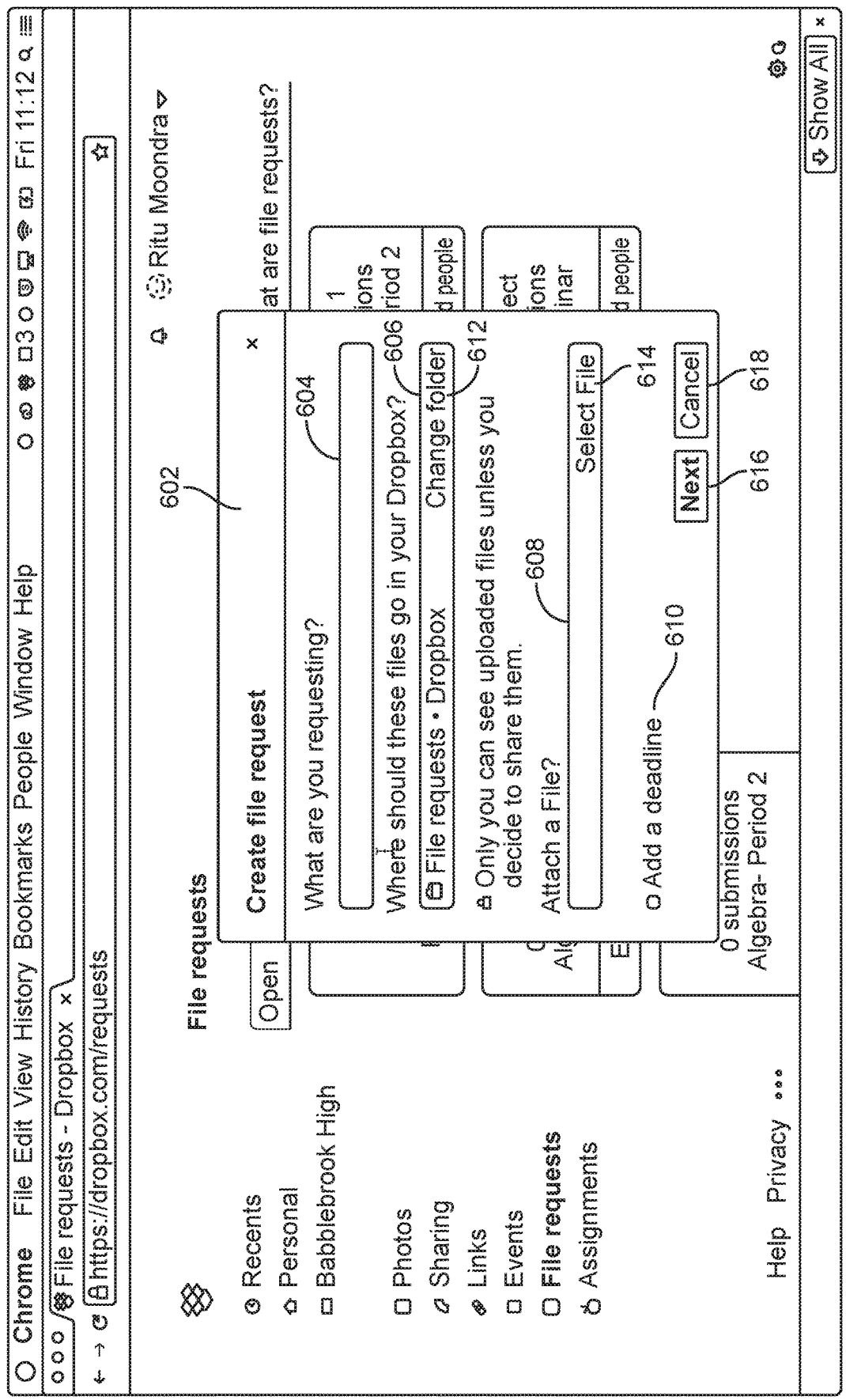
FIG. 6 is a create file request UI rendering prompts to create a file request in accordance with an exemplary embodiment.

At block 308, render a create file request UI with one or more prompts for file request information. The prompts can request information, which includes a name for the file request, a collection identifier, a file and a deadline. FIG. 6 shows a create file request UI 602, rendered on client device $102_i$, which allows a teacher to respond to the prompts for file request information. The prompts can include name of the file request prompt 604, a collection identifier prompt 606, a file prompt 608 and add a deadline 610. The name of the file request prompt 604 can be, "What are you requesting?" The response to this prompt can be the title of the file request. The collection identifier prompt 606 can be, "Where should these files go in your Dropbox?" The response to this prompt can identify where the submissions will be stored in the teacher's account. As shown, a default location of File requests is displayed. The teacher can change the location where the submissions will be stored. For example, the teacher can select the "Change folder" button 612 to change the location of where the responses will be stored. By using one or more metadata tags, as discussed below, the submissions can be stored in a collection folder associated with the file request or elsewhere. The file prompt 608 can be, "Attach a file?" The response to this prompt can identify a file to be shared with the students. The teacher can select a file as known in the art. For example, the teacher can select the "Select File" button 614 to select a file to be shared with the students. As explained below in more detail, the shared file can be a template file which allows students to receive their own template instance file that the student can modify and save. As a result, each student can modify their own template instance file. An "Add a deadline" button 610 allows a teacher to set a deadline for students to submit their responses to the assignment. After rendering the one or more prompts, method 300 can proceed to block 310.

Figure 7:
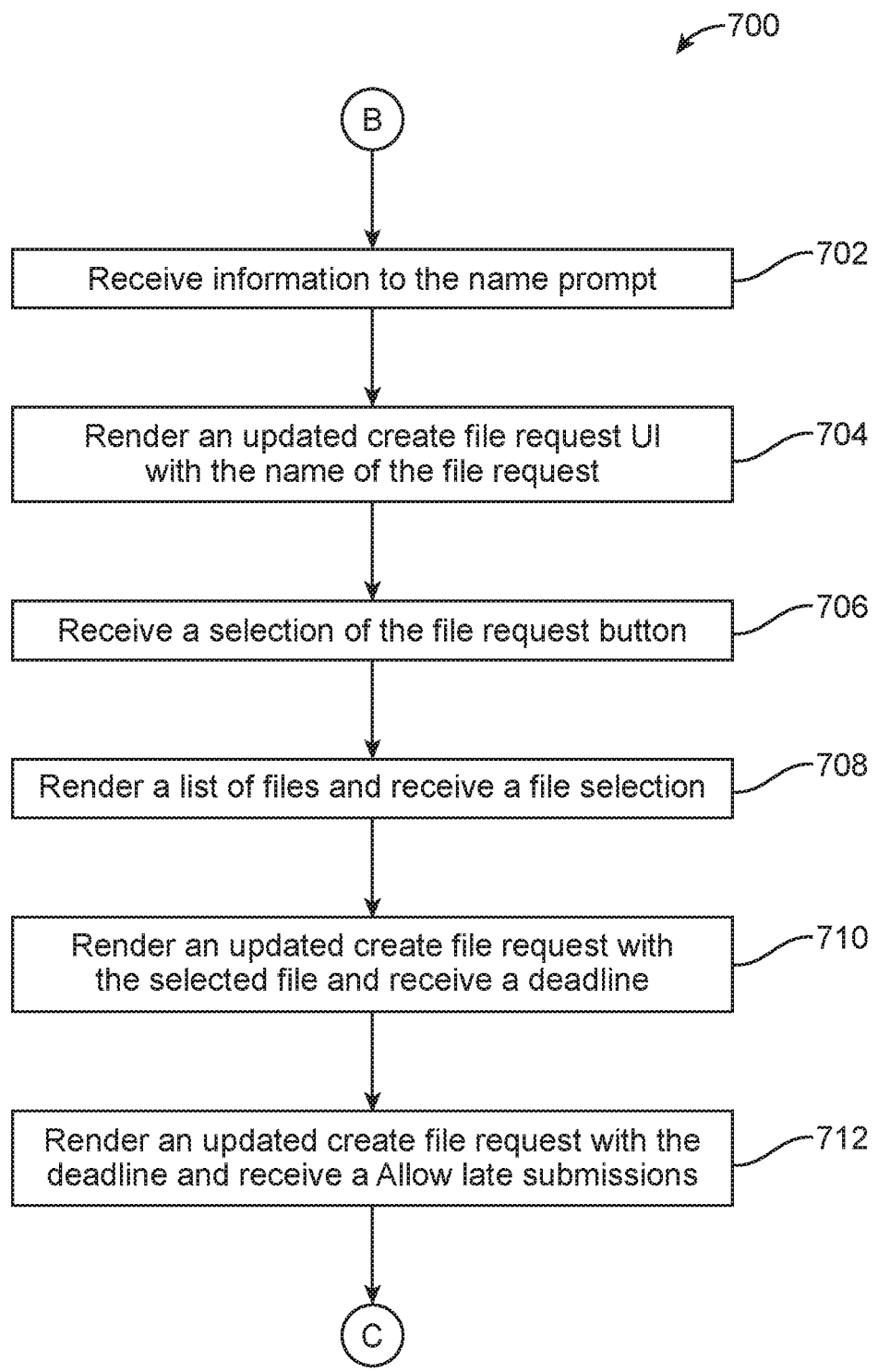
FIG. 7 is a flowchart of a method for generating a file request in accordance with an exemplary embodiment.

Referring to FIG. 7, a flow diagram for creating a file request in accordance with an exemplary embodiment is illustrated. The exemplary method 700 is provided by way of example, as there are a variety of ways to carry out the method. The method 700 described below can be carried out using the configurations illustrated in FIG. 1 by way of example, and various elements of this figure are referenced in explaining exemplary method 700. Each block shown in FIG. 7 represents one or more processes, methods or subroutines, carried out in the exemplary method 700. The exemplary method 700 is described with respect to an application operating on a client device $102_i$. However, one of ordinary skill in the art would recognize that the method 700 can be performed via a browser on a client device $102_i$ as known in the art. The exemplary method 700 can begin at block 702.

At block 702, receive information to the name prompt. For example, content management system 106 and/or file request module 132 receives a response to the name prompt 604. For example, the teacher can enter, "Homework 5" in response to the name prompt 604. After receiving information to the name prompt, method 700 can proceed to block 704.

Figure 8:
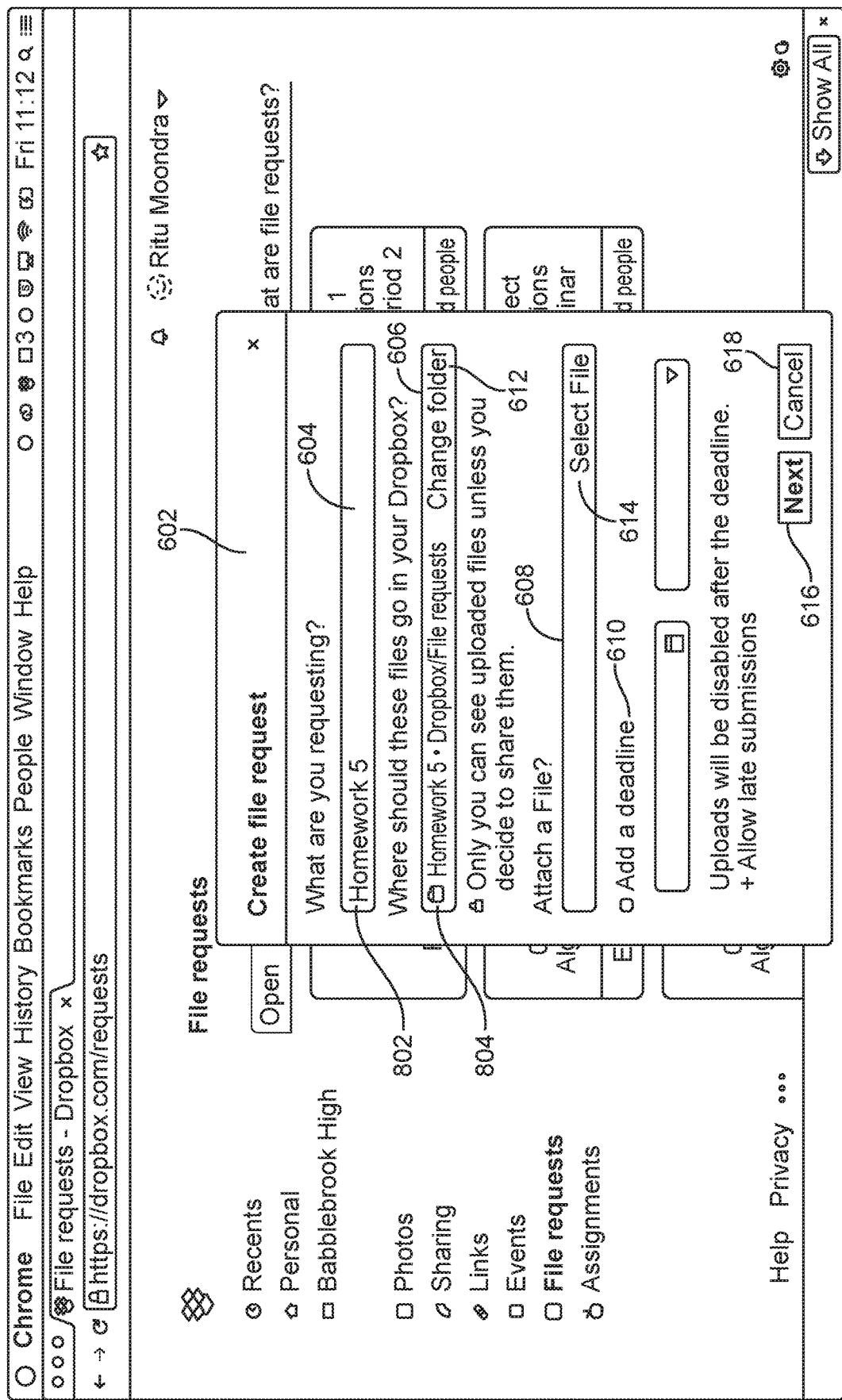
FIG. 8 is an updated create file request UI rendering a file request name in accordance with an exemplary embodiment.

At block 704, render an updated create file request UI with the name of the file request. For example, content management system 106 and/or file request module 132 causes an updated create file request UI to be rendered on client device $102_i$ in response to the information received to the name prompt. FIG. 8 shows an updated create file request UI 602 with the name of the file request, "Homework 5" 802. The updated create file request UI 602 can include a location for receiving submission in response to the file request. The location can be a collection folder, "Homework 5" 804. The collection folder can be named at least partially in response to the received information to the name prompt 604. The teacher can change the collection folder 606 by selecting Change folder icon 612. After rendering the updated create file request UI, method 700 can proceed to block 706.

At block 706, receive a selection of the file request button. For example, content management system 106 and/or file request module 132 receives a select of the Select File button 614. In response to receiving the selection of the file request button 614, method 700 can proceed to block 708.

Figure 9:
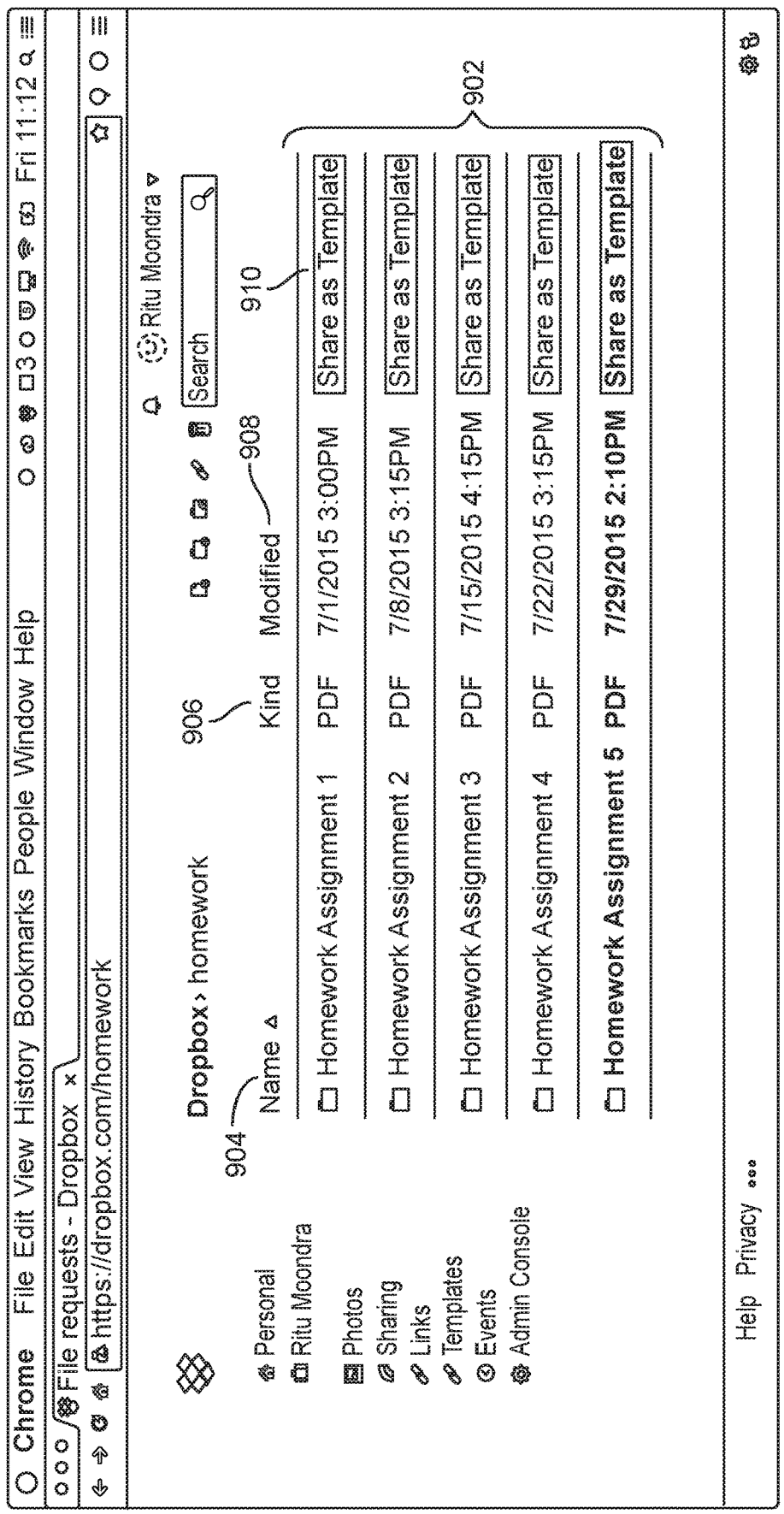
FIG. 9 is a UI rendering a list of files to add to a file request in accordance with an exemplary embodiment.

At block 708, render a list of files and receive a file selection. For example, content management system 106 and/or file request module 132 causes the rendering of a file listing UI displaying a list of files on client device $102_i$. FIG. 9 shows a list of files 902 that can be included in the file request. As known in the art, the teacher can navigate to one or more lists of files 902 and select one or more files to be included in the file request. As shown, there are five files listed with each including a file name 904, kind or type of file 906, modification date 908 and a Share as Template button 910. The teacher can select a file or can select Share as Template button 910. To select a file, a teacher can select the name of the file, e.g., Homework Assignment 5. To select a file as a template, the teacher can select Share as Template button 910. As explained below, if the teacher selects the Share as Template button 910, each student can receive their own template instance file of the selected file as described in U.S. patent application Ser. No. 14/961,094, which is incorporated herein in its entirety. After rendering the list of files and receiving a selection, method 700 can proceed to block 710.

Figure 10:
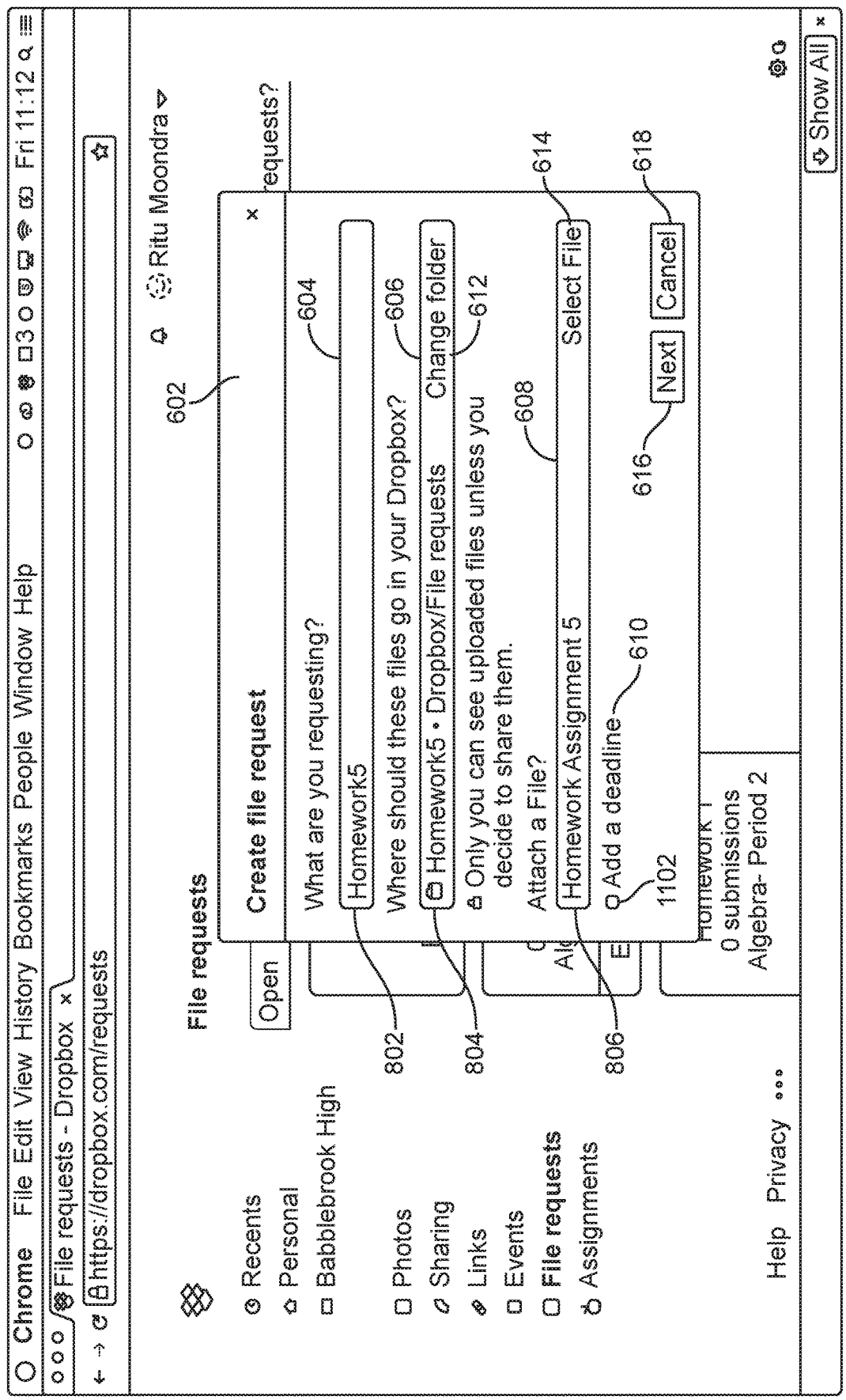
FIG. 10 is an updated create file request UI rendering a file name in accordance with an exemplary embodiment.
Figure 11:
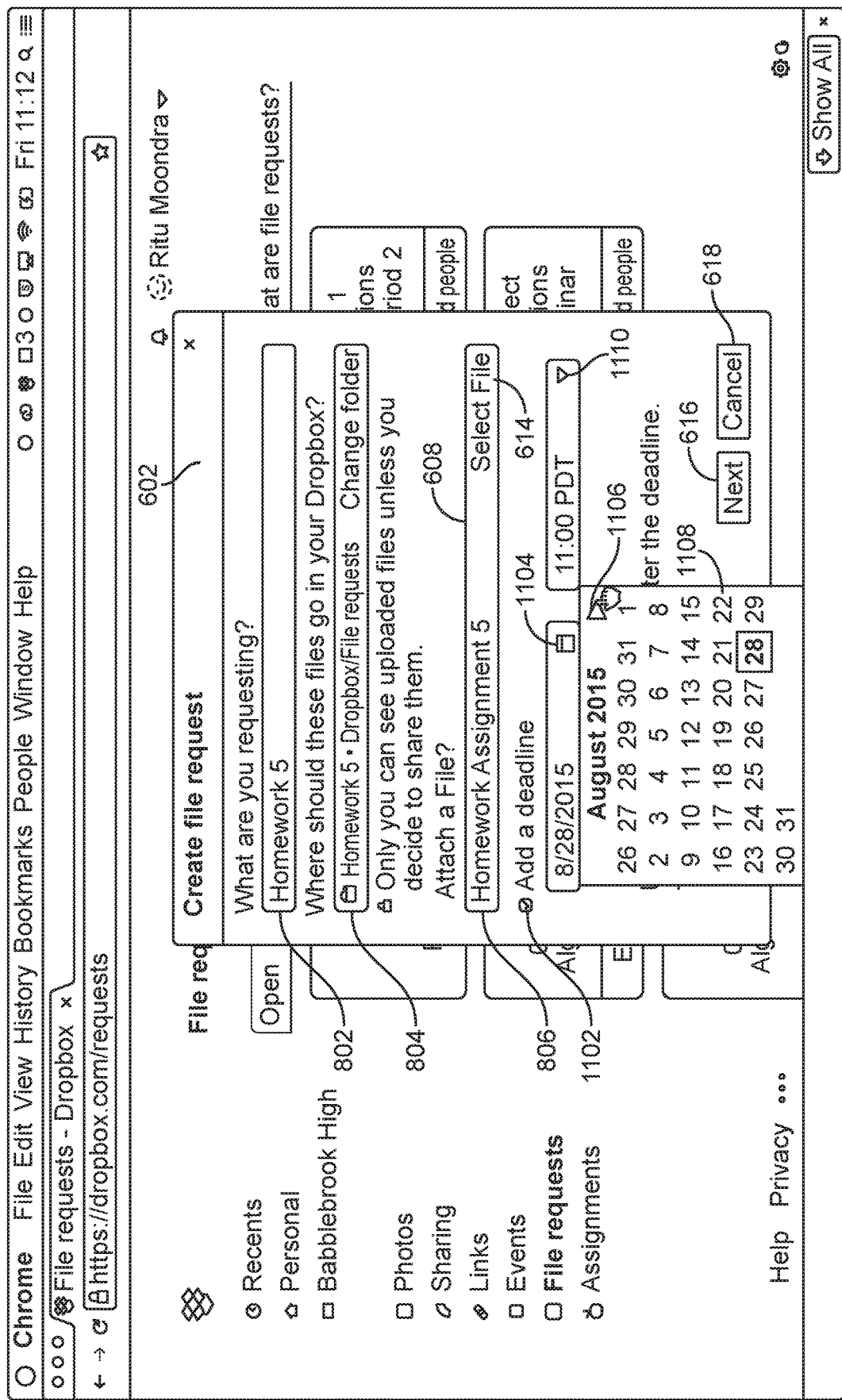
FIG. 11 is an updated create file request UI rendering a calendar for a deadline date in accordance with an exemplary embodiment.
Figure 12:
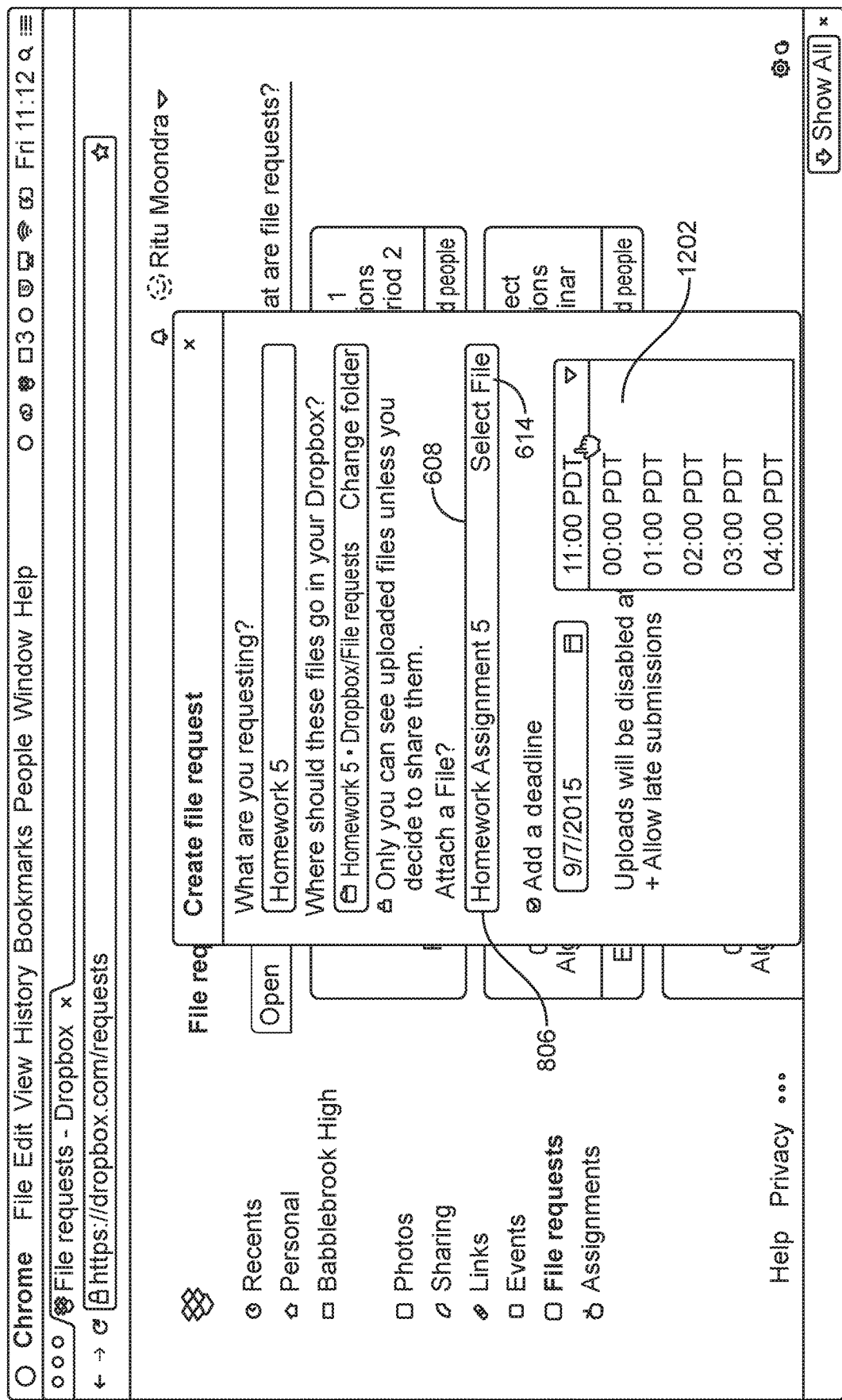
FIG. 12 is an updated create file request UI rendering a scrollable time deadline for a deadline time in accordance with an exemplary embodiment.

At block 710, render an updated create file request with the selected file and receive a deadline. The deadline can be optional. For example, content management system 106 and/or file request module 132 causes the rendering of an updated create file request with the selected file on client device 102$_i$. FIG. 10 shows an updated file request UI 602 with a selected file, Homework Assignment 5 806 being rendered on client device 102$_i$. In response to the teacher selecting Add a deadline button 1102, a default deadline can be rendered. FIG. 11 shows a create file request UI 602 with a default deadline being rendered on client device 102$_i$. As shown, the deadline is Aug. 28, 2015 at 11:00 PDT. If the teacher selects calendar icon 1104, a calendar 1108 is rendered which allows the teacher to select a deadline date. As known in the art, the teacher can select next month icon 1106 to see the next calendar, e.g., September 2015. After selecting a deadline date, e.g., Sep. 7, 2015, the teacher can change the deadline time by selecting time icon 1110. If the teacher selects time icon 1110, a scrollable listing of times 1202 is rendered on client device 102 as shown in FIG. 12. For example, the teacher can select 08:00 PDT. After receiving a deadline, method 700 can proceed to block 712.

Figure 13:
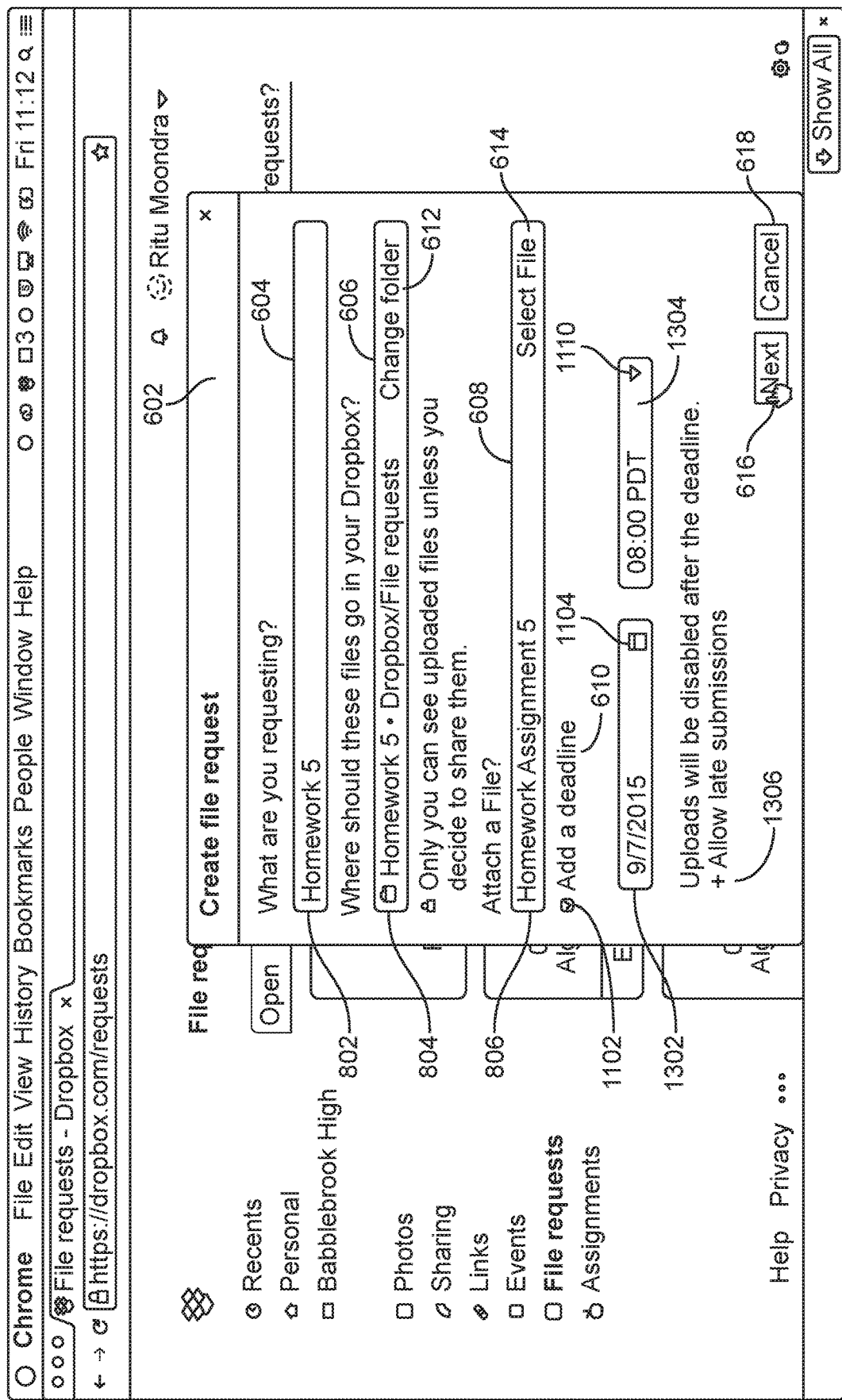
FIG. 13 is an updated create file request UI rendering a deadline in accordance with an exemplary embodiment.
Figure 14:
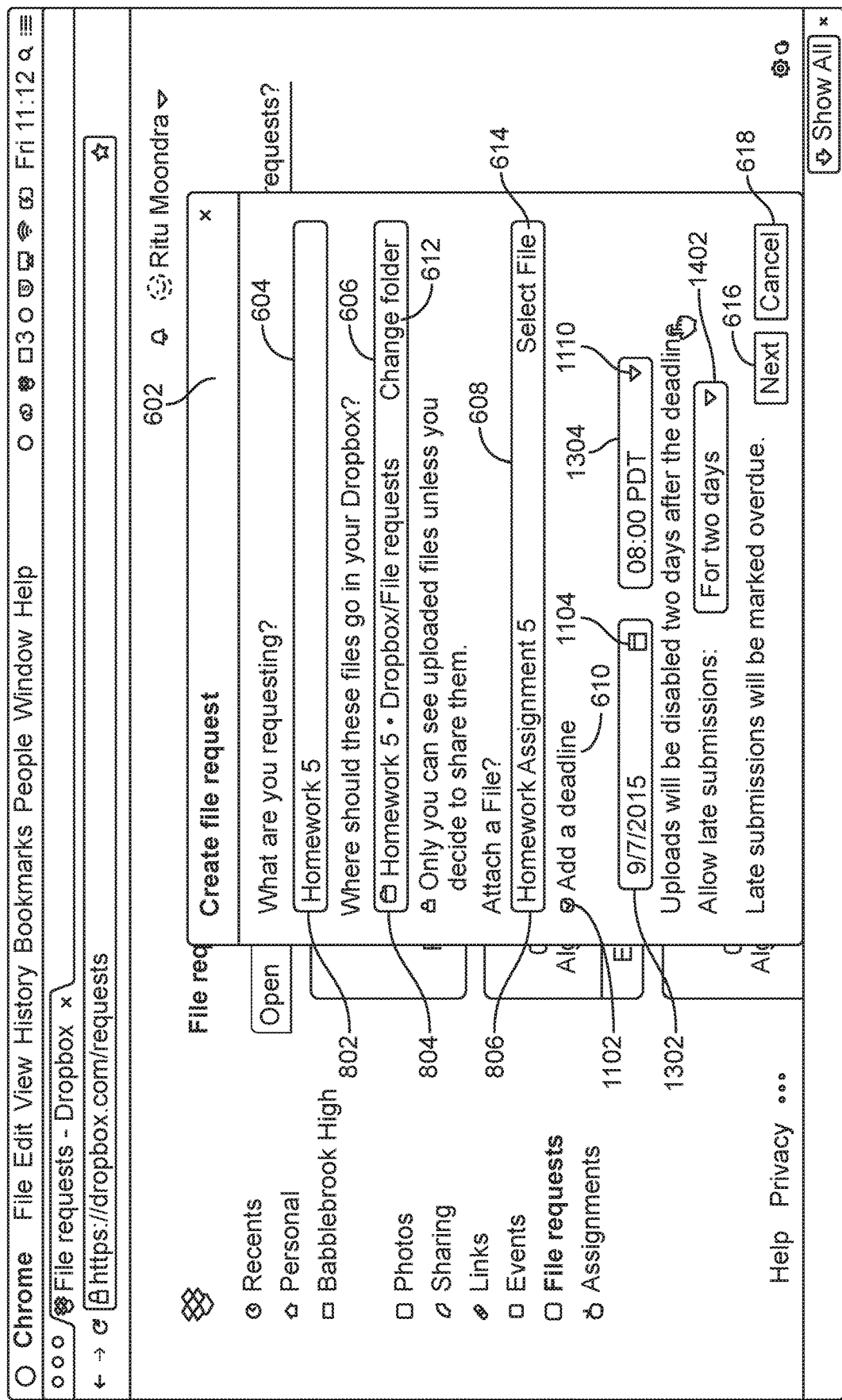
FIG. 14 is an updated create file request UI rendering a default late submission deadline in accordance with an exemplary embodiment.
Figure 15:
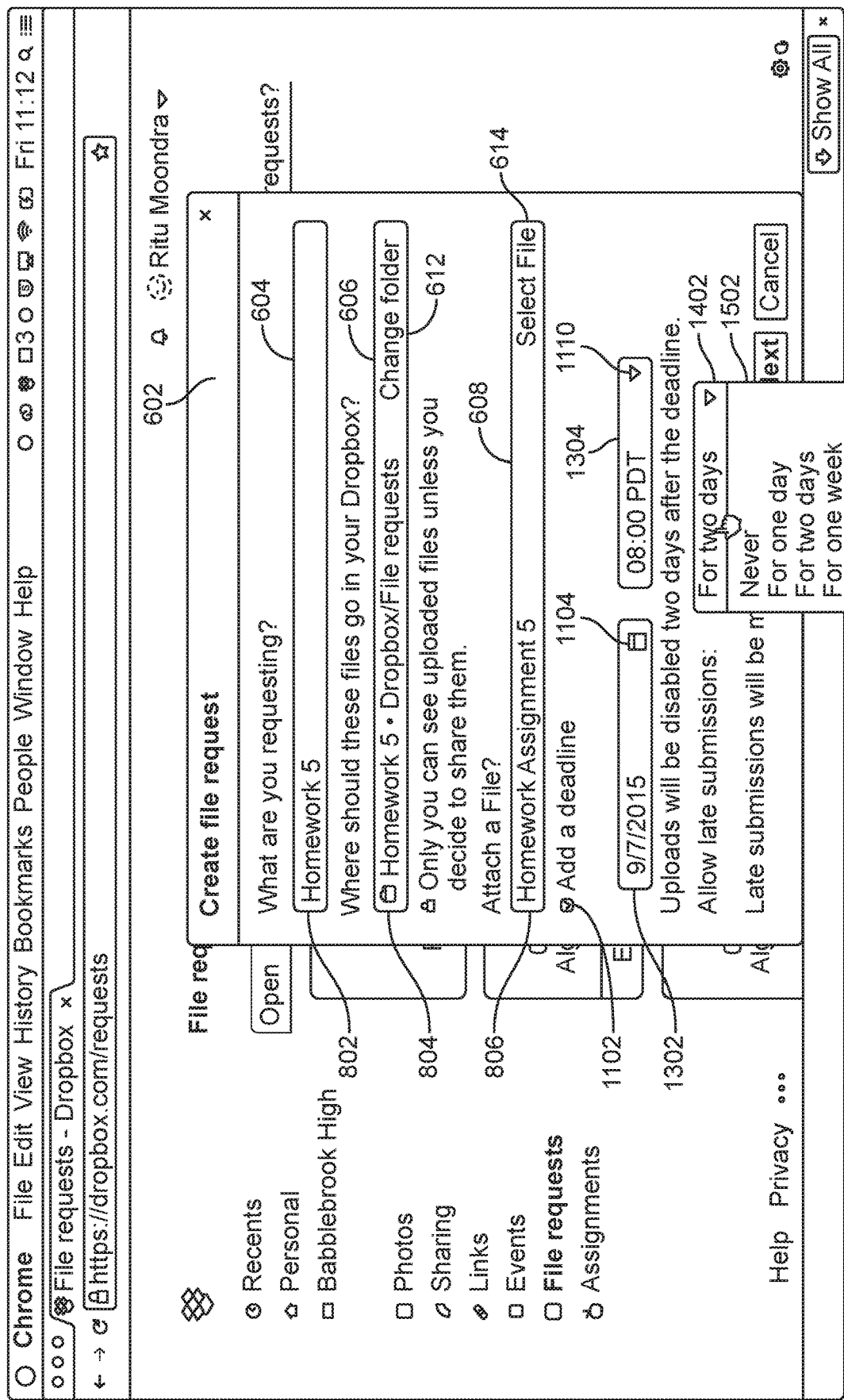
FIG. 15 is an updated create file request UI rendering a late submission scrollable menu in accordance with an exemplary embodiment.

At block 714, render an updated create file request with the deadline and receive an Allow late submissions selection. Allowing late submissions can be optional. For example, content management system 106 and/or file request module 132 causes the rendering of an updated create file request with the deadline on client device 102$_i$. FIG. 13 shows a create file request UI 602 with a deadline being rendered on client device 102$_i$. As shown, the deadline is Sep. 7, 2015 1302 at 08:00 PDT 1304. In response to the teacher selecting Allow late submissions icon 1306, a default late submission deadline is rendered on client device 102$_i$. FIG. 14 shows a create file request UI 602 with a default late submission deadline of For two days 1402 being rendered. In response to the teacher selecting a late submission icon 1402, a scrollable list of late submission times 1502 can be rendered on client device 102 as shown in FIG. 15. As shown, in an exemplary embodiment, the late submission times can be Never, For one day, For two days and For one week. The teacher can select a late submission time from the rendered list. For example, the teacher can select For one day. In one or more embodiments, the late submission time can be a date that the teacher sets. For example, the teacher can set a late submission time in a similar manner as setting the deadline. After receiving a late submission time, method 700 can proceed to block 310 of FIG. 3.

Figure 16:
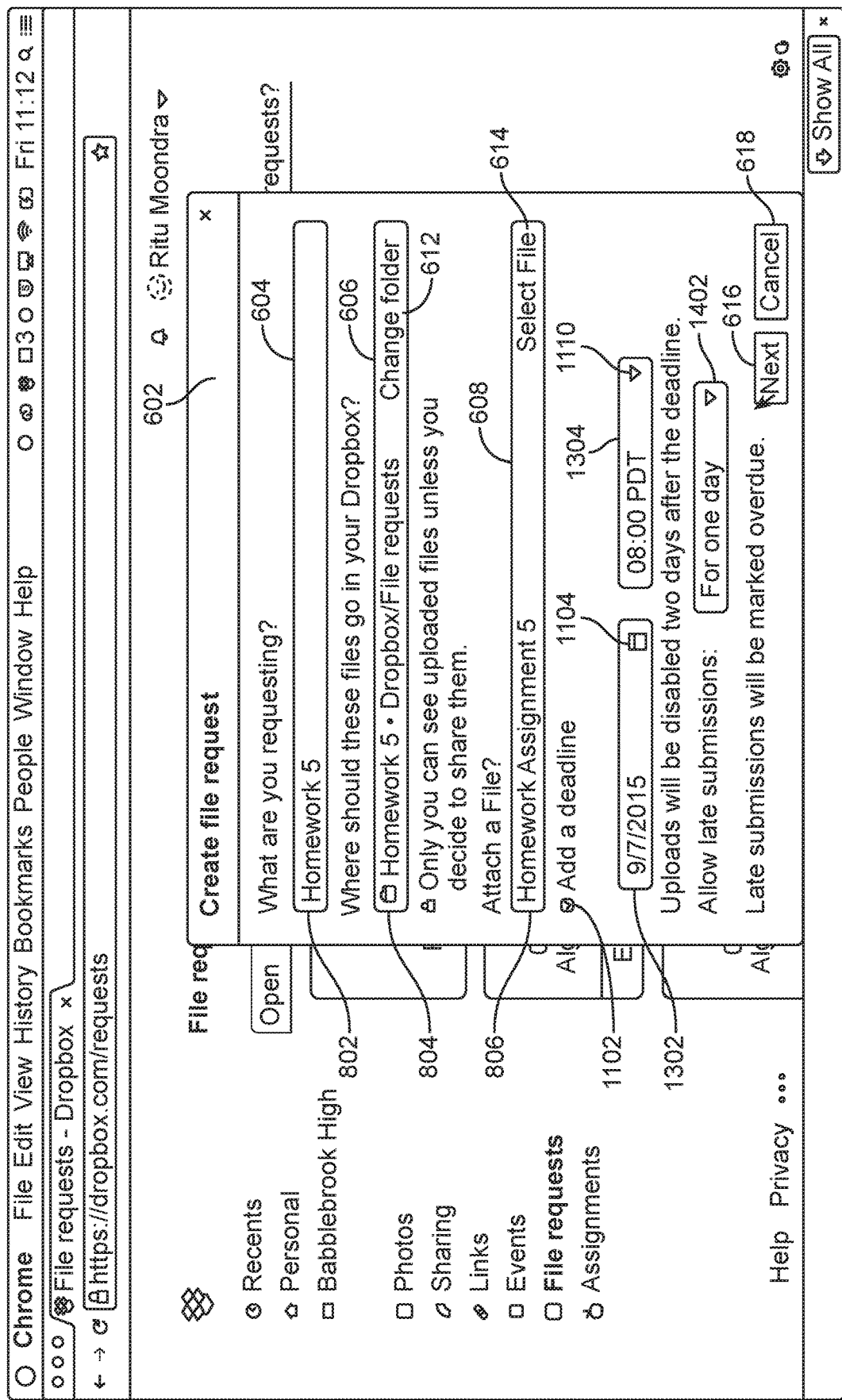
FIG. 16 is a updated create file request UI rendering a filled-in file request in accordance with an exemplary embodiment.

Referring to FIG. 3 again, at block 310, render a completed file request UI and receive the file request information in response to a send command. For example, content management system 106 and/or file request module 132 receives the file request information associated with the prompts in response to a user selecting a send command. FIG. 16 shows a filled-in file request UI 602. As shown in this example, the file request is for Homework 5 802, the collection folder is Homework 5 804, the deadline date is Sep. 7, 2015 1302 with 08:00 PDT 1304 as the deadline time and late submissions can be received up to one day 1402 late. The teacher can edit the file request information. In response to the teacher selecting the Next button 616, the information can be provided to content management system 106 and/or file request module 132 and method 300 can proceed to block 312. The teacher can cancel the file request by selecting Cancel button 618.

At block 312, generate a link for the file request. For example, content management system 106, file request module 132 and/or template module 138 generates a link for the file request. For example, the link generation module 202 generates a collection link to a designated collection folder using at least some of the information received from the prompts, e.g., where the teacher would like the uploaded files to be stored. If the designated collection folder does not exist, the link generation module 202 can create the collection folder. The link can be the path to collection folder as described earlier. If the selected file is a template file, e.g., a file that was shared when the Share as Template button 910 was selected, the generated link encodes a template file identifier. For example, link generation module 202 encodes a template file identifier identifying the template file as a link. The link generation module 202 can store the generated collection link and the information associated with the link, e.g., the name, the collection folder, deadline, late submission, teacher identifier, school identifier, term identifier, file identifier, template identifier, etc. The generated collection link can be stored in one or more locations. For example, the generated collection link can be associated with the collection and stored in the content storage 160 and/or in an activity log. After generating a link for the file request, method 300 can proceed to block 314.

Figure 17:
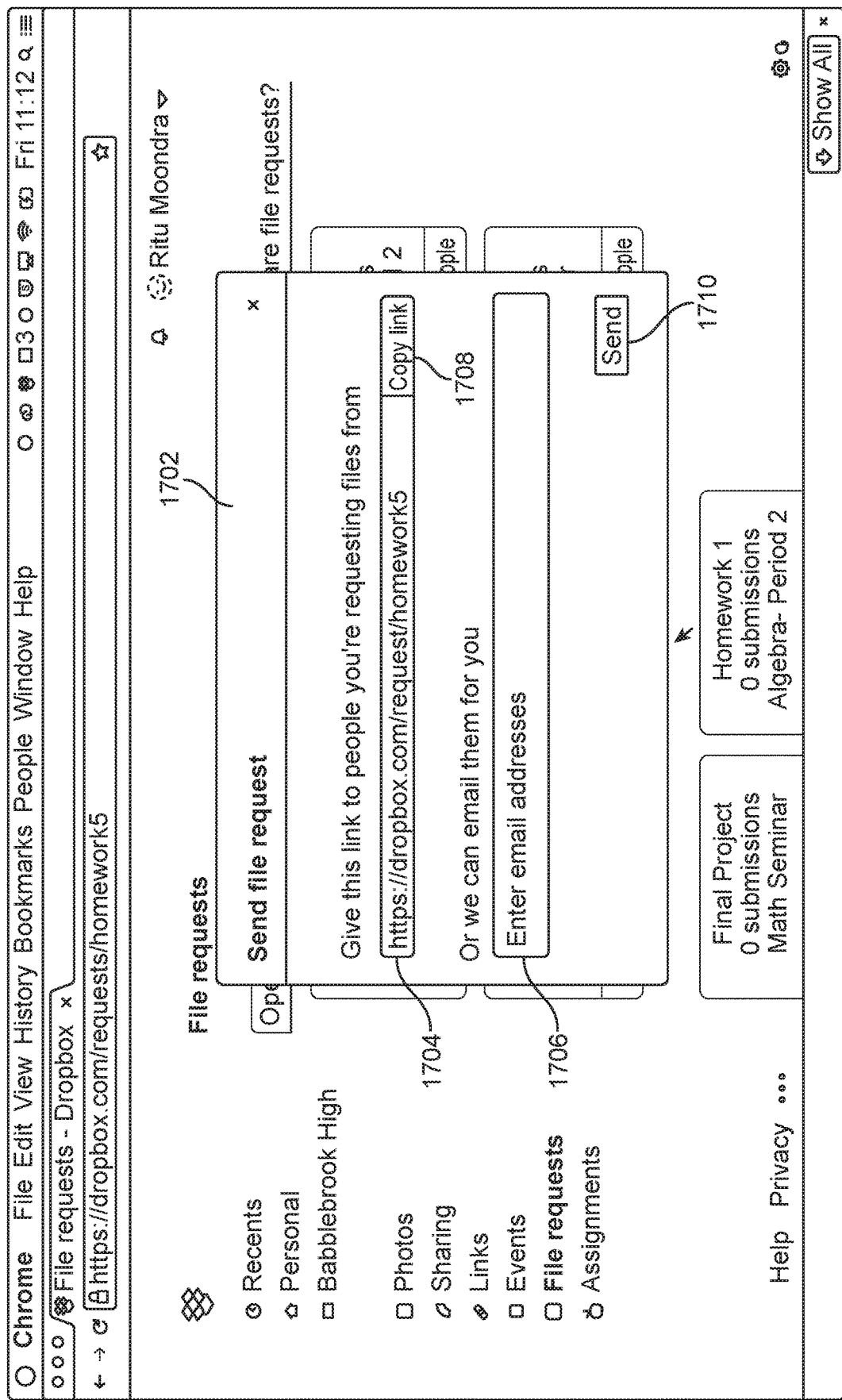
FIG. 17 is a send file request UI rendering prompts to send a file request in accordance with an exemplary embodiment.

At block 314, render a send file request UI. For example, content management system 106 and/or file request module 132 causes the rendering of the send file request UI on client device 102$_i$. FIG. 17 shows a send file request UI 1702 displaying the generated link: https://dropbox.com/request/Homework5 1704, a prompt to email the generated link 1706 and Send button 1710. The teacher can copy the generated link by selecting Copy link button 1708. By selecting Copy link button 1708, the teacher can email the link via an email application. By selecting email box 1706, the teacher can enter one or more email addresses to have the file request sent via email. The teacher can enter a group name, e.g., Algebra—Period 2 to have the file request associated with the group. After rendering the send file request UI, method 300 can proceed to block 316.

At block 316, receive and determine a response. For example, content management system 106 and/or file request module 132 receives a response from the teacher and determines what the response is. The response can be a selection of Copy link button 1708 or selecting email box 1706. If the teacher selects Copy link button 1708, method 300 can proceed to block 318. If the teacher selects email box 1706, method 300 can proceed to block 322.

At block 318, render an email application. For example, content management system 106, file request module 132 and/or email module 136 causes the rendering of an email application on client device 102$_i$. The email application can be an email application associated with the content management system 106 or a third party email application associated with the client device 102$_i$, such as Outlook® by Microsoft Corporation of Redmond, Washington After rendering the email application, method 300 can proceed to block 320.

At block 320, generate an email message. For example, the teacher can generate an email message using the email application associated with content management system 106 or the third party email application. The teacher can enter one or more email addresses, paste the copied link and enter an optional message in the email. After generating the email message, method 300 can proceed to block 328.

Figure 18:
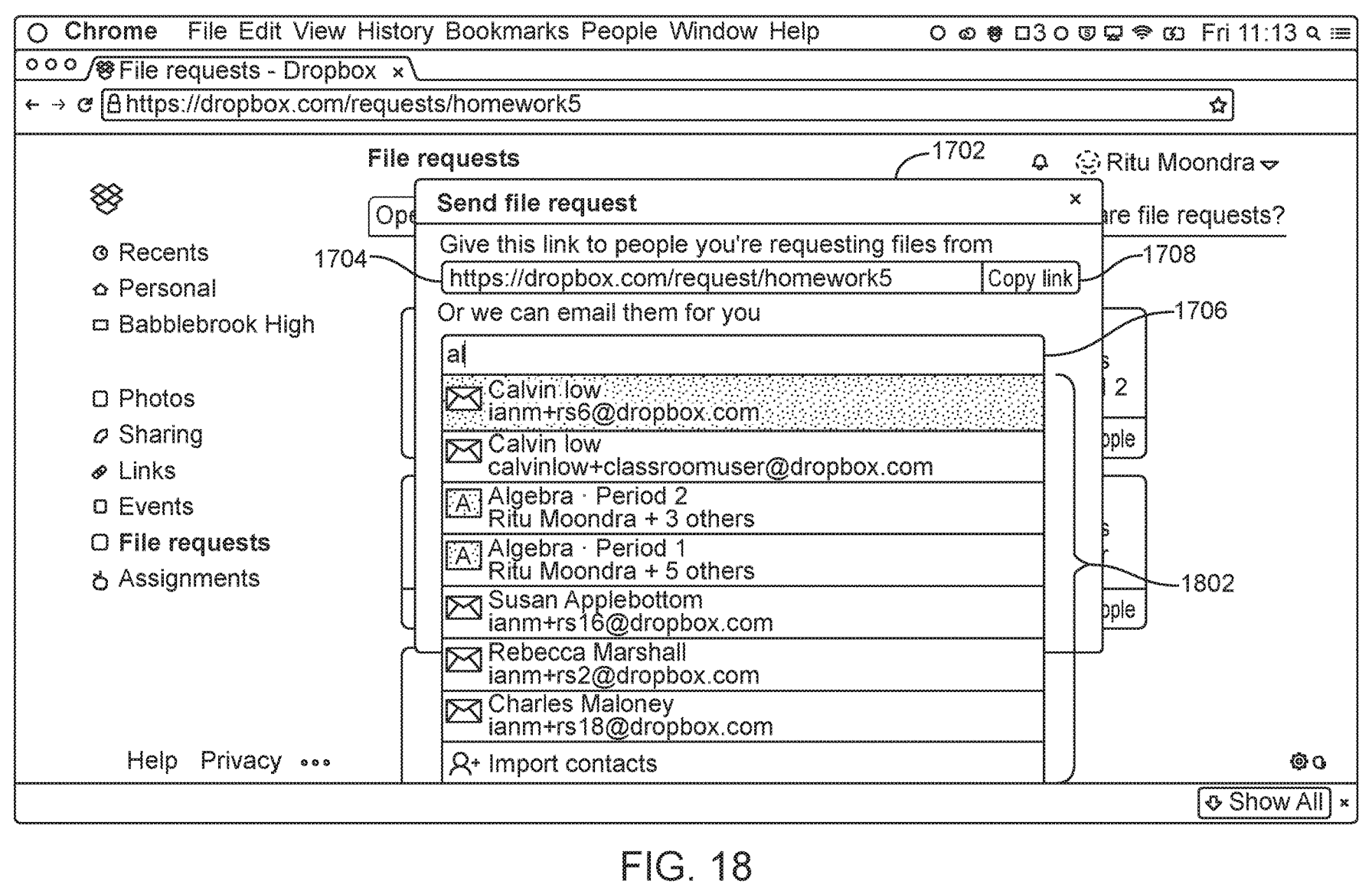

At block 322, receive one or more email addresses in the email box. For example, content management system 106, file request module 132 and/or email module 136 receives one or more email addresses in email box 1706 as known in the art. The teacher can enter one or more email addresses manually by typing one or more complete email addresses in email box 1706. For multiple email addresses, the teacher can separate the email addresses using a semicolon. Alternatively, the teacher can start to type in an email address and have a list of email addresses 1802 displayed as shown in FIG. 18 based on the partially entered email address. The teacher can complete the email address or select a displayed email address. The teacher can enter one or more email addresses. The email address can be a group email address. For example, a teacher and/or administrator can generate one or more group email addresses. Each group email address can be associated with an email address for each member in a group. A group email address can include others, such an email address for a parent, guardian, teacher, teacher aide, etc. A group can be for a class, a team (e.g. sports team), a study group or any other combination of one or more people that a teacher or administrator may send an assignment to. After receiving one or more email addresses in the email box, method 300 can proceed to block 324.

Figure 19:
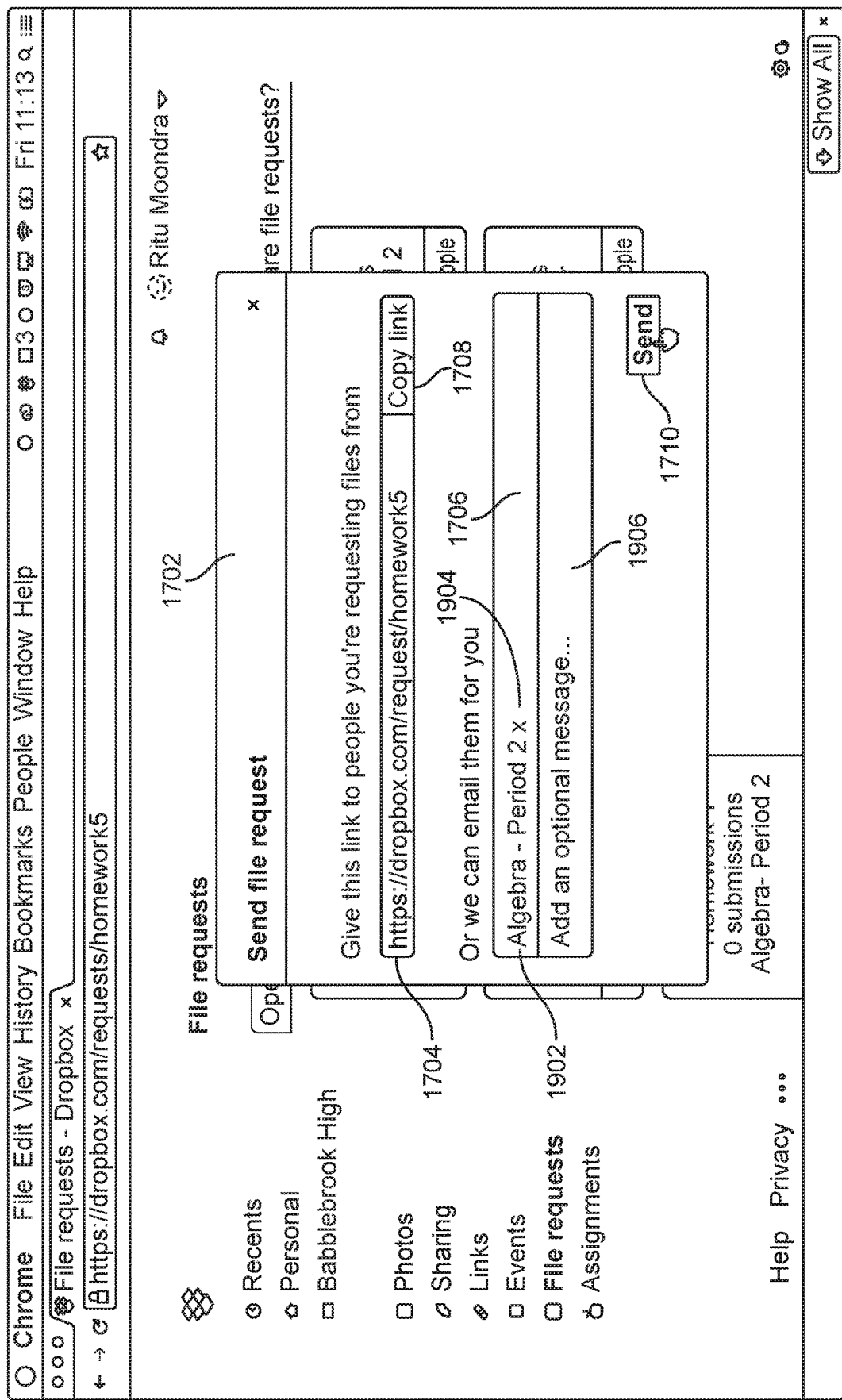
FIG. 19 is a send file request UI rendering an email address in accordance with an exemplary embodiment.

At block 324, render an updated send file request UI with the entered email addresses. For example, content management system 106 and/or file request module 132 can cause the rendering of an update Send file request UI 1702 on client device 102$_i$. FIG. 19 shows an updated Send file request UI with a group email address for "Algebra—Period 2" 1902. The teacher can add one or more email addresses or by selecting the delete icon 1904, the teacher can replace the rendered email address. The teacher can add a comment to the file request by selecting the comment box 1906. If the teacher does not want to add a comment, method 300 can proceed to block 328. If the teacher wants to add a comment, method 300 can proceed to block 326.

At block 326, receive a comment in the comment box. For example, content management system 106 and/or file request module 132 receives a comment that the teacher enters in comment box 1906. After receiving a comment, method 300 can proceed to block 328.

At block 328, receive a send command. For example, content management system 106, file request module 132, email module 136 and/or third party email application receives a send command. For example, the teacher can enter/hit a send command in the email application of the content management system 106, in the third party email application associated with the client device 102$_i$, or in response to the teacher selecting Send button 1710 displayed in the updated Send file request UI 1702 shown in FIG. 19. After receiving a send command, method 300 can proceed to block 330.

At block 330 generate and associate one or more metadata tags with the file request. For example, content management system 106, file request module 132 and/or email module 136 generates and associates one or more metadata tags with the file request. Regarding the third party email application, software such as a plugin associated with content management system 106, can generate the metadata tags and provide them to content management system 106. The file request can include one or more selected files, one or more template instance files, the comment (if entered in the comment box 1906) and one or more metadata tags. The one or more metadata tags can include a file request identifier, a teacher identifier, a school identifier, a class identifier, a term identifier, a file identifier, and one or more email identifiers. The file request identifier can be a unique identifier that identifies the file request. The teacher identifier can be a unique identifier that identifies the teacher who created the file request. The school identifier can be a unique identifier that identifies the school for which the file request was created. The term identifier can be an identifier that identifies the school year and term, e.g., 2015 semester 1, 2015 semester 2, 2015 quarter 1, 2015 quarter 2, etc. The class identifier can identify a class that the file request is associated with. The file identifier can be a unique identifier that identifies a file that is associated with the file request. The file identifier can identify a template file if a template file is associated with the assignment. An email identifier can identify who the file request was sent to. Each email identifier can identify each individual that the file request is sent to and/or a group email identifier. The metadata tag can be one metadata tag that combines all of the metadata tags. For example, the one metadata tag can be all of the metadata tags concatenated together. The concatenated metadata tags can have a specific order with one or more nulls for an empty metadata tag. For example, if an assignment only has a group email address and no additional email addresses, the concatenated metadata tag can have a null for where additional email addresses may be stored. After generating and associating one or more metadata tags with the assignment, method 300 can proceed to block 332.

At block 332, obtain an email address for each recipient. For example, content management system 106, file request module 132 and/or email module 136 and/or third party email application obtains an email address for each of the one or more designated recipients, e.g., students. The email addresses can be based on the recipients associated with one or more selected email addresses and/or the email addresses that are entered in the recipient box 1706. For the third party email application a patch, plugin or application program interface (API) can be used to obtain the email address or addresses as known in the art. After obtaining an email address for each of the designated recipients, the method 300 can proceed to block 334.

Figure 20:
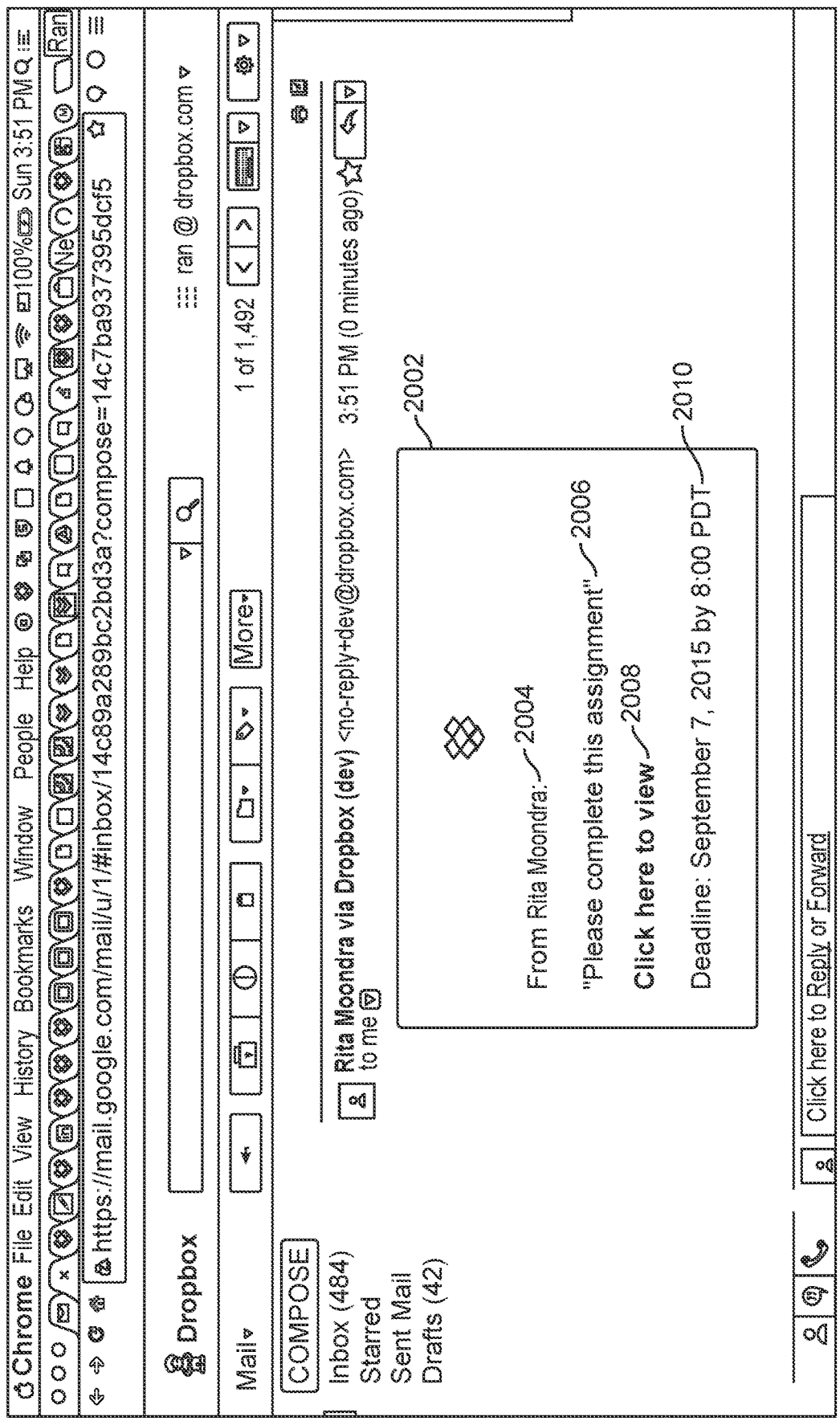
FIG. 20 is an email message rendering a notification of an assignment in accordance with an exemplary embodiment.

At block 334, distribute the file request. For example, content management system 106, file request module 132 and/or email module 136 and/or third party email application distributes the file request and the one or more associated metadata tags. Distribution can include sending an email message and/or associating the file request and the one or more associated metadata tags with each member of the group associated with a group name and/or group email address. For example, one email message can be sent to all of the recipients or individual email messages can be sent to each recipient. The email message(s) can include a comment from the teacher if the teacher entered a message in the comment box 1906. The email message can notify the recipients associated with the file request of the file request. In another example, the email message can contain a link for the encoded file identifier or encoded template file identifier. FIG. 20 shows an email message 2002 rendered on client device 102$_i$. As shown, the mail message 2002 identifies the teacher, Rita Moondra 2004; the comment, "Please complete this assignment" 2006; a hypertext, "Click here to view" which encodes the link to the file request 2008; and the deadline, September 7, 2015 by 08:00 PCT 2010. The file request can be associated with each designated recipient. For example, a pointer to the file request and associated one or more metadata tags can be associated with a user account for each designated recipient. After distributing the file request, method 300 can proceed to block 336.

Figure 21:
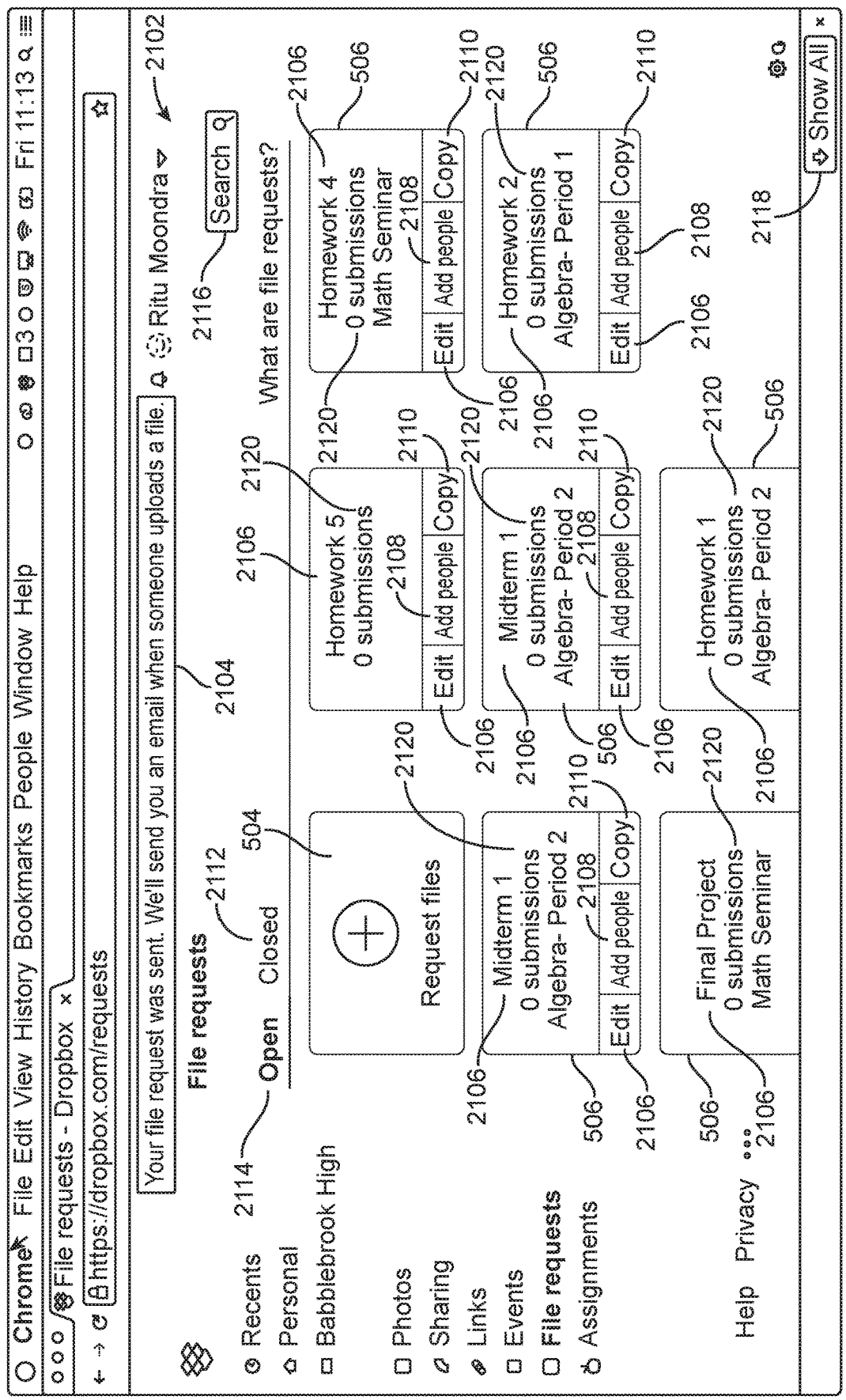
FIG. 21 is an updated file request UI rendering existing file requests and a file requests file icon to create a file request in accordance with an exemplary embodiment.

At block 336, render a file request homepage UI. For example, content management system 106 and/or file request 132 causes the rendering of a file request homepage UI on client device $102_i$. FIG. 21 shows a file request homepage UI 2102 which includes notification 2104 that the file request was sent. As shown, the notification 2104 is "Your file request was sent. We'll send you an email when someone uploads a file." File request homepage UI 2102 can display the open file requests with "Homework 5" 2106 being the latest file request and is displayed next to the request files icon 504. After rendering a file request homepage UI, method 300 can proceed to block 338.

At block 338, notify the teacher of a submission. For example, content management system 106 and/or file request module 132 monitors submissions. Submissions are discussed in further detail below. In response to a submission to a file request, a notification can be provided to the teacher. Notifications can include, but are not limited to, email, text message, posting to the account, application notifications (E.g., in-band notifications) or any other for notifications. For example, content management system 106, file request module 132 and/or email module 136 sends an email message to the teacher informing the teacher that a student submitted an assignment in response to the file request. An exemplary email message can be, "Jose Nunez submitted an assignment to Homework 5 on Sep. 14, 2015 at 2:00 PDT."

Student

Figure 24:
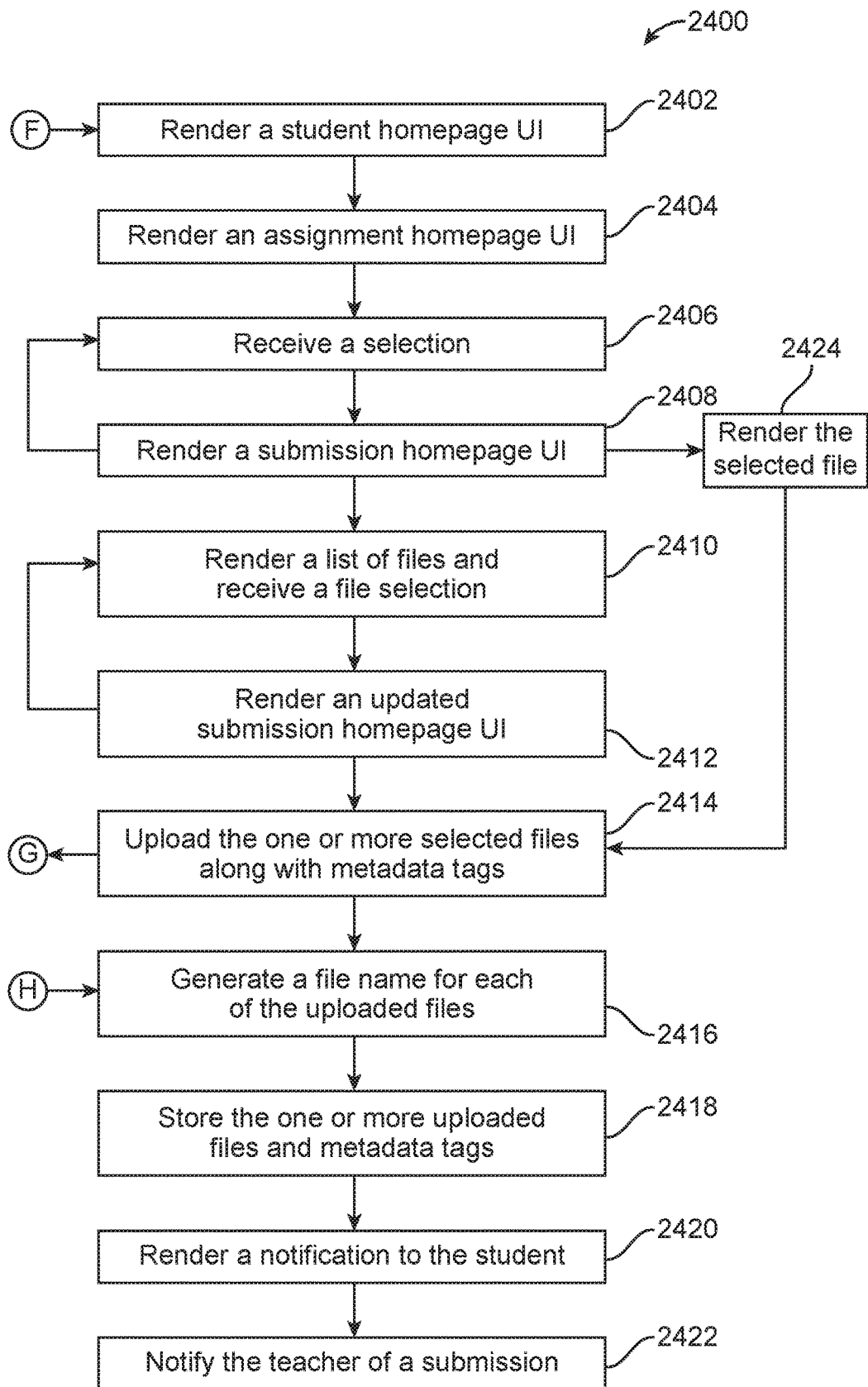
FIG. 24 is a flowchart of a method for responding to a file request in accordance with an exemplary embodiment.

Referring to FIG. 24, a flow diagram for responding to a file request in accordance with an exemplary embodiment is illustrated. The exemplary method 2400 is provided by way of example, as there are a variety of ways to carry out the method. The method 2400 described below can be carried out using the configurations illustrated in FIG. 1 by way of example, and various elements of this figure are referenced in explaining exemplary method 2400. Each block shown in FIG. 24 represents one or more processes, methods or subroutines, carried out in the exemplary method 2400. The exemplary method 2400 is described with respect to an application operating on a client device $102_i$. However, one of ordinary skill in the art would recognize that the method 2400 can be performed via a browser on a client device $102_i$ as known in the art. The exemplary method 2400 can begin at block 2402.

Figure 25:
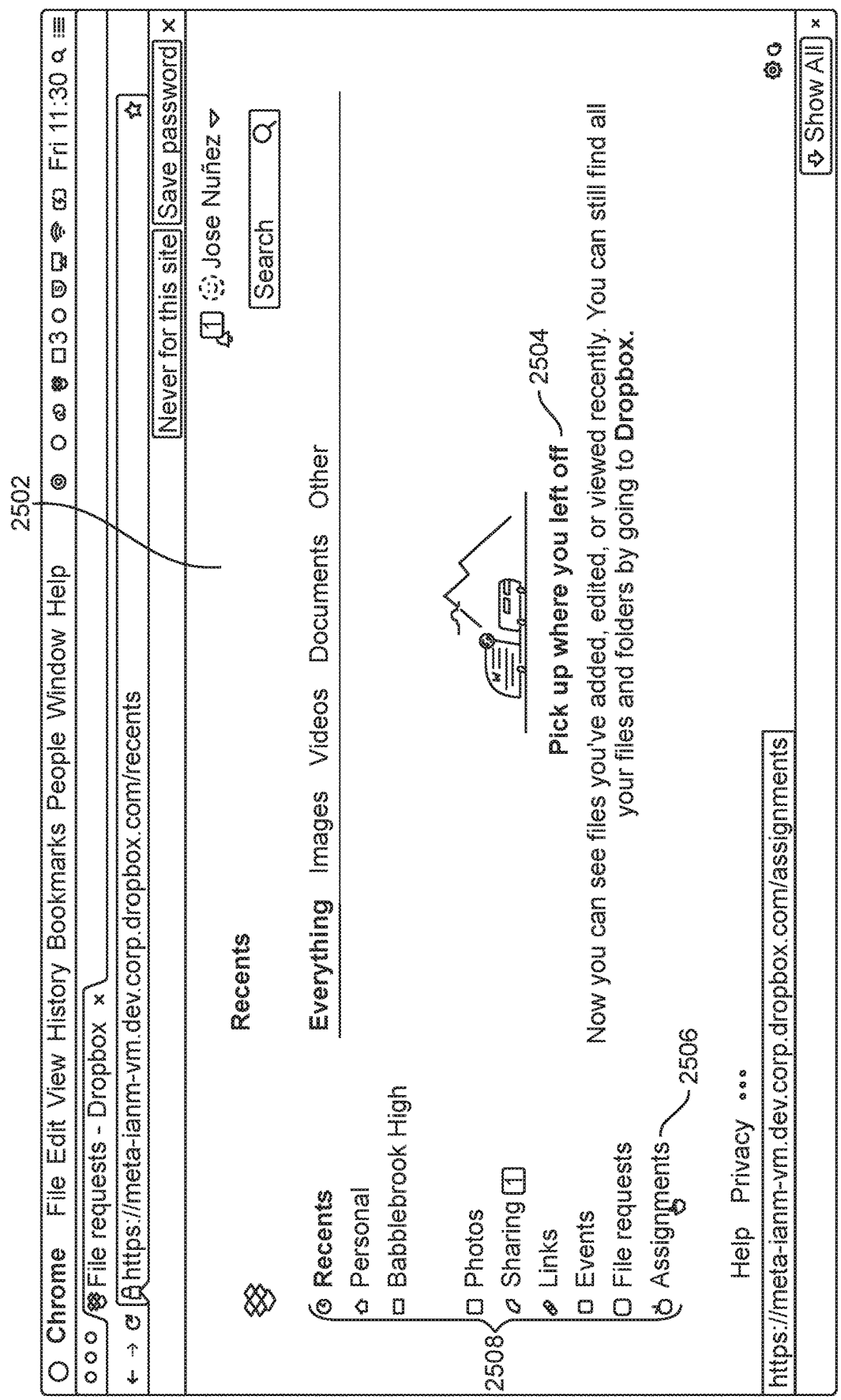
FIG. 25 is a student homepage UI in accordance with an exemplary embodiment.

At block 2402, render a student homepage UI. For example, content management system 106 and/or the assignment module 132 causes a student homepage UI to be rendered on a client device $102_i$ in response to a student accessing the content management system 106. FIG. 25 shows a student homepage UI 2502. By selecting the "Pick up where you left off" hyper link 2504 or by selecting Assignments menu option 2506 from side menu 2508, a student can go to an assignment homepage UI. In response to hyperlink 2504 or Assignment menu option 2506, method 2400 can proceed to block 2404.

Figure 26:
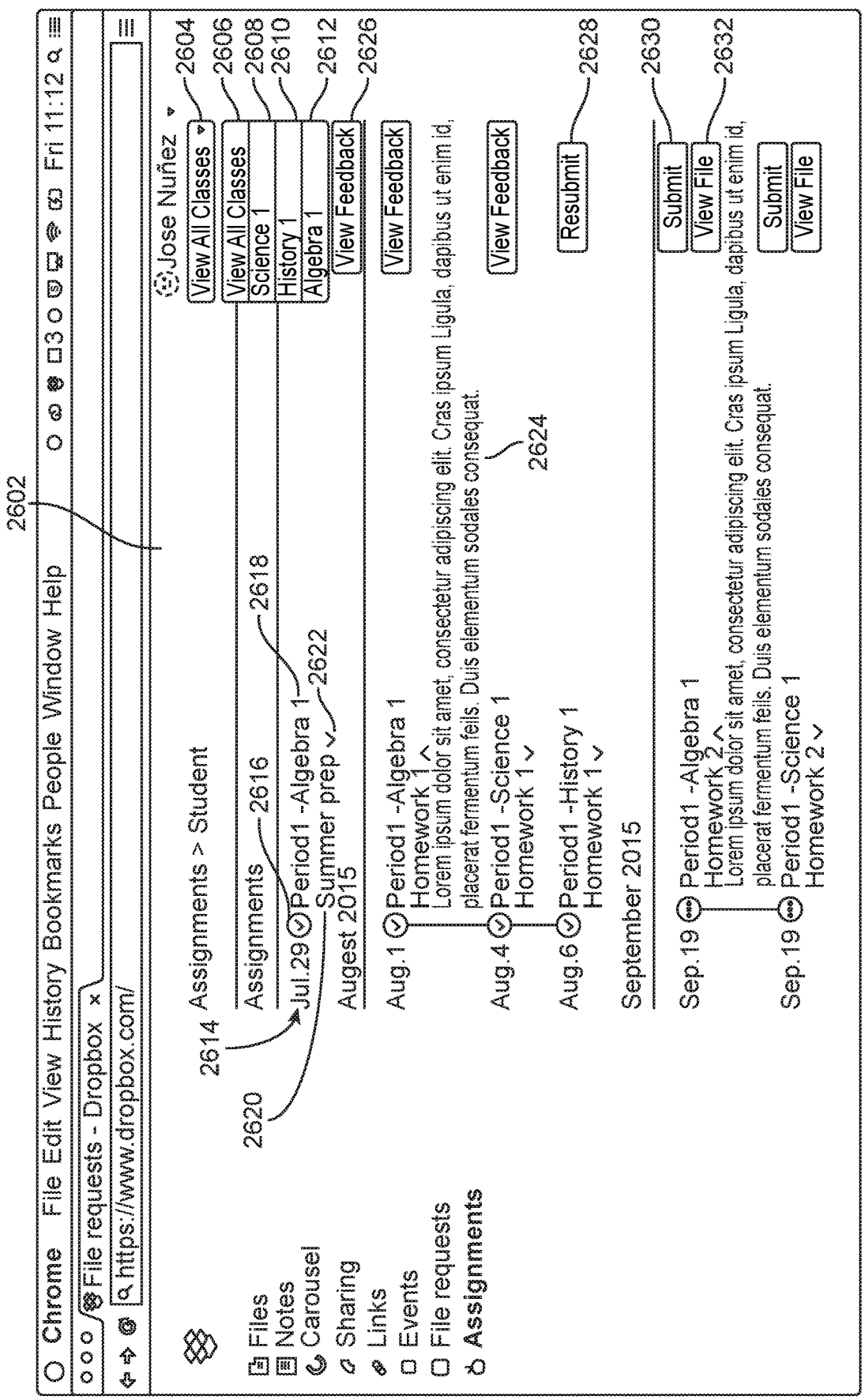
FIG. 26 is a student homepage UI or dashboard rendering a list of assignments for a student in accordance with an exemplary embodiment.

At block 2404, render an assignment homepage UI. For example, content management system 106 and/or assignment module 134 causes the rendering of an assignment homepage UI or dashboard on a client device $102_i$ based on the one or more associated metadata tags. FIG. 26 shows a student homepage UI or dashboard 2602 displaying a list of assignments 2604 for a student, e.g., Jose Nunez. The list can be an ordered list, such as ascending or descending order. As shown, the list includes the assignments for all of the student's classes. The list of assignments can be based on the one or more metadata tags, such as a metadata tag associated with the student or student identifier. To change the view, the student can select a view button 2604. By selecting the view button 2604, a menu is rendered on the client device $102_i$ which allows the student to select different view options. For example, the student can select View All Classes 2606, Science 1 2608, History 1 2610 or Algebra 1 2612. By selecting a specific class menu option, e.g., Science 1 2608, the assignments for the selected class can be displayed based on the one or more metadata tags, such as a class identifier and student identifier. For each assignment, a due date 2614, status indicator 2616, class identifier 2618, assignment name 2620, comment button 2622, comment 2624 and one or more selection buttons 2626, 2628, 2630, 2632 are displayed. The due date 2614 can identify the due date for the assignment. The status indicator 2616 can identify the status of the assignment. For example, a circle with a check can indicate that the submission was on time, a circle with a clock can indicate that the submission was submitted in a late submission period, a circle with three dots can indicate that the assignment is pending, and a circle with an X can indicate that no submission was made and the submission period has ended. Each status indicator can include a color. For example, green can indicate a timely submission, yellow can indicate a late submission (e.g., within the late submission period), red can indicate no submission and blue can indicate a pending assignment. The class identifier can indicate the class associated with the assignment. For example, as shown, the classes are Science 1, History 1 and Algebra 1. The class identifier can indicate the period or semester. The assignment name 2620 can identify the name of the assignment, e.g., Homework 1 or Homework 2. The comment button 2622 can cause a comment associated with an assignment to be rendered or hidden. By selecting comment button 2622 a comment can be rendered or hidden. For example, comments for two of the Algebra homework assignments are shown. The selection buttons can include View Feedback button 2626, Resubmit button 2628, Submit button 2630 or View File button 2632. View Feedback button 2626 allows a student to view a graded assignment and any comments associated with the assignment. Resubmit button 2628 allows a student to resubmit an assignment that was previously graded. Submit button 2630 allows a student to submit a submission. View File button 2632 allows a student to view a file associated with a File request. For example, the file can be instructions and/or a template file. After rendering an assignment homepage, method 2400 can proceed to block 2406.

At block 2406, receive a selection. For example, content management system 106 and/or assignment module 134 receives a selection which can be a view selection 2606, 2608, 2610, 2612, an assignment 2618 or 2620, View Feedback button 2626, Resubmit button 2628, Submit button 2630 or View File button 2632. If the selection is a view selection 2606, 2608, 2610, 2612, method 2400 can proceed to block 2404 with the assignment homepage UI or dashboard being rendered in accordance with the selection. If the selection is an assignment, method 2400 can proceed to block 3302 of FIG. 33. If the selection is View Feedback button 2626, method 2400 can proceed to block 2424. If the selection is Resubmit button 2628, method 2400 can proceed to block 2410 if the assignment includes an associated template file or can proceed to block 2408 if the assignment does not include an associated template file. If the selection is Submit button 2630, method 2400 can proceed to block 2408. If the selection is View File button 2632, method 2400 can proceed to block 2424.

Figure 27:
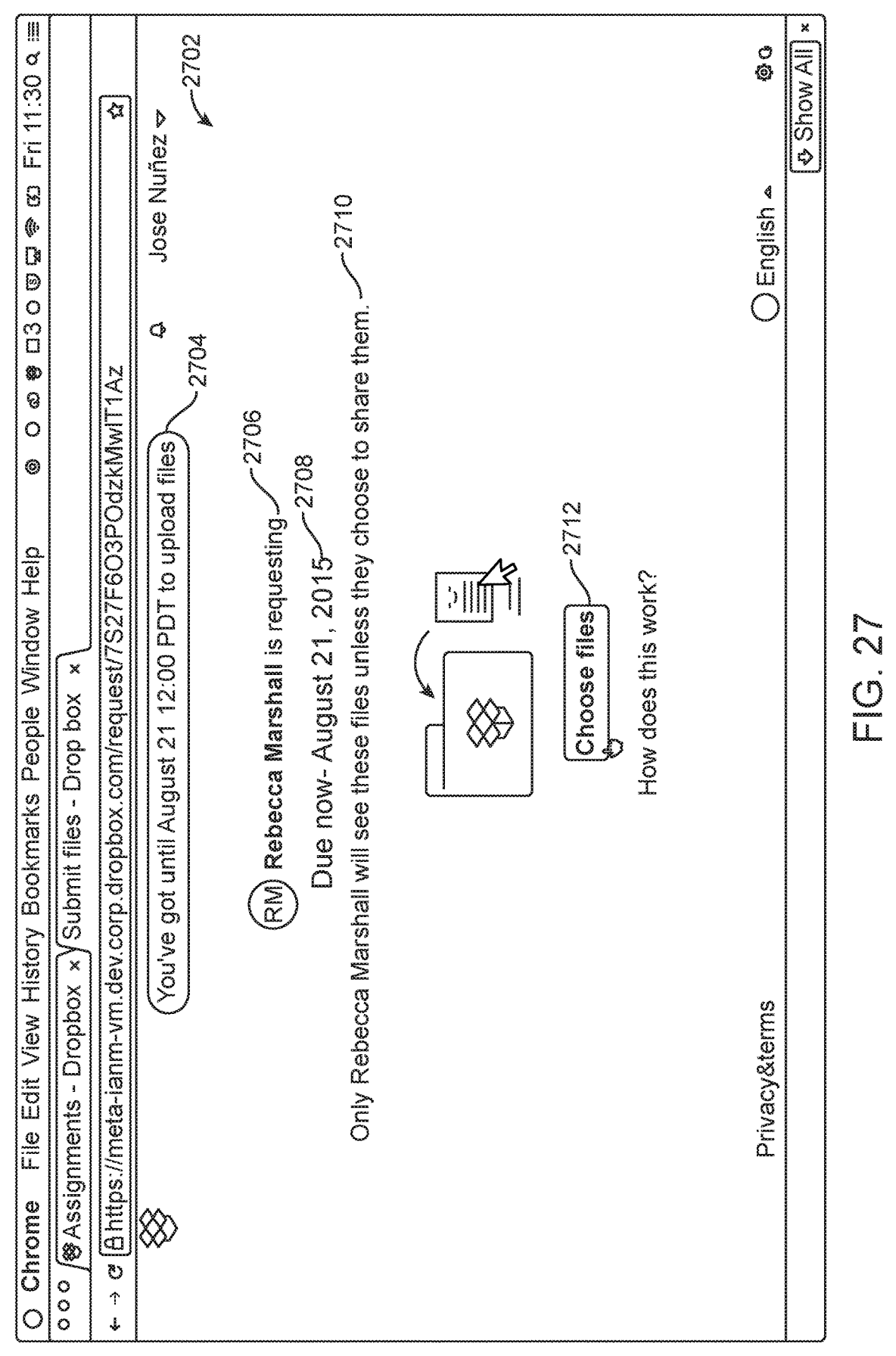

At block 2408, render a submission homepage UI. For example, content management system 106 and/or assignment module 134 causes the rendering of a submission homepage UI based on the one or more associated metadata tags. FIG. 27 shows a submission homepage UI 2702 having a due date message rendered on client device $102_i$. The submission homepage UI 2702 displays due date message 2704, teacher requesting the assignment 2706, comment 2708, due date 2710 and Choose files button 2712. The due date message 2704 recites, "You've got until August 21 12:00 PDT to upload files." The teacher requesting the assignment 2706 is Rebecca Marshall. The due date 2710 is Due now—Aug. 21, 2015. The comment 2710 is a default comment, e.g., "Only Rebecca Marshall will see these files unless they choose to share them." If the teacher submitted a comment in the file request, the teacher's comment would also be displayed in comment 2710. Choose files button 2712 allows the student to submit one or more files for the assignment. In response to Choose files button 2712 being selected, method 2700 can proceed to block 2410.

Figure 28:
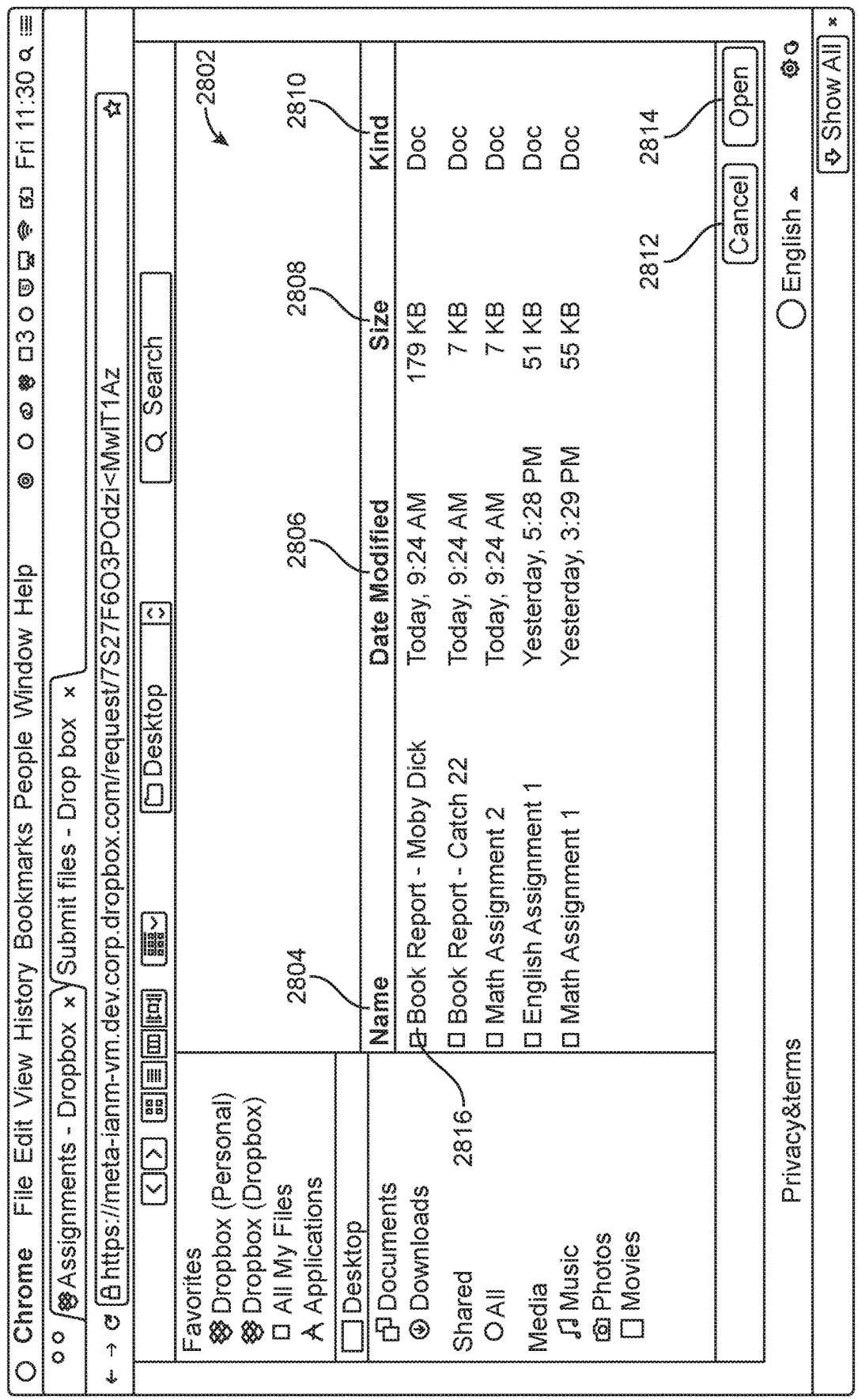
FIG. 28 is a UI rendering a list of files for responding to a file request in accordance with an exemplary embodiment.
Figure 29:
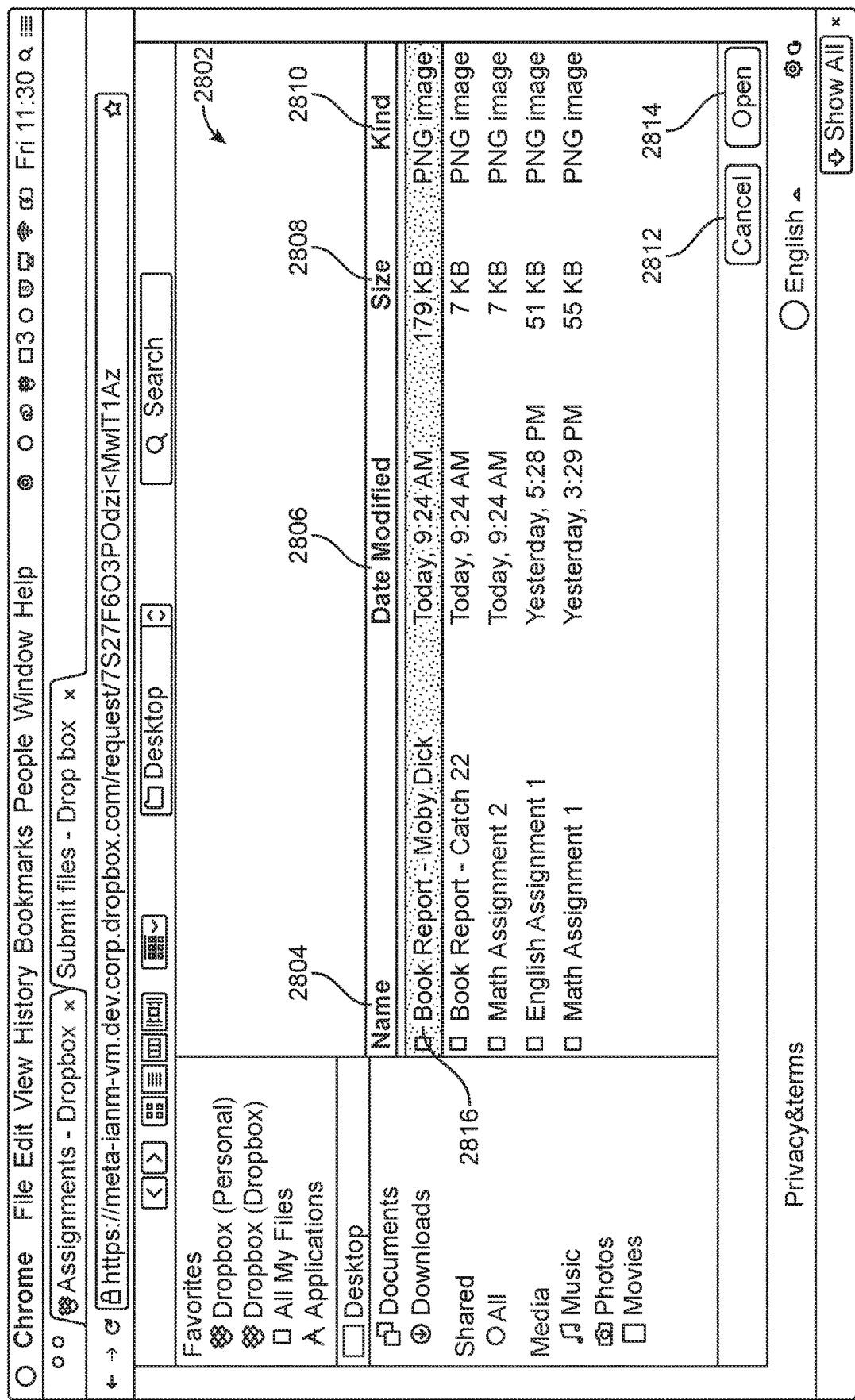
FIG. 29 is a UI rendering a list of files with a selected file for responding to a file request in accordance with an exemplary embodiment.

At block 2410, render a list of files and receive a file selection. For example, content management system 106 and/or assignment module 134 causes the rendering of a list of files on client device $102_i$. FIG. 28 shows a list of files 2802 that a student can select to be uploaded. As known in the art, the student can navigate to one or more lists of files 2802 and select one or more files to be included in the file upload. As shown, there are five files listed with each including a Name 2804, Date Modified 2806, Size 2808 and Kind 2810. Name 2804 is the file name. Date Modified 2806 is the date of when the file was modified last. Size 2808 is the size of the file. Kind 2810 is the type of file, e.g., Doc, PDF, etc. To select a file, a student can select the name of the file, e.g., Book Report—Moby Dick 2816. FIG. 29 shows that the top file, Book Report—Moby Dick 2902 was selected. To cancel the selection of a file to be uploaded, the student can select Cancel button 2812. To open a file, e.g., for editing, the student can select Open button 2814. After rendering the list of files and receiving a selection, method 2400 can proceed to block 2412.

Figure 30:
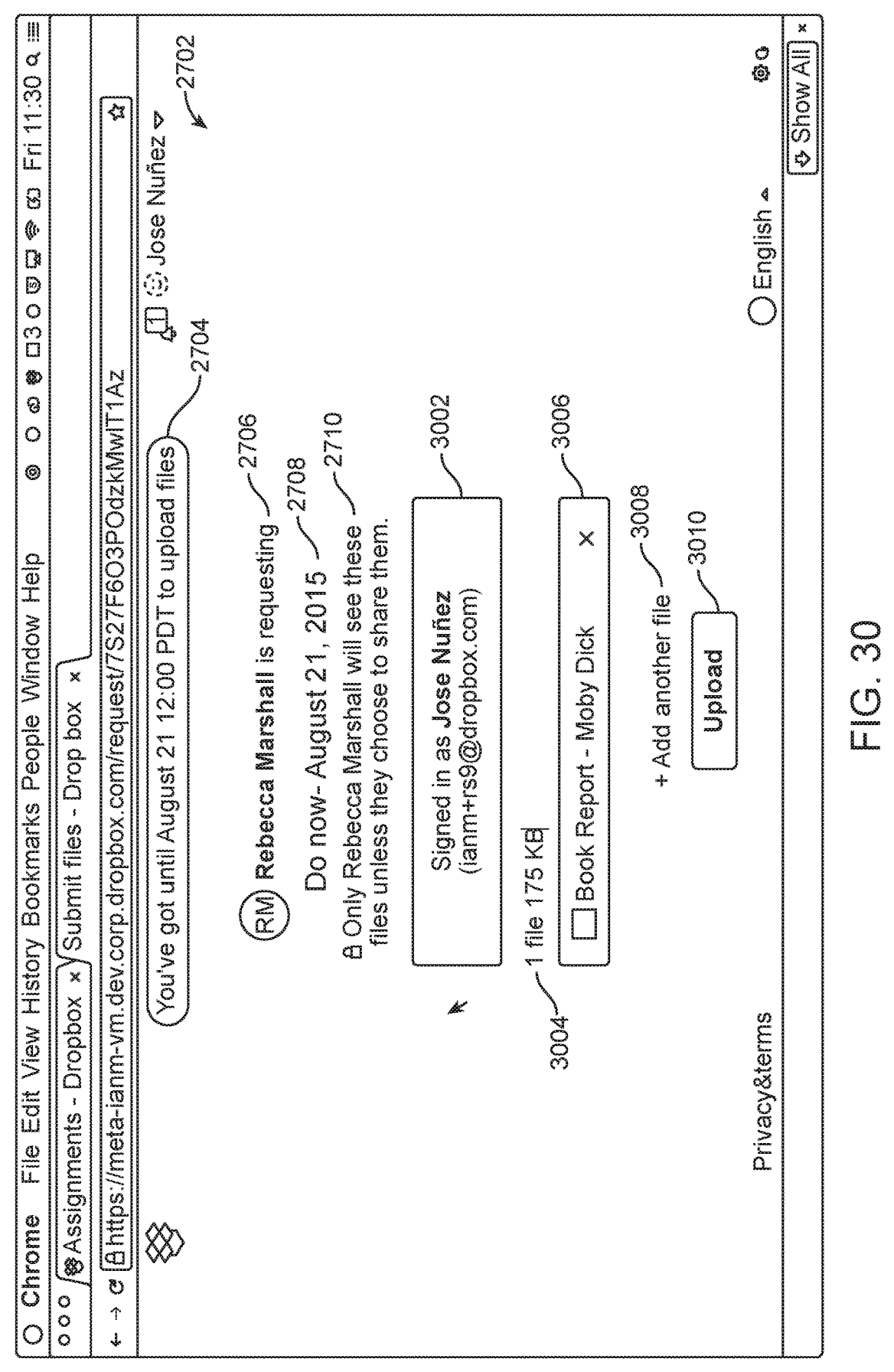

At block 2412, render an updated submission homepage UI. For example, content management system 106 and/or assignment module 134 causes the rendering of an upload UI. FIG. 30 shows an updated submission homepage UI 3002 with the student's name being displayed as being logged in 3002, size of the file 3004, e.g., 175 KB, selected file being displayed 3006, e.g., Book Report—Moby Dick, Add another file button 3008 and Upload button 3010. If the student selects Add another file button 3008, method 2400 can proceed to block 2410 to select another file. If the student selects Upload button 3010, method 2400 can proceed to block 2412.

At block 2414, upload the one or more selected files along with metadata tags. For example, content management system 106 and/or assignment module 134 generates metadata tags to be uploaded with the one or more files and provides the metadata tags and one or more files to content management system 106 and/or assignment module 134. The metadata tags can include at least one of a student identifier, a file identifier for each uploaded file, a file request identifier, a school identifier, a class identifier, a term identifier and a timestamp for the upload. After uploading the one or more selected files and one or more associated metadata tags, method 2400 can proceed to block 2416.

At block 2416, generate a file name for each of the uploaded files. For example, the file access module 204 determines how many files the submitter has submitted in the collection folder under the file request name and generates a file name for each of the uploaded files. The file name is generated by combining the file request name and either the submitter's name or the submitter's user name of the submitter's email address. The submitter's first name, last name or any combination thereof can be used. For example, if the file request was named Homework Assignment #3 and Jane Doe uploaded a file, the file name can be "Homework Assignment #3—Jane Doe". Depending on whether the submitter's name or user name is unique a number may be added. For example, if two submitter's have the same first and last name, then a number can be added to the one of the submitter's name to differentiate the two submitters. If the submitter has submitted more than one file, the files submitted after the first file can include a number. For example, if a file request for a Homework Assignment #3 and Jose Nunez submits three files, the first file can be named Jose Nunez Homework Assignment #3-1, the second photo can be named Jose Nunez Homework Assignment #3-2 and the third photo can be Jose Nunez Homework Assignment #3-3. One of ordinary skill in the art would recognize other methods for generating unique names for the submitters and for generating unique file names can be used. After generating a file name for each uploaded files, the method 2400 can proceed to block 2418.

At block 2418, store the one or more uploaded files and metadata tags. For example, content management system 106 and/or assignment module 134 stores the one or more uploaded files and metadata tags in content storage 160. The one or more uploaded files and metadata tags can be associated with the collection folder. The one or more uploaded files and metadata tags can be stored in the collection folder and/or be associated with the collection folder. A content directory can identify the location of each content item in content storage 160. The content directory can include a unique content entry for each content item stored in the content storage 160. The content entry can include a content pointer that identifies the location of the content item in content storage 160. Pointers can be added to the teacher's account and/or student's account. After storing the one or more uploaded files and metadata tags, method 2400 can proceed to block 2420.

Figure 31:
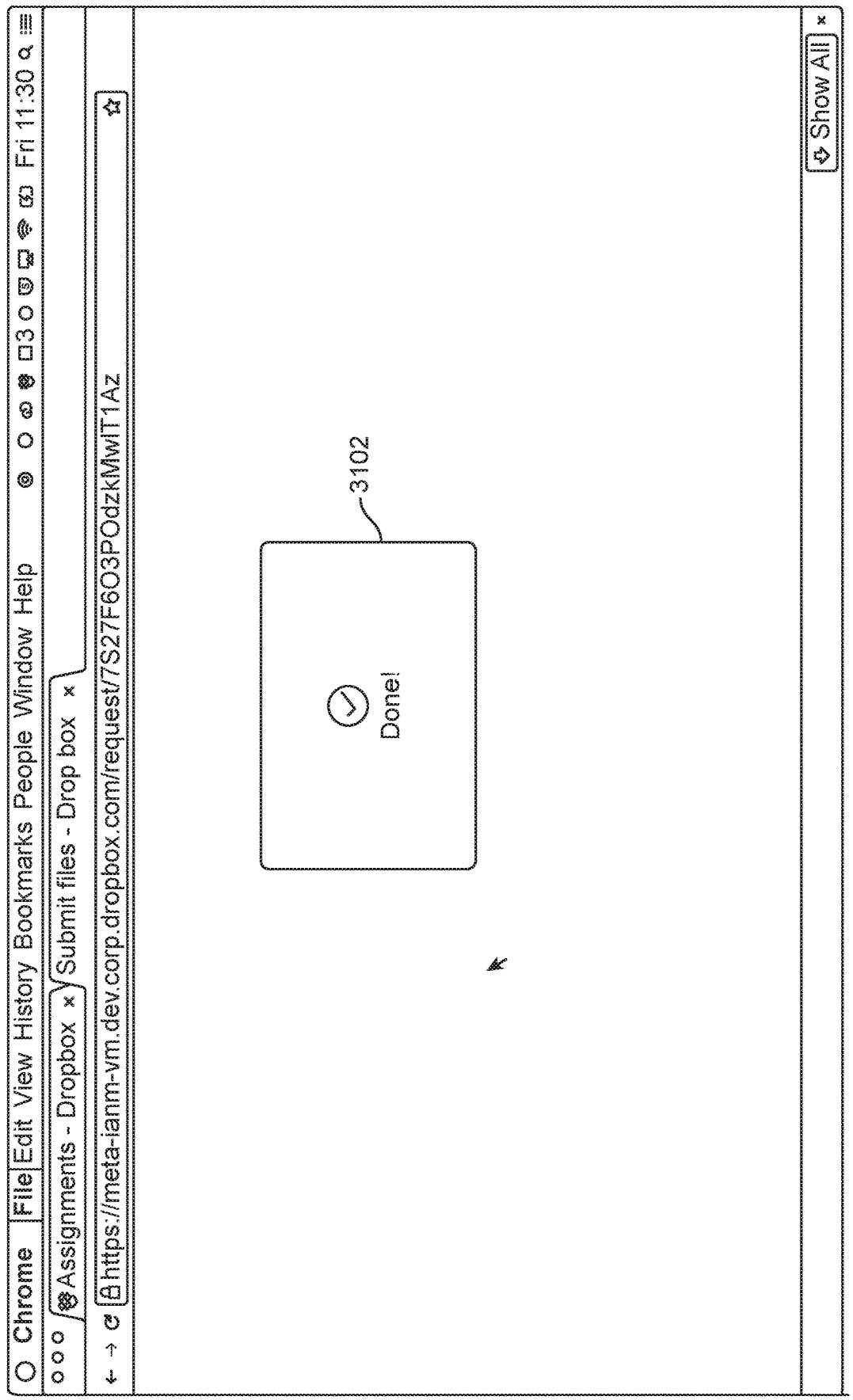
FIG. 31 is a notification that a submission to an assignment was submitted in accordance with an exemplary embodiment.

At block 2420, render a notification to the student. For example, content management system 106 and/or assignment module 134 causes the rendering of a notification that the file upload is complete. FIG. 31 shows a notification 3102 that is rendered on the client device $102_i$. As shown, the notification is "Done!" 3102. After notifying the student, method 2400 can proceed to block 2422.

At block 2422, notify the teacher of a submission. For example, content management system 106 and/or assignment module 134 notifies the teacher of the submission. Notifications can include, but is not limited to, email, text message, posting to the account, application notifications (e.g., in-band notifications) or any other for notifications. For example, content management system 106, file request module 132 and/or email module 136 sends an email message to the teacher informing the teacher that a student submitted an assignment in response to the file request. An exemplary email message can be, "Jose Nunez submitted an assignment to Homework 5 on Aug. 21, 2015 at 11:00 PDT."

At block 2424, render the selected file. For example, content management system 106 and/or assignment module 134 causes the rendering of the selected file. The selected file can be a template file associated with the file request, a file associated with the file request, e.g., directions or instructions for the assignment, or a graded assignment.

Figure 32:
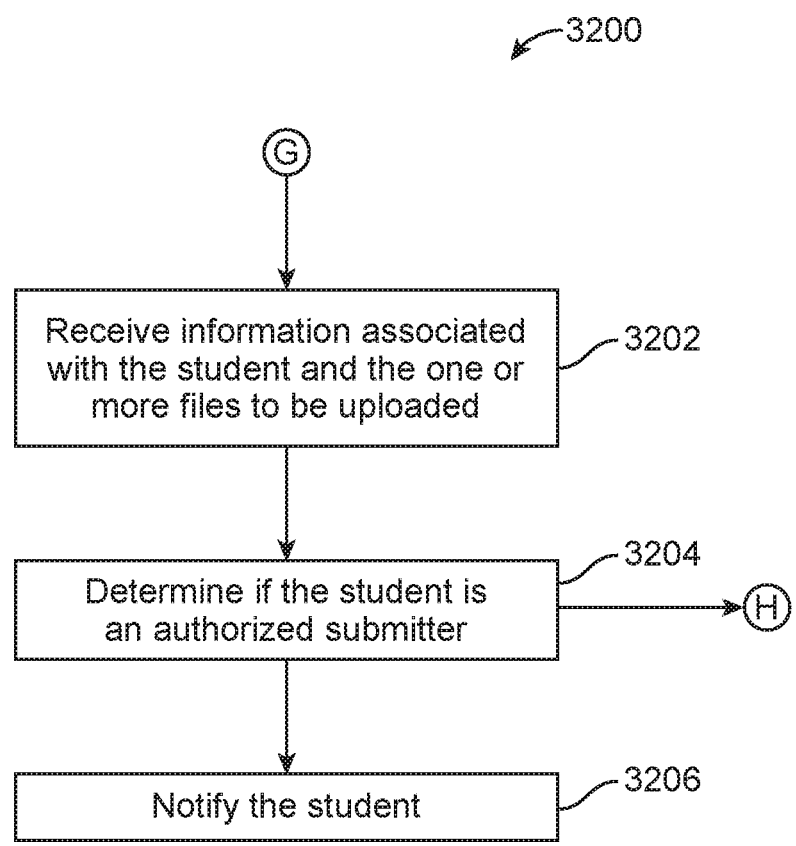
FIG. 32 is a flowchart for a method for authenticating a student in accordance with an exemplary embodiment.

Referring to FIG. 32, a flowchart for a method for storing an uploaded file in a collection folder in accordance with an exemplary embodiment is illustrated. Exemplary method 3200 is provided by way of example, as there are a variety of ways to carry out the method. Method 3200 described below can be carried out using the configurations illustrated in FIGS. 1 and 2A by way of example, and various elements of these figures are referenced in explaining exemplary method 3200. Each block shown in FIG. 32 represents one or more processes, methods or subroutines, carried out in exemplary method 3200. Exemplary method 3200 can begin at block 3200.

At block 3202, receive information associated with the student and the one or more files to be uploaded. For example, communications interface module 120 receives information associated with the student and the one or more uploaded files. After receiving the information and the one or more files, method 3200 can proceed to block 3204.

At block 3204, determine if the student is an authorized submitter. For example, authenticator module 126 can determine if the submitter is authorized to upload content based on the information received from the submitter. For example, authenticator module 126 can compare the received information against information associated with the collection folder to determine if the student is authorized to upload content. If the student is not authorized, method 3200 can proceed to block 3206. If the submitter is authorized, method 3200 can proceed to block 2416 of FIG. 24.

At block 3206, notify the student. Notification can include, but is not limited to, email, text message, posting to the account, application notifications (e.g., in-band notifications) or any other means of notification. For example, authenticator module 126, UI module 122 and/or email module 144 notifies the student that the student is not authorized to upload content to the collection folder. UI module 122 can cause a message to be rendered on the student's client device $102_i$ and/or email module 144 can send an email message to the student. The message and/or email message can inform the student that they are not authorized to submit a file. The notification can be done via an email message or a web page.

Figure 33:
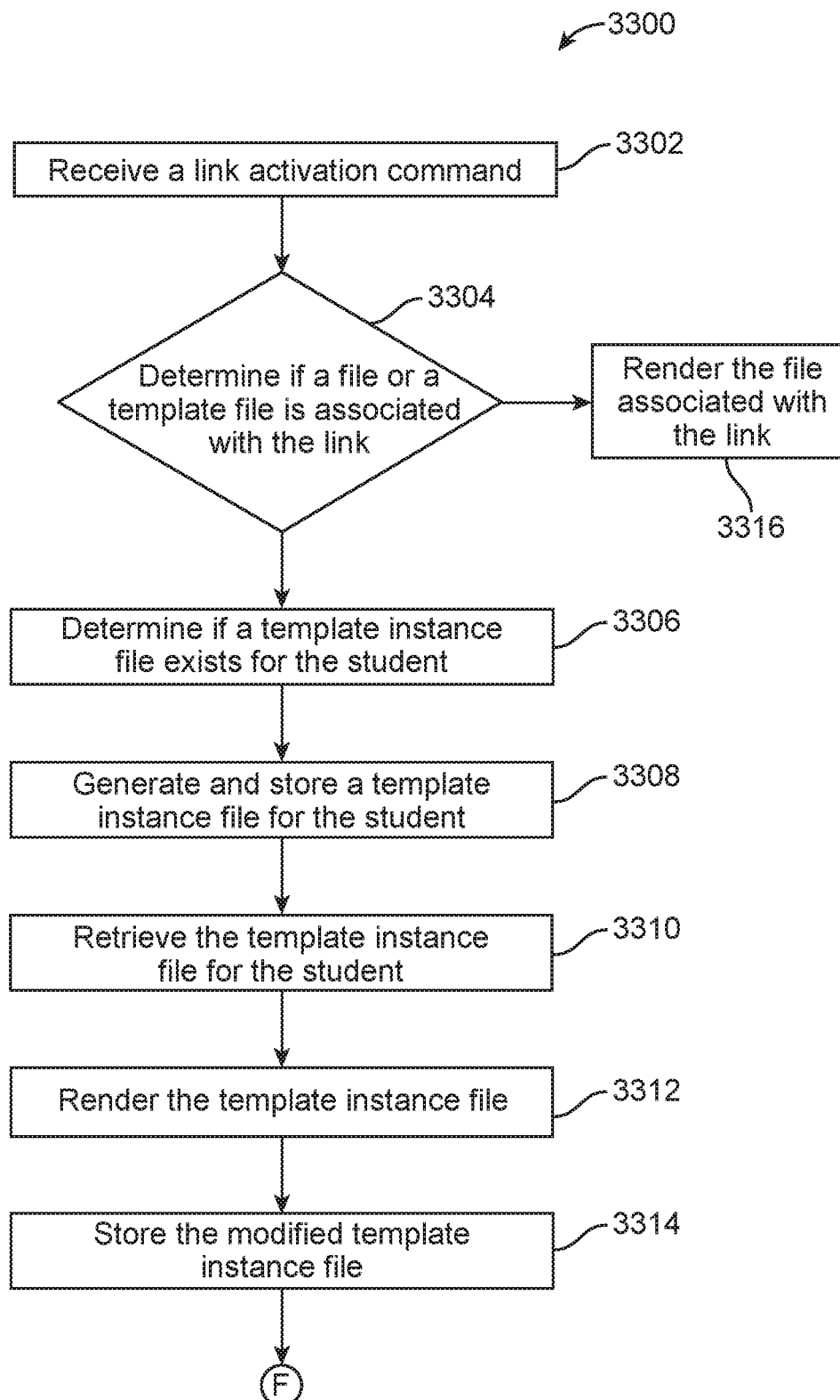
FIG. 33 is a flowchart for a method to use a template file to complete an assignment in accordance with an exemplary embodiment.

Referring to FIG. 33, a flow diagram for using a template file to complete an assignment in accordance with an exemplary embodiment is illustrated. The exemplary method 3300 is provided by way of example, as there are a variety of ways to carry out the method. The method 3300 described below can be carried out using the configurations illustrated in FIG. 1 by way of example, and various elements of this figure are referenced in explaining exemplary method 3300. Each block shown in FIG. 33 represents one or more processes, methods or subroutines, carried out in the exemplary method 3300. The exemplary method 3300 is described with respect to an application operating on a client device $102_i$. However, one of ordinary skill in the art would recognize that the method 3300 can be performed via a browser on a client device $102_i$ as known in the art. The exemplary method 3300 can begin at block 3302.

At block 3302, receive a link activation command. For example, content management system 106, assignment module 134, email module 136 and/or template sharing module 138 receives a template activation command in response to a student selecting a link in an email message, such as link 2008 in FIG. 20, or by selecting View File button 2632 as shown in FIG. 26. The link activation command can include a session id and can trigger an Application Program Interface (API), such as a template sharing API or file sharing API. After receiving the link activation command, the method 3300 can proceed to block 3304.

At block 3304, determine if a file or a template file is associated with the link. For example, content management system 106, assignment module 134, email module 136 and/or template sharing module 138 determines if a file or a template file is associated with the link. If a file is associated with the link, method 3300 can proceed to block 3316. If a template file is associated with the link, method 3300 can proceed to block 3306.

At block 3306, determine if a template instance file exists for the student. For example, content management system 106 and/or template sharing module 138 determines if a template instance file exists for the student who caused the link activation command to be sent. In one or more embodiments, this can be done by extracting a user id from a session id associated with the recipient's accessing the link to and determining if a template instance file was created for the user. For example, if a template instance file was created, the template instance file would include a user id associated with the user. If a template instance file does not exist for the recipient, the method 3300 proceeds to block 3308. If a template instance file exists for the recipient, the method 3300 proceeds to block 3310.

At block 3308, generate and store a template instance file for the student. For example, content management system 106 and/or template sharing module 138 generates a template instance file for the student who accessed the link. The template instance file is stored in the shared folder. The file name for each stored template instance file includes the template filename and the student's name. For example, if the template file is Homework 5 and the student is Jose Nunez, the template filename can be Homework 5—Jose Nunez. Naming a template instance file can be similar to the naming of a submission done in block 2416 of FIG. 24. After generating and storing the template instance file, the method 3300 can proceed to block 3310.

At block 3310, retrieve the template instance file for the student. For example, the content management system 106 and/or the template sharing module retrieves the previously generated template instance file for the student. This can be done using the extracted user id. After retrieving the template instance file, the method 300 can proceed to block 3312.

At block 3312, render the template instance file. For example, content management system 106, assignment module 134 and/or template sharing module 138 causes the template instance file to be rendered on the client device $102_i$. The rendered template instance file can be the template instance file that was generated at block 3306 or the template instance file that was retrieved at block 3308. After rendering the template instance file, the method 3300 can proceed to block 3314.

At block 3314, store the modified template instance file. For example, the recipient modifies the template instance file and content management system 106 and/or assignment module 134 and/or template sharing module 138 saves the modified file and associated one or more metadata tags in the collection folder. The modified template instance file can be stored in response to the recipient entering a save command and/or if the recipient exits out of the template instance file. Thus, the designated recipient is able to fill out or modify the template instance file and have the changes saved in the shared folder.

At block 3316, render the file. For example, content management system 106 and/or assignment module 134 causes the file to be rendered on the client device $102_i$. The file can be a document providing instructions for the assignment.

Teacher

Figure 34:
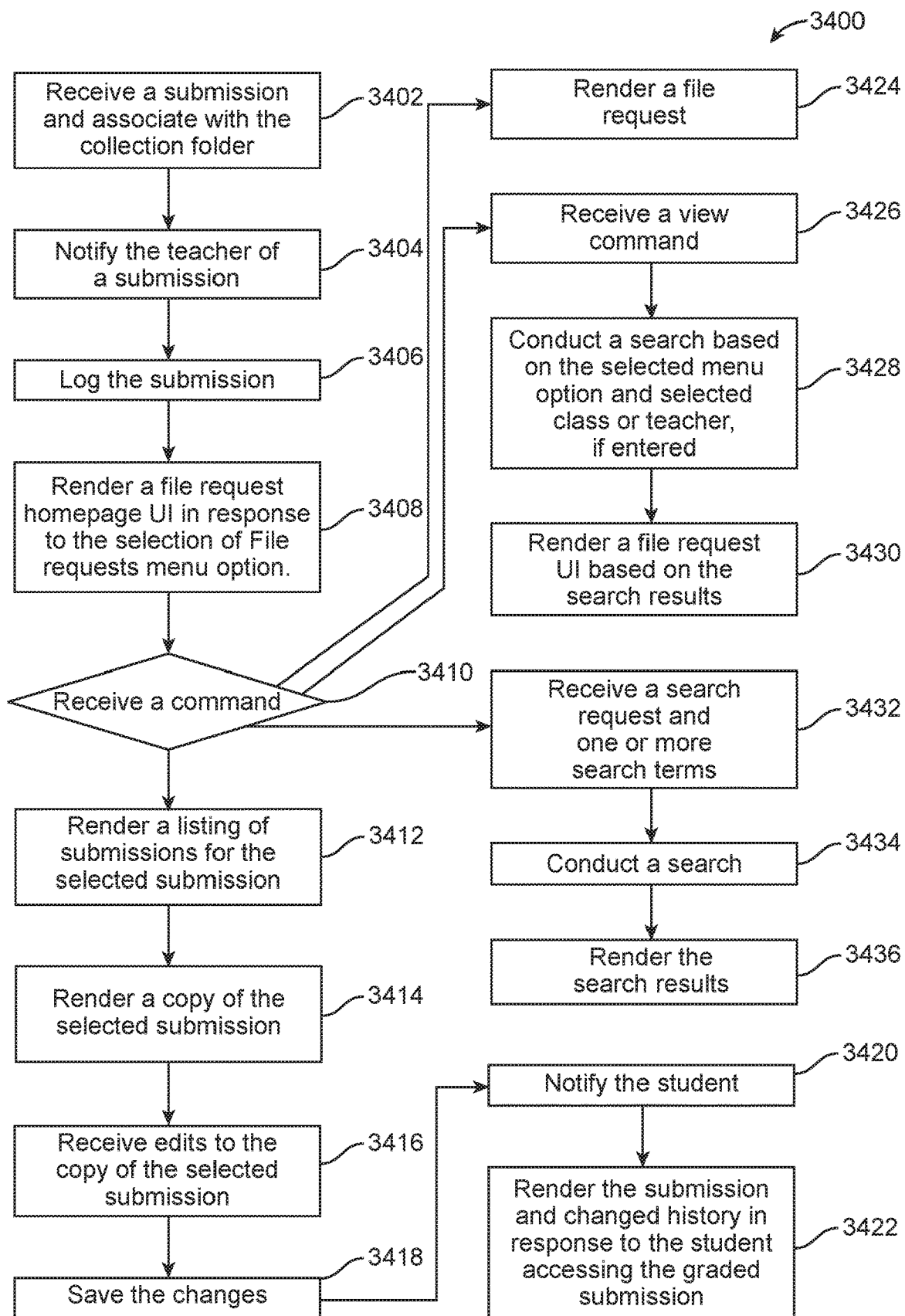
FIG. 34 is a flow diagram for a method to review one or more submissions in accordance with an exemplary embodiment.

Referring to FIG. 34, a flow diagram for reviewing one or more submissions in accordance with an exemplary embodiment is illustrated. The exemplary method 3400 is provided by way of example, as there are a variety of ways to carry out the method. The method 3400 described below can be carried out using the configurations illustrated in FIG. 1 by way of example, and various elements of this figure are referenced in explaining exemplary method 3400. Each block shown in FIG. 34 represents one or more processes, methods or subroutines, carried out in the exemplary method 3400. The exemplary method 3400 is described with respect to an application operating on a client device $102_i$. However, one of ordinary skill in the art would recognize that the method 3400 can be performed via a browser on a client device $102_i$ as known in the art. The exemplary method 3400 can begin at block 3402.

At block 3402, receive a submission and associate with the collection folder. For example, content management system 106 and/or file request module 132 receives a submission from a student and associates the submission with the collection folder. The submission can include one or more files and one or more associated metadata tags. For example, the one or more metadata tags can identify the school, teacher, class, term, assignment and student. After receiving a submission and associating the submission with the collection folder, method 3400 can proceed to block 3404.

At block 3404, notify the teacher of a submission. For example, content management system 106 and/or file request module 132 monitors submissions. Submissions are discussed in further detail below. In response to a submission to a file requests, a notification can be provided to the teacher. Notifications can include, but is not limited to, email, text message, posting to the account, application notifications (E.g., in-band notifications) or any other for notifications. For example, content management system 106, file request module 132 and/or email module 136 sends an email message to the teacher informing the teacher that a student submitted an assignment in response to the file request. An exemplary email message can be, "Jose Nunez submitted an assignment to Homework 5 on Sep. 14, 2015 at 2:00 PDT." After notifying the teacher of a submission, method 3400 can proceed to block 3406.

At block 3406, log the submission. For example, content management system 106 and/or file request module 132 logs the submission in an activity log. The logging of a submission can include updating the number of submissions that are received for a given file request, identifying the student who submitted the submission using the user id and/or metadata tag and if the submission is received during the late submission period, the submission can be logged as a late submission. After logging the submission, method 3400 can proceed to block 3408.

Figure 22:
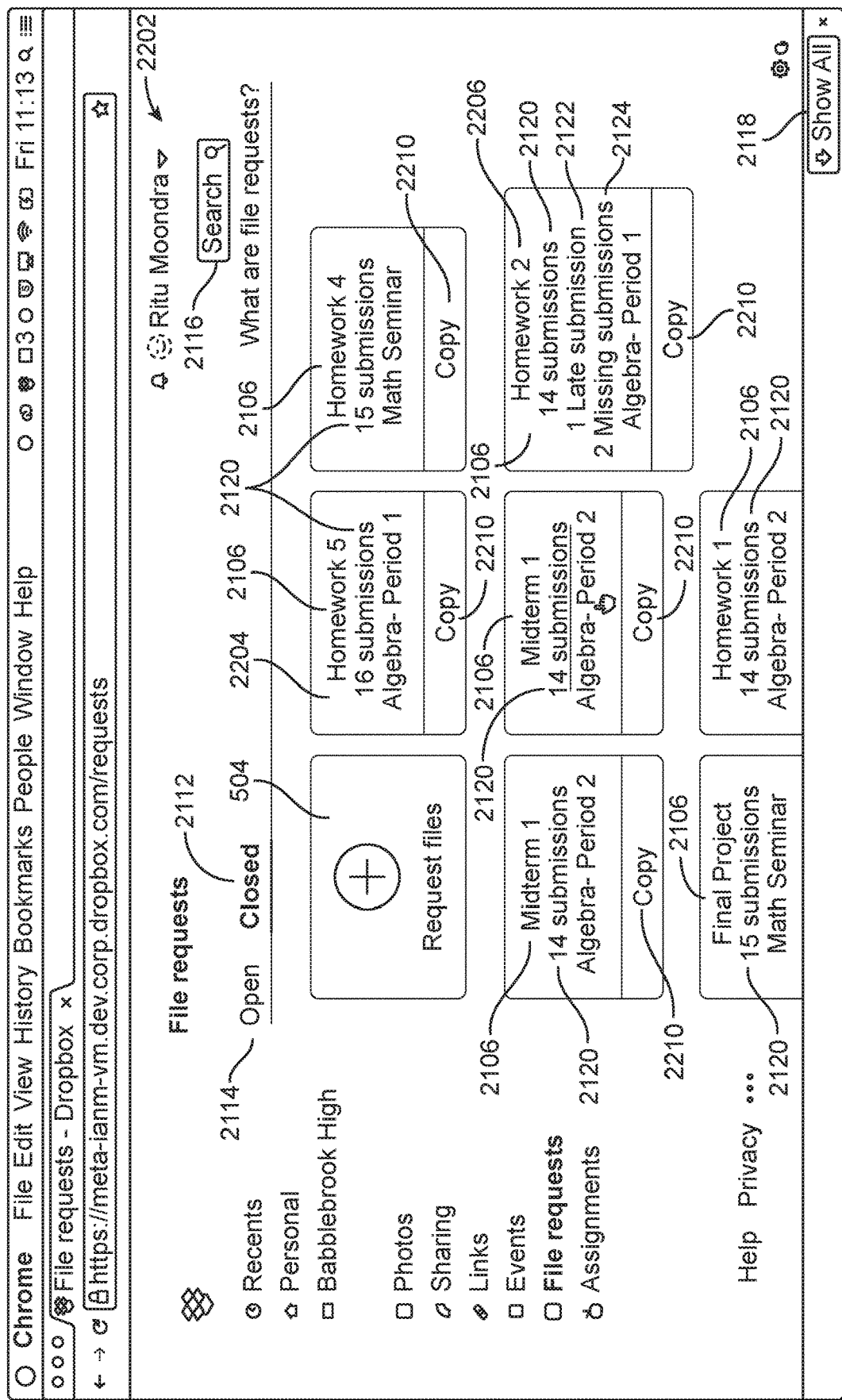
FIG. 22 is a closed file request UI rendering closed file requests and a file requests file icon to create a file request in accordance with an exemplary embodiment.

At block 3408, render a file request homepage UI in response to the selection of File requests menu option. For example, content management system 106 and/or file request module 132 causes the rendering of a file request homepage UI on the teacher's client device $102_i$. FIG. 21 shows a file request homepage UI 2102 for open file requests. An open file request is a file request that has not reached the deadline and/or late submission deadline. FIG. 22 shows a file request homepage UI 2202 for closed file requests. A closed file request is a file request that is past the deadline and/or late submission deadline. The teacher can access either one by selecting Open button 2214 or Closed button 2212. The rendered file request homepage UI is based on the metadata tags associated with the teacher, such as a teacher identifier. After rendering the file request homepage UI, method 3400 can proceed to block 3410.

At block 3410, receive a command. For example, content management system 106 and/or file request module 132 receives a command. The command can include a Request files, Edit, Add people, Copy, view submissions, view late submissions, view missing submissions, view file request, view, or search. A Request file command is received in response to the teacher selecting the Request files icon 504 in FIGS. 21 and 22. In response to receiving a Request files icon, method 3400 can proceed to block 304 of FIG. 3. An Edit command is received in response to the teacher selecting the Edit button 2106 shown in FIG. 21. In response to receiving an edit command, method 3400 can proceed to block 3404 to allow the teacher to edit the file request. An Add people command is received in response to the teacher selecting the Add people button 2108 shown in FIG. 21. In response to receiving an Add people command, method 3400 can proceed to block 310 of FIG. 3 to allow the teacher to add one or more students to the file request. A copy command is received in response to the teacher selecting Copy button 2110 shown in FIGS. 21 and 22. In response to receiving a Copy command, method 3400 can proceed to block 310 of FIG. 3. A view submissions command is received in response to the teacher selecting the submissions button 2120 shown in FIGS. 21 and 22. In response to receiving a view submission command, method 3400 can proceed to block 3412. A view late submissions command is received in response to the teacher selecting the late submissions button 2122 shown in FIG. 22. In response to receiving a view late submission command, method 3400 can proceed to block 3412. A view missing submissions command is received in response to the teacher selecting the missing submissions button 2124 shown in FIG. 22. In response to receiving a view missing submission command, method 3400 can proceed to block 3412. A view file request command is received in response to the teacher selecting a file request 2106 shown in FIGS. 21 and 22. In response to receiving a view file request command, method 3400 can proceed to block 3426. A view command is received in response to the teacher selecting the view button 2118 shown in FIGS. 21 and 22. In response to receiving a view command, method 3400 can proceed to block 3428 shown in FIGS. 21 and 22. A search command is received in response to the teacher selecting the Search button 2116 shown in FIGS. 21 and 22. In response to receiving a Search command, method 3400 can proceed to block 3434.

Figure 35:
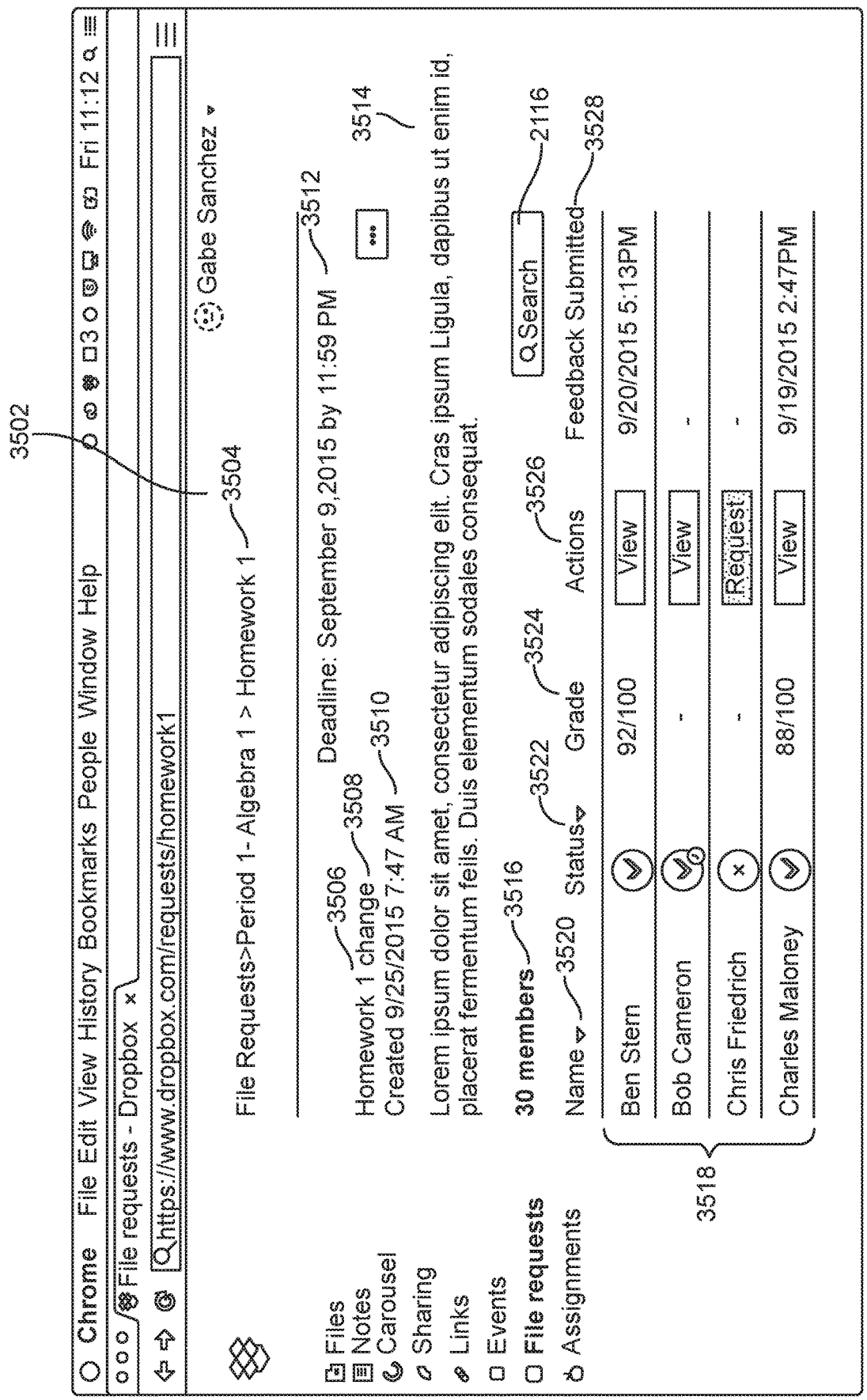
FIG. 35 is a submission UI rendering a listing of submissions for an assignment in accordance with an exemplary embodiment.
Figure 36:
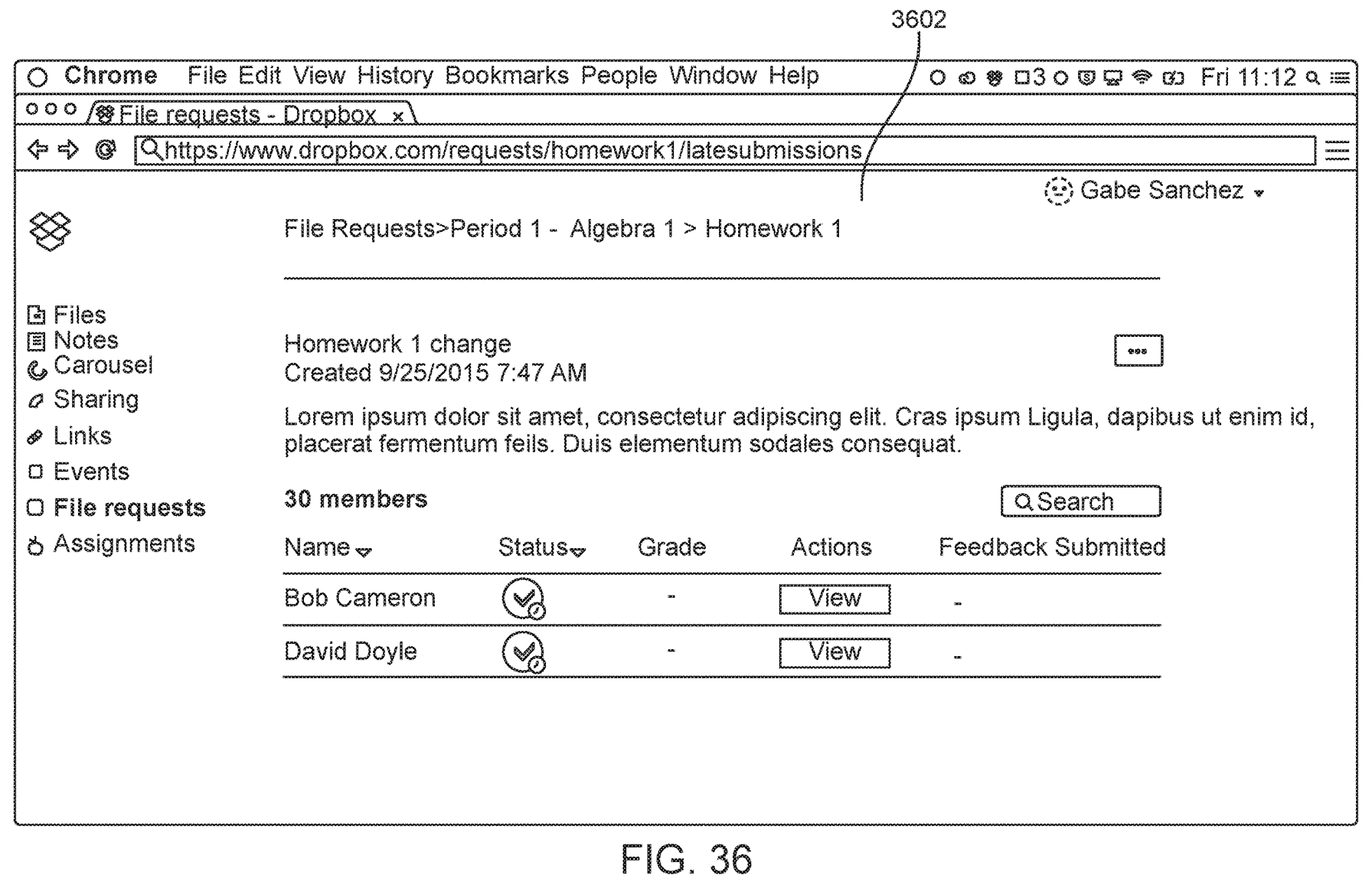

At block 3412, render a listing of submissions for the selected submission. For example, content management system 106 and/or file request module 132 causes the rendering of a submission UI or dashboard displaying a listing of submissions that are associated with the file request and the submission button that was selected. If the submission button 2120 was selected, the listing of submissions can include the status of submissions for all of the students. Alternatively, the listing of submissions can include the a listing of submissions that were submitted on time. FIG. 35 shows a submission UI or dashboard 3502 displaying a listing of submissions. As shown, the submission UI or dashboard 3502 can include the name of the file request 3504, name of assignment 3506, change button 3508, creation date 3510, deadline 3512, comment 3514, search button 2116, number of students associated with the file request 3516 and a submission listing 3518. As shown, the name of the file request is Period 1—Algebra 1>Homework 1 3504 and the name of the assignment is Homework 1 3506. Change button 3508 allows the teacher to select a different assignment. The creation date is Sep. 2, 2015 at 7:47 AM 3510 and the deadline is September 9, 2015 by 11:59 PM 3512. The comment 3514 is the comment the teacher submitted when creating the file request. There are thirty students associated with the file request 3516. The submission listing 3518 can be scrollable with four submissions shown in this figure. The listing can include student name 3520, status indicator 3522, grade 3524, action buttons 3526 and feedback indicator 3528. Student name 3520 can be the names of the students associated with the file request. Status indicator 3522 can identify the status of the assignment. For example, a circle with a check can indicate that the submission was on time, a circle with a clock can indicate that the submission was submitted in a late submission period, a circle with three dots can indicate that the assignment is pending, and a circle with an X can indicate that no submission was made and the submission period has ended. Each status indicator can include a color. For example, green can indicate a timely submission, yellow can indicate a late submission, red can indicated no submission and blue can indicate a pending assignment. Grade 3524 can be the grade for the assignment. Action 3526 can be View and/or Request. By selecting View, the teacher can review a submission. By selecting Request, the teacher can allow a student to submit an assignment that is beyond the deadline. Feedback indicator 3528 identifies the time the teacher submitted the feedback, e.g., graded the submission. FIG. 36 shows a late submission UI or dashboard 3602 displaying a listing of late submissions. As shown, there are two late submissions for Period 1—Algebra 1>Homework 1. FIG. 37 shows a missing submission UI or dashboard 3702 displaying a listing of missing submissions. As shown there are two missing submissions for Period 1—Algebra 1>Homework 1. If the View action is selected, method 3400 can proceed to block 3414.

Figure 38:
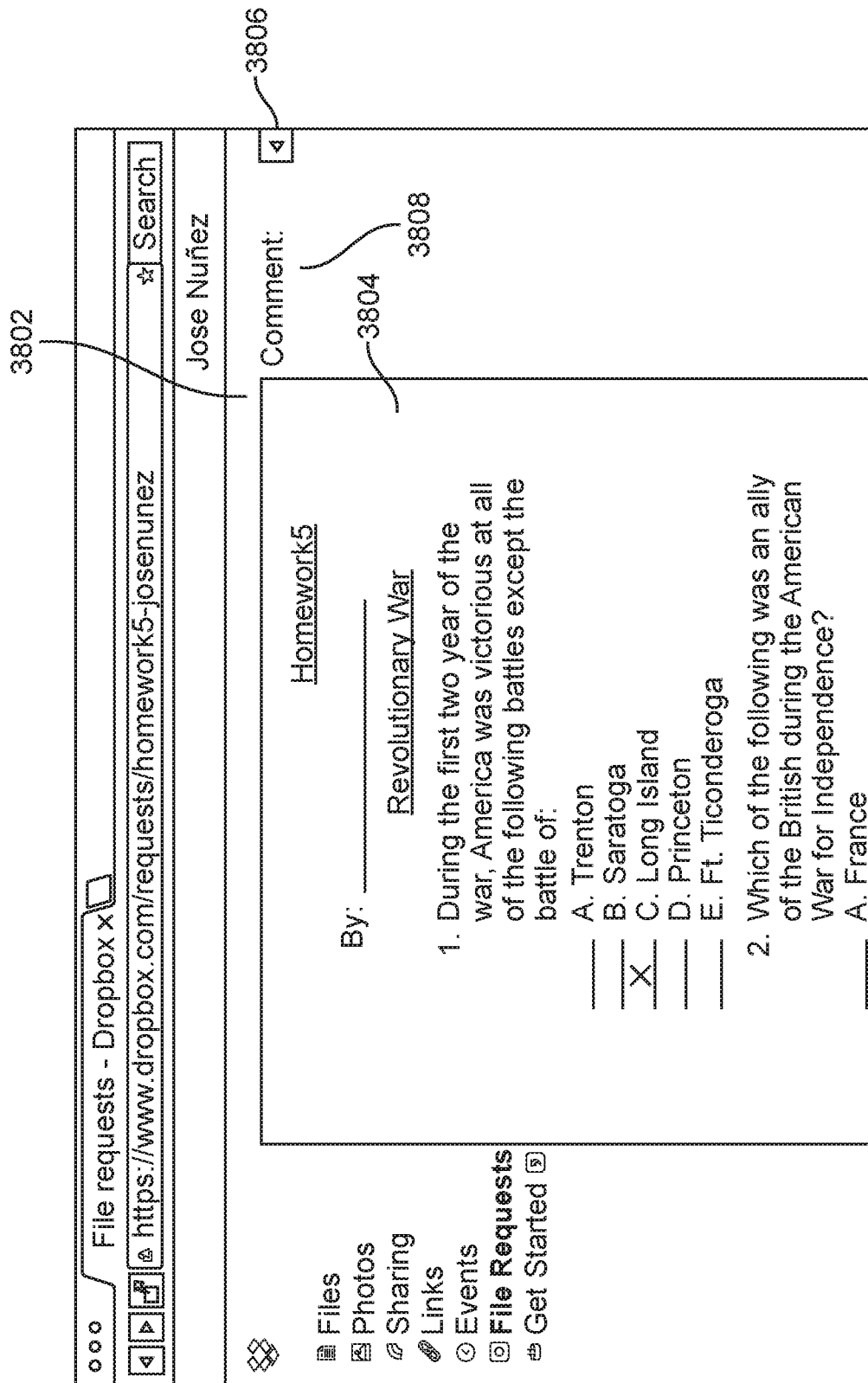
FIG. 38 is a document UI rendering a copy of a submission in accordance with an exemplary embodiment.

At block 3414, render a copy of the selected submission. For example, content management system 106 and/or file request module 132 causes the rendering of a document UI displaying a copy of the selection submission. FIG. 38 shows a document UI 3802 displaying a copy of Homework 5, e.g., Jose Nunez's Homework 5. After rendering a copy of the selected submission, method 3400 can proceed to block 3416.

At block 3416, receive edits to the copy of the selected submission. For example, content management system 106 and/or file request module 132 receives edits that the teacher makes to the document. The teacher can edit the copy of the document 3804, e.g., mark the document up by indicating right answers and/or wrong answers. When finished the teacher can select grade icon 3806 to render a prompt to enter a grade for the assignment. The teacher can also enter a comment in comment section 3808. For example, the teacher can enter "Great job!" in comment section 3808. After editing the copy of the selected submission, method 3400 can proceed to block 3418.

At block 3418, save the changes. For example, content management system 106 and/or file request module 132 saves the edits in as a change history in a changed history file. The changed history file can be saved when the teacher exits the document. The change history file can include a set of changes that, when applied to the original file version, produce the changed file version. The entered grade can be saved in the changed history file. The entered grade can also be saved in a grade book that is associated with the class, e.g., U.S. History—Period 5. If the teacher entered one or more comments, the one or more entered comments can be saved in the changed history file. The changed history file can be stored in the collection folder along with one or more metadata tags. For example, a metadata tag can store a time stamp when the file was saved. The saved document can include permissions associated with the copy. For example, the teacher can edit the document if the teacher accesses the document again. The student can have read only access to the document. A pointer to the graded submission can be associated with the student's user account. After saving the changes, method 3400 can proceed to block 3420.

At block 3420, notify the student. For example, content management system 106 and/or file request module 132 notifies the student of the graded submission. Notifications can include, but is not limited to, email, text message, posting to the account, application notifications (e.g., in-band notifications) or any other for notifications. For example, content management system 106, file request module 132 and/or email module 136 sends an email message to the teacher informing the student that a teacher graded the submission. An exemplary email message can be, "Teacher Shields graded Homework 5—U.S. History on Sep. 14, 2015 at 2:00 PDT." The email message can include a hyperlink to the graded submission and changed history file. After notifying the student, method 3400 can proceed to block 3422.

At block 3422, render the submission and changed history in response to the student accessing the graded submission. For example, content management system 106 and/or file request module 132 causes the rendering of the graded submission on client device 102$_i$. The rendered graded submission includes the edits that the teacher entered, including the grade and any comments that were entered. The student can access the graded submission by clicking on a link in the email message and/or by accessing their user account.

Figure 23:
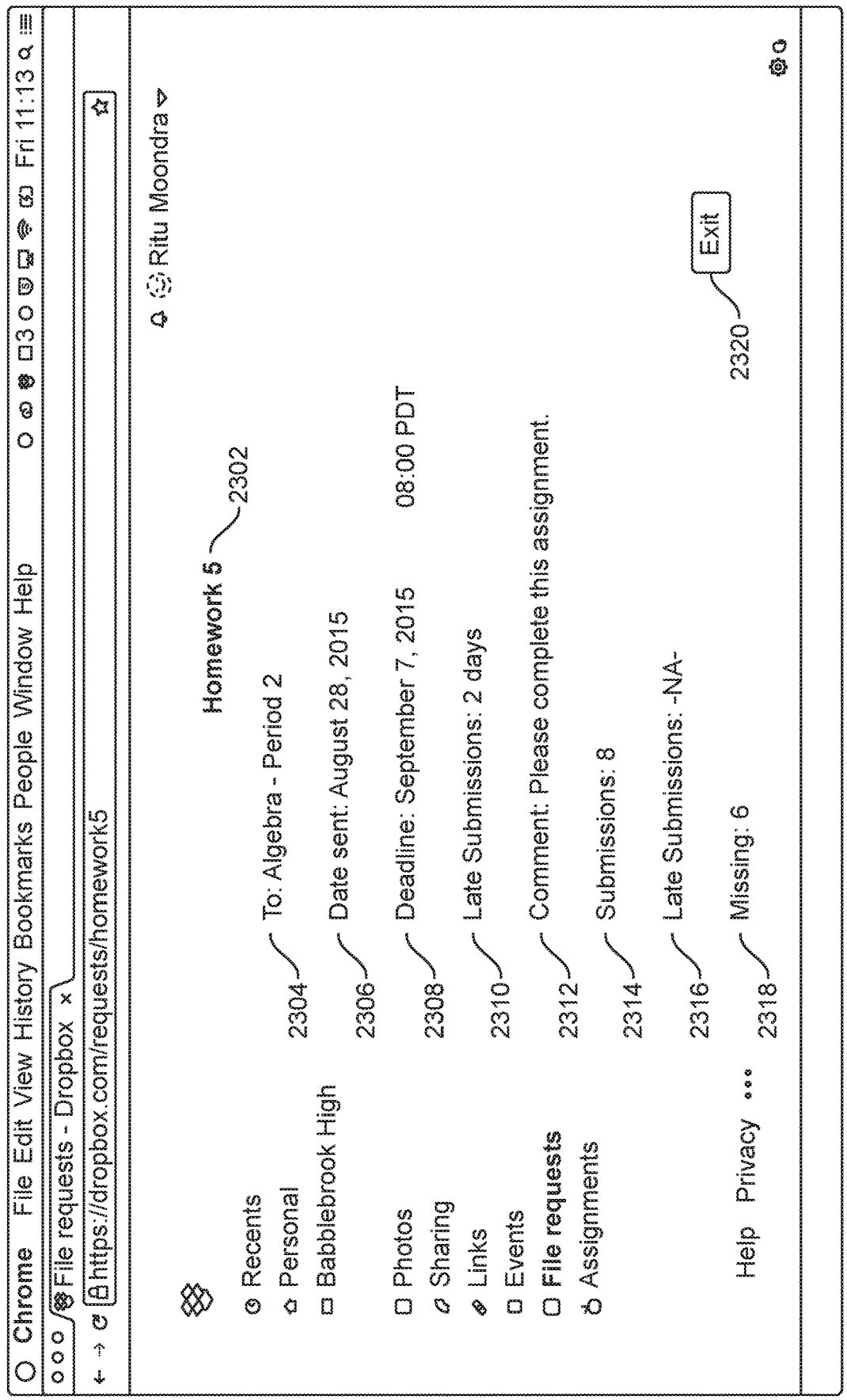
FIG. 23 is a file request UI rendering a selected file request in accordance with an exemplary embodiment.

At block 3424, render a file request. For example, content management system 106 and/or file request module 132 causes the rendering of a file request on client device 102$_i$. The file request can display information associated with the file request along with submission information. FIG. 23 shows an exemplary file request for Homework 5. As shown, the title of the file request is Homework 5 2302, the file request was sent to Algebra—Period 2 2304, was sent on Aug. 28, 2015 2306, has a deadline of Sep. 7, 2015 at 08:00 PDT 2308, with a late submission of two days 2310, the comment, "Please complete this assignment." 2312, has received eight submission 2314, no late submissions since the due date has not been reached and is missing six submissions 2316. In response to the teacher selecting the Exit button 2320, method 3400 can proceed to block 3410.

At block 3426, receive a view command. For example, content management system 106 and/or file request module 132 receives a view command. FIGS. 21 and 22 show a view button 2218 with Show All being the current view. By selecting the view button 2118, a menu can be displayed listing different views. For example, the views can be by class or by teacher using the associated one or more metadata tags, such as a class identifier or teacher identifier. By selecting class or teacher, a second menu can displayed that lists the different classes or teachers, respectively, and the teacher can select a class or teacher, respectively. After receiving a view command, method 3400 can proceed to block 3428.

At block 3428, conduct a search based on the selected menu option and selected class or teacher, if entered. For example, content management system 106 and/or file request module 132 searches the file request and associated one or more metadata tags. The search can be limited to open file requests or closed file request depending on which File Request UI is displayed, e.g., open file requests in FIG. 21 and closed file requests in FIG. 22. After conducting a search, method 3400 can proceed to block 3430.

At block 3430, render a file request UI based on the search results. For example, content management system 106 and/or file request module 132 causes the rendering of the file requests based on the search results.

At block 3432, receive a search request and one or more search terms. For example, content management system 106 and/or file request module 132 receives a search request in response to a teacher selecting search icon 2214 and entering one or more search terms. The search terms can include, but is not limited to, teacher name, group name, email address, class name, student name, file request name, submissions, late submissions, missing submissions, keyword, open file requests and closed file requests. The teacher name refers to a teacher associated with the file requests. The group name refers the group associated with one or more file requests. The email address refers to the email address of who a file request was sent to or who a file request was received from. The class name refers to a class name. Student name refers to a student. Submissions refer to submissions received by a student. Late submissions refer to submissions that were received in the late submission period. Missing submissions refer to students who did not respond to a file request in a timely manner. Keyword refers to a keyword in a file request and/or in a submission. Open file requests refer to open file requests. Closed file request refer to closed file requests. In an alternate embodiment, a search UI can be displayed with different prompts for these items and a teacher can enter one or more keywords to search with respect to a prompt. For example, the teacher can enter a student names under late submissions to receive a list of submissions from a student that were submitted during the late submission period. In another example, the teacher can enter a keyword for a keyword prompt and enter a student's name for the student prompt to identify one or more submissions from the designated student that contains the keyword. After receiving a search request and search terms, method 3400 can proceed to block 3434.

At block 3434, conduct a search. For example, content management system 106 and/or file request module 132 searches file requests, metadata tags associated with the file requests and submissions based on the one or more search terms. The one or more search terms can be searched in content storage 160 for file requests and submissions that are associated with a school associated with the teacher requesting the search. After conducting the search, method 3400 can proceed to block 3436.

At block 3436, render the search results. For example, content management system 106 and/or file request module 132 renders the search results on a search result UI on client device $102_i$. Depending on the search request, the search results can render a list of submissions icon and/or a list of file requests. If a search results in a single submission, the submission can be rendered.

Releasing and/or Sharing Submissions

Figure 39:
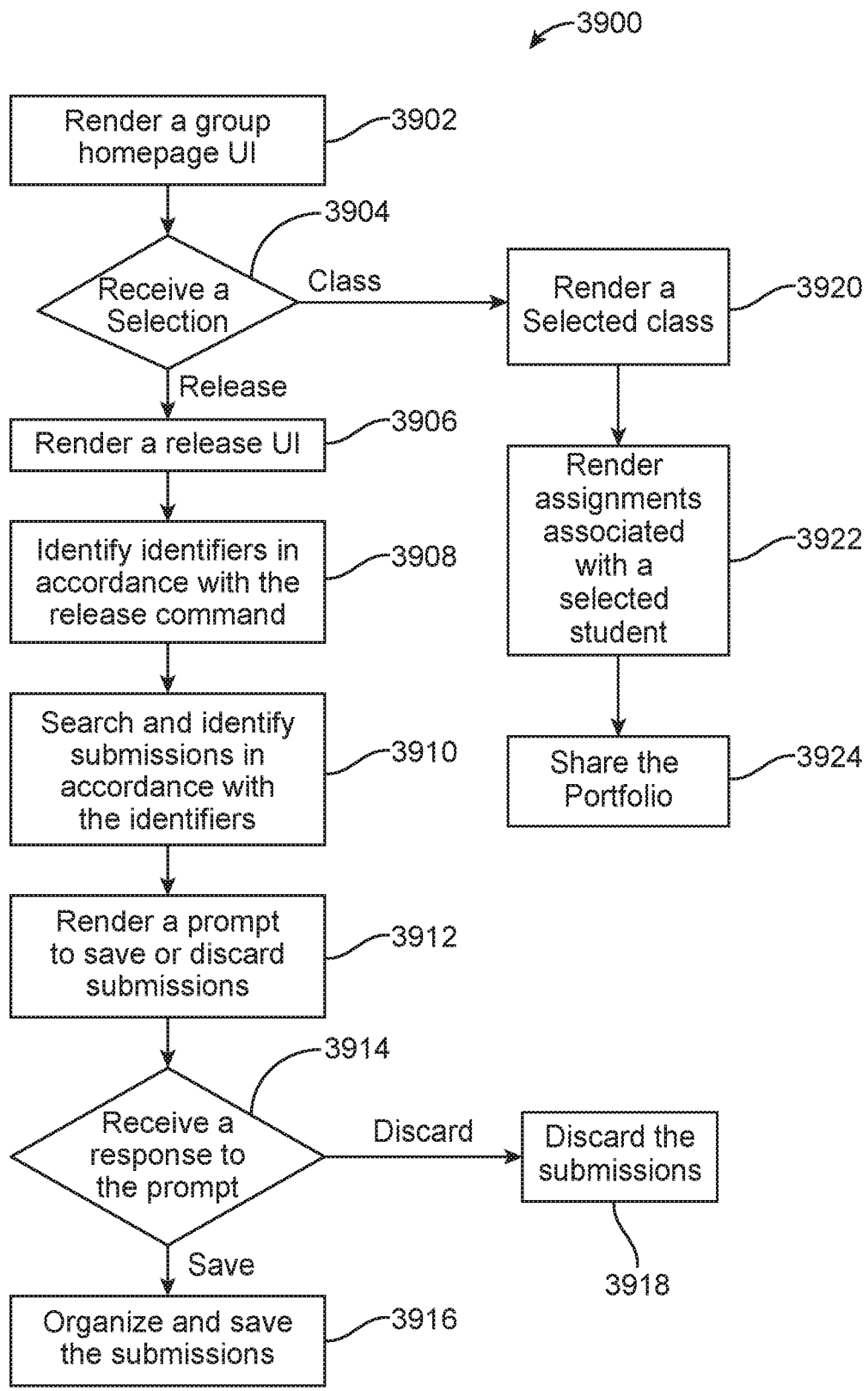
FIG. 39 is a flowchart of a method for releasing and/or sharing submissions in accordance with an exemplary embodiment.

Referring to FIG. 39, a flow diagram for releasing and/or sharing submissions in accordance with an exemplary embodiment is illustrated. The exemplary method 3900 is provided by way of example, as there are a variety of ways to carry out the method. The method 3900 described below can be carried out using the configurations illustrated in FIG. 1 by way of example, and various elements of this figure are referenced in explaining exemplary method 3900. Each block shown in FIG. 39 represents one or more processes, methods or subroutines, carried out in the exemplary method 3900. The exemplary method 3900 is described with respect to an application operating on a client device $102_i$. However, one of ordinary skill in the art would recognize that the method 3900 can be performed via a browser on a client device $102_i$ as known in the art. The exemplary method 3900 can begin at block 3902.

At block 3902, render a group homepage UI. For example, content management system 106 renders a group homepage UI which lists one or more groups associated with an entity, such as a school. FIG. 4 shows a group homepage UI 402 which list six different groups 404 associated with a school, e.g., Babblebrook High School 406. A teacher or administrator can release submissions by selecting Release button 418. A teacher or administrator can share submissions by selecting a class. After rendering the group homepage UI, method 3900 can proceed to block 3904.

At block 3904, receive a selection. For example, content management system 106, file sharing module 130 and/or release module 140 receives a selection. If the selection is of the Release button 418, method 3900 can proceed to block 3904. If the selection is of a class, method 3900 can proceed to block 3920.

Figure 40:
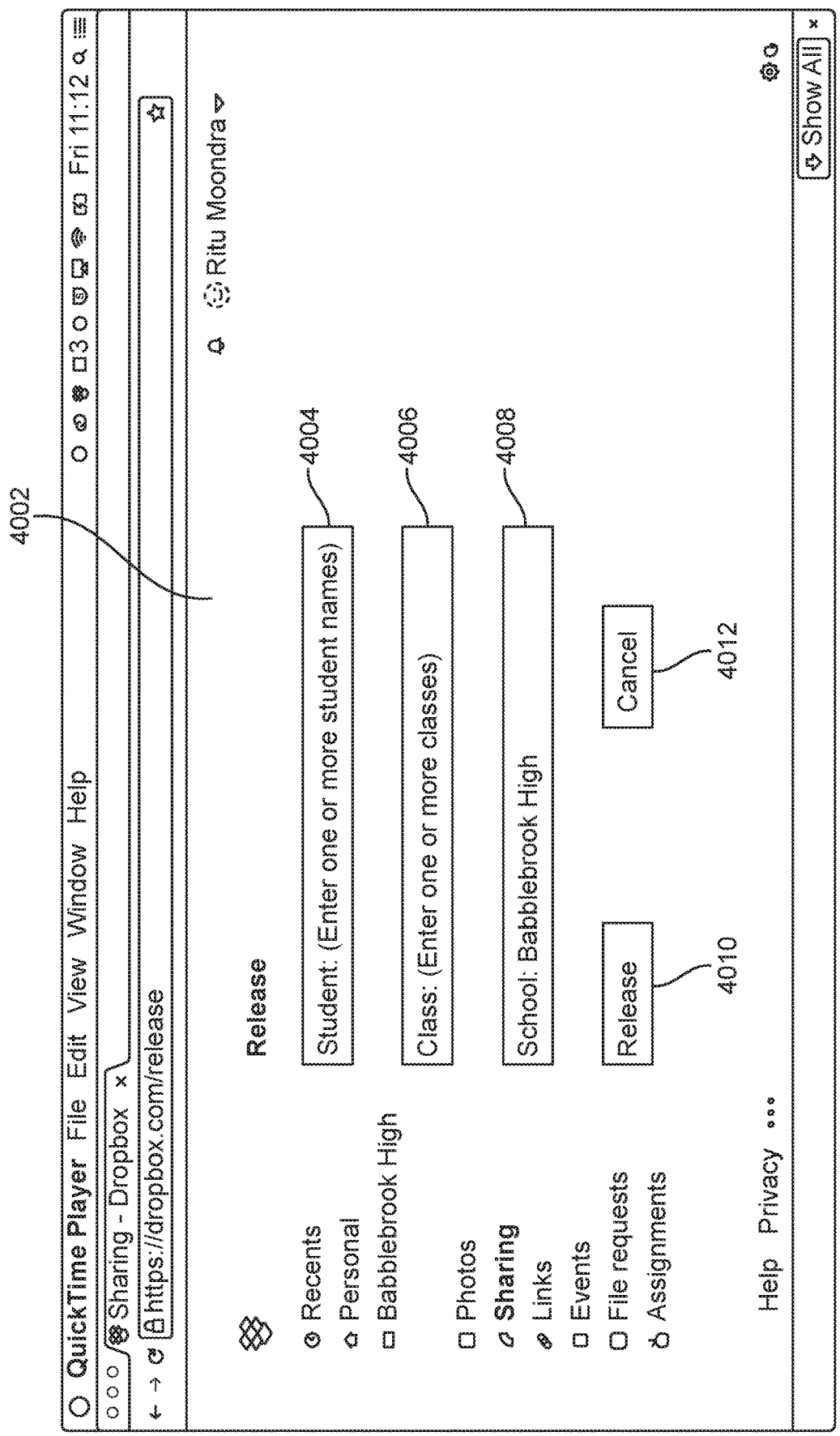
FIG. 40 is a release UI rendering prompts to release submissions in accordance with an exemplary embodiment.

At block 3906, render a release UI. For example, content management system 106 and/or release module 140 renders a release UI. FIG. 40 shows a release UI 4002 rendered on client device $102_i$ and displaying prompts. The prompts can be student prompt 4004 and class prompt 4006. The user, e.g., teacher or administrator can enter one or more students' name to release submissions associated with each student or can enter one or more classes to release submissions associated with each class. The school prompt can be automatically filled with the school. By entering one or more student's names and selecting Release button 4010, a student release command is generated by release module 140 and submissions associated with each entered student can be released. By entering one or more classes and selecting Release button 4010, a class release command is generated by release module 140 and submissions associated with students in each entered class can be released. By not entering any student names or class names and selecting Release button 4010, a school release command is generated by release module 140 and submissions for each student in the school can be released. In response to selecting Release button 4010, method 3900 can proceed to block 3908. In response to selecting Cancel button 4012, the release can be canceled and method 3900 can proceed to block 3902.

At block 3908, identify identifiers in accordance with the release command. For example, content management system 106 and/or release module 140 searches and identifies identifiers associated with the released command. For example, for a student release command, student identifiers for each entered student's name are identified. For a class release command, student identifiers and class identifiers for each student associated with each entered class are identified. For a school release command, student identifiers and school identifiers are identified. After identifying the identifiers in accordance with the release command, method 3900 can proceed to block 3910.

At block 3910, search and identify submissions in accordance with the identifiers. For example, content management system 106 and/or release module 140 searches and identifies submissions associated with the identifiers. For example, for a student release command, all of the submissions associated with the student identifiers are searched and identified. For a class release command, all of the submissions associated with the student identifiers and class identifiers are searched and identified. For a school release command, all of the submission associated with the student identifiers and school identifiers are search and identified. Identifying submissions can include generated a list of submissions and their locations within the content storage 160. After searching and identifying submissions in accordance with the release command, method 3900 can proceed to block 3912.

Figure 41:
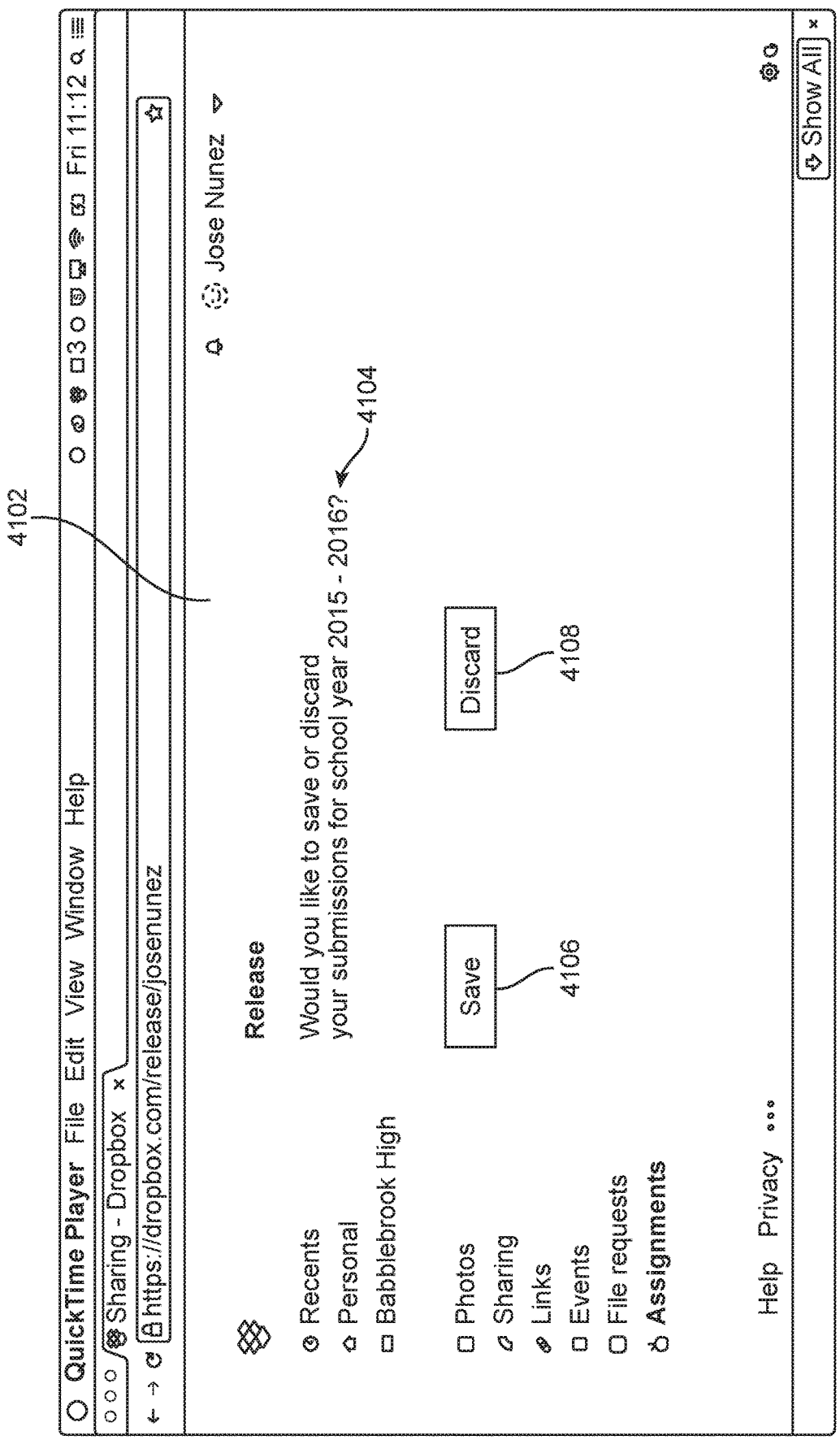
FIG. 41 is a student UI rendering prompts to save or discard released submissions in accordance with an exemplary embodiment.

At block 3912, render a prompt to save or discard submissions. For example, content management system 106 and/or release module 140 renders a student UI on client device 102$_i$ prompting the student to save or discard their submissions. The student UI can be rendered in response to a student receiving an email message and selecting a link to the student UI or the student accessing the content management system 106 after the release. FIG. 41 shows a student UI 4102 displaying a release message 4104 prompting the student to save or discard their submissions. For example, the release message recites, "Would you like to save or discard your submissions for School Year 2015-2016?" 4104. The message can be for a student release or school release. A different message can be displayed for a class release. For example, the message can be, "Would you like to save or discard your submissions for U.S. History?" To save the submissions, the student can select Save button 4106. To discard the submissions, the student can select Discard button 4108. After rendering the prompt to save or discard the submissions, method 3900 can proceed to block 3914.

At block 3914, receive a response to the prompt. For example, content management system 106 and/or release module 140 receives a response to the prompt. The response can be to save the submissions or to discard the submissions. If the received response is to save the submissions, method 3900 can proceed to block 3916. If the received response is to discard the submissions, method 3900 can proceed to block 3918.

At block 3916, organize and save the submissions. For example, content management system 106 and/or release module 140 organizes and saves the submissions. Based on the metadata tags associated with the submissions, the submissions can be organized by school year and class. Save submissions can be saved in the user account associated with the student. For example, a pointer can be stored in the user's account with the pointer identifying where the saved submissions are stored in content storage 160 or can be archived in a different storage location.

At block 3918, discard the submissions. For example, content management system 106 and/or release module 140 deletes the submissions from content storage 160.

At block 3920, render a selected class. For example, content management system 106 and/or sharing module 130 renders a class UI on client device 102$_i$. FIG. 42 shows a class UI 4202 rendering a scrollable list of students in a corresponding class based on the metadata tags associated with the selected class. As shown, the selected class is Algebra—Period 1. The selected class has 16 members in the class. The scrollable list shows four students. The scrollable list includes student names 4204, email addresses 4206, joined date 4208 and menu button 4210. By selecting menu button 4210, a menu 4212 is displayed with Remove User 4214 menu option and View Portfolio 4216 menu option. By selecting Remover User 4214 menu option, a student can be removed from the group. By selecting View Portfolio 4216 menu option, assignments associated with a student can be viewed. In response to View Portfolio 4216 menu option being selected, method 3900 can proceed to block 3922.

At block 3922, render assignments associated with a student. For example, content management system 106 and/or sharing module 130 renders an assignment UI on client device 102$_i$. FIG. 43 shows an assignment UI 4302 rendering a list of assignments corresponding to a student based on metadata tags associated with selected student and class. As shown, ten assignments associated with Ben Stern, the selected student, are displayed. The scrollable list of assignments includes assignment names 4304, modification dates 4306 and grades 4308. Assignment UI 4302 also displays Share Portfolio button 4310. By selecting Share Portfolio button 4310, the assignments associated with the selected student can be shared. In response to Share Portfolio button 4310 being selected, method 3900 can proceed to block 3924.

At block 3924, share the portfolio. For example, content management system 106 and/or sharing module 130 allow the portfolio to be shared. To share the portfolio associated with the selected student, the teacher or administrator can copy and paste a link in an email and/or allows the teacher to enter a user identifier, e.g., a name or email address associated with a user account to share the portfolio associated with the student. The student portfolio can be shared with the student, parent, guardian, guidance counselor, administrator or any other person the teacher or administrator designates.

While content management system 106 is presented with specific components, it should be understood by one skilled in the art, that the architectural configuration of system 106 is simply one possible configuration and that other configurations with more or less components are also possible. The term module can be software that resides in memory of the client device 102$_i$ and/or on one or more servers of the content management system 106 and performs one or more functions when a processor executes the software associated with the module. The memory can be a non-transitory computer-readable medium.

Figure 44A:
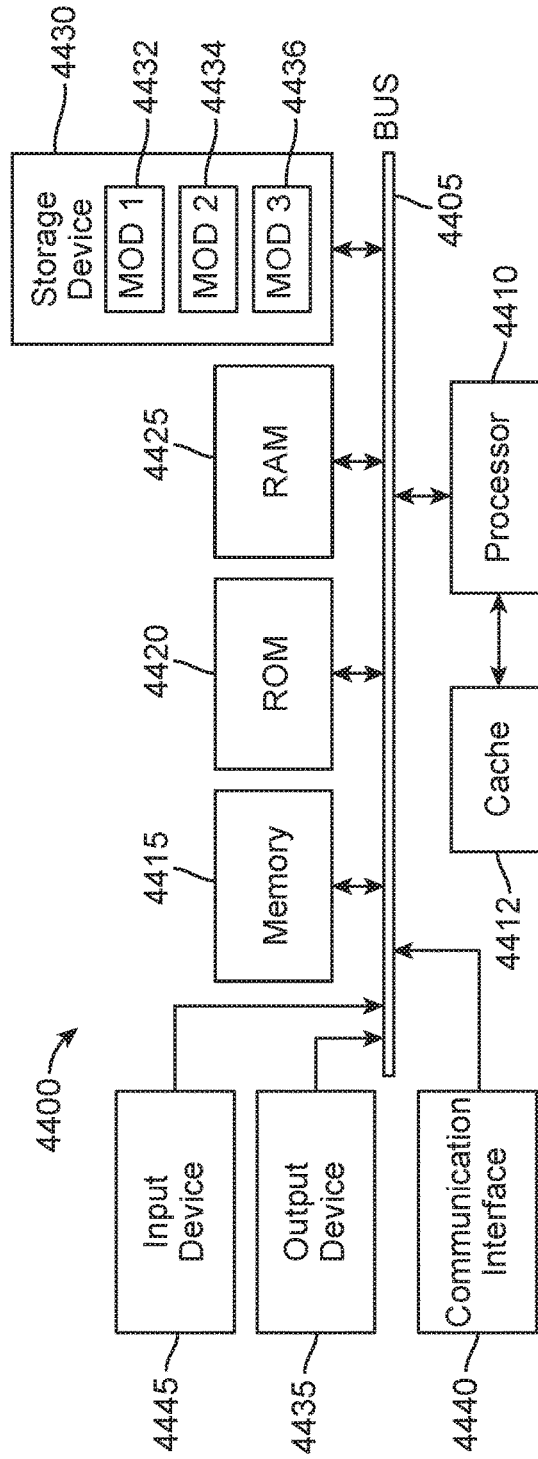
FIG. 44A is a block diagram of a system for implementing various embodiments of the present technology in accordance with an exemplary embodiment.
Figure 44B:
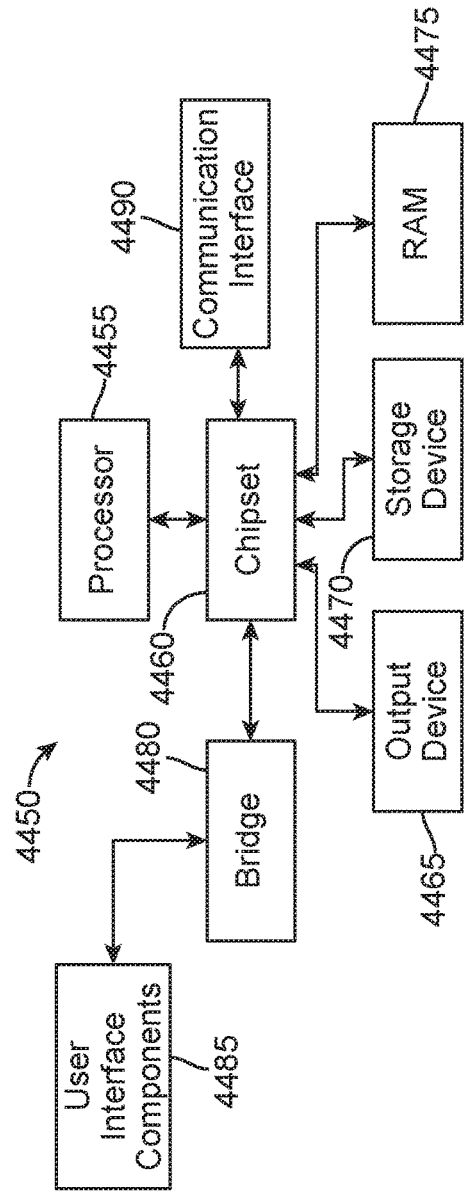
FIG. 44B shows an exemplary possible system embodiment for implementing various embodiments of the present technology in accordance with an exemplary embodiment.

FIGS. 44A and 44B show exemplary possible system embodiments. The more appropriate embodiment will be apparent to those of ordinary skill in the art when practicing the present technology. Persons of ordinary skill in the art will also readily appreciate that other system embodiments are possible.

FIG. 44A illustrates a conventional system bus computing system architecture 4400 wherein the components of the system are in electrical communication with each other using a bus 4405. Exemplary system 4400 includes a processing unit (CPU or processor) 4410 and a system bus 4405 that couples various system components including the system memory 4415, such as read only memory (ROM) 4420 and random access memory (RAM) 4425, to the processor 4410. The system 4400 can include a cache of high-speed memory connected directly with, in close proximity to, or integrated as part of the processor 4410. The system 4400 can copy data from the memory 4415 and/or the storage device 4430 to the cache 4412 for quick access by the processor 4410. In this way, the cache can provide a performance boost that avoids processor 4410 delays while waiting for data. These and other modules can control or be configured to control the processor 4410 to perform various actions. Other system memory 4415 may be available for use as well. The memory 4415 can include multiple different types of memory with different performance characteristics. The processor 4410 can include any general purpose processor and a hardware module or software module, such as module 1 4432, module 2 4434, and module 3 4436 stored in storage device 4430, configured to control the processor

4410 as well as a special-purpose processor where software instructions are incorporated into the actual processor design. The processor 4410 may essentially be a completely self-contained computing system, containing multiple cores or processors, a bus, memory controller, cache, etc. A multi-core processor may be symmetric or asymmetric.

To enable user interaction with the computing device 4400, an input device 4445 can represent any number of input mechanisms, such as a microphone for speech, a touch-sensitive screen for gesture or graphical input, keyboard, mouse, motion input, speech and so forth. An output device 4435 can also be one or more of a number of output mechanisms known to those of skill in the art. In some instances, multimodal systems can enable a user to provide multiple types of input to communicate with the computing device 4400. The communications interface 4440 can generally govern and manage the user input and system output. There is no restriction on operating on any particular hardware arrangement and therefore the basic features here may easily be substituted for improved hardware or firmware arrangements as they are developed.

Storage device 4430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 4425, read only memory (ROM) 4420, and hybrids thereof.

The storage device 4430 can include software modules 4432, 4434, 4436 for controlling the processor 4410. Other hardware or software modules are contemplated. The storage device 4430 can be connected to the system bus 4405. In one aspect, a hardware module that performs a particular function can include the software component stored in a computer-readable medium in connection with the necessary hardware components, such as the processor 4410, bus 4405, display 4435, and so forth, to carry out the function.

FIG. 44B illustrates a computer system 4450 having a chipset architecture that can be used in executing the described method and generating and displaying a graphical user interface (GUI). Computer system 4450 is an example of computer hardware, software, and firmware that can be used to implement the disclosed technology. System 4450 can include a processor 4455, representative of any number of physically and/or logically distinct resources capable of executing software, firmware, and hardware configured to perform identified computations. Processor 4455 can communicate with a chipset 4460 that can control input to and output from processor 4455. In this example, chipset 4460 outputs information to output 4465, such as a display, and can read and write information to storage device 4470, which can include magnetic media, and solid state media, for example. Chipset 4460 can also read data from and write data to RAM 4475. A bridge 4480 for interfacing with a variety of user interface components 4485 can be provided for interfacing with chipset 4460. Such user interface components 4485 can include a keyboard, a microphone, touch detection and processing circuitry, a pointing device, such as a mouse, and so on. In general, inputs to system 4450 can come from any of a variety of sources, machine generated and/or human generated.

Chipset 4460 can also interface with one or more communication interfaces 44440 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 4455 analyzing data stored in storage 4470 or 4475. Further, the machine can receive inputs from a user via user interface components 4485 and execute appropriate functions, such as browsing functions by interpreting these inputs using processor 4455.

It can be appreciated that exemplary systems 4400 and 4450 can have more than one processor 4410 or be part of a group or cluster of computing devices networked together to provide greater processing capability.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
receiving, from a requester device, a file request to be distributed to a plurality of submitter devices associated with a corresponding plurality of submitters, the file request comprising file request information;
based on the file request information and prior to receiving electronic file submissions, generating, in response to receiving the file request, a target collection folder in a folder hierarchy within a content management system account associated with the requester device;
generating, for each submitter device of the plurality of submitter devices, a template file for the electronic file submissions;
storing the template file within the target collection folder;
storing, within the target collection folder, the electronic file submissions received in response to the file request;
providing, to the requester device, a graphical user interface comprising a submission summary that lists the electronic file submissions within a single user interface view without visually referencing the folder hierarchy, wherein the submission summary lists the electronic file submissions received in response to the file request and at least one additional file from an additional file request within the single user interface view, and wherein the at least one additional file is stored in a different target collection folder; and
after storing the electronic file submissions, deactivating the target collection folder to prevent further uploads of electronic files to the target collection folder.

2. The method of claim 1, further comprising providing, for display within the submission summary, a submitter name associated with a submitted file submission status indicator that shows the receipt of a file submission corresponding to the file request.

3. The method of claim 1, further comprising providing, for display within the submission summary, a submitter name associated with a submitted file submission status indicator that shows a lack of receipt of a file submission corresponding to the submitter name.

4. The method of claim 1, further comprising providing, for display within the submission summary, an option to filter a list of the plurality of submitters based on submission status corresponding to the file request.

5. The method of claim 1, further comprising:
providing, for display within the submission summary, a selectable action element associated with each of the electronic file submissions; and
providing, for display within the graphical user interface, a first electronic file submission based on receiving an indication of a user selection of a first selectable action element associated with the first electronic file submission.

6. The method of claim 1, wherein the file request information comprises at least one of a file request title, a user-composed message, a deadline for submission, or a file.

7. A system comprising:
at least one processor; and
at least one non-transitory computer readable storage medium storing instructions that, when executed by the at least one processor, cause the system to:
receive, from a requester device, a file request to be distributed to a plurality of submitter devices associated with a corresponding plurality of submitters, the file request comprising file request information;
based on the file request information and prior to receiving electronic file submissions, generate, in response to receiving the file request, a target collection folder in a folder hierarchy within a content management system account associated with the requester device;
generate, for each submitter device of the plurality of submitter devices, a template file for the electronic file submissions;
store the template file within the target collection folder;
store, within the target collection folder, the electronic file submissions received in response to the file request;
provide, to the requester device, a graphical user interface comprising a submission summary that lists the electronic file submissions within a single user interface view without visually referencing the folder hierarchy, wherein the submission summary lists the electronic file submissions received in response to the file request and at least one additional file from an additional file request within the single user interface view, and wherein the at least one additional file is stored in a different target collection folder; and
after storing the electronic file submissions, deactivate the target collection folder to prevent further uploads of electronic files to the target collection folder.

8. The system of claim 7, further comprising instructions that, when executed by the at least one processor, cause the system to filter the list of electronic file submissions within the submission summary based on a specified submitter.

9. The system of claim 7, further comprising instructions that, when executed by the at least one processor, cause the system to provide, based on receiving an indication of a navigation input, a file request homepage within the graphical user interface that comprises a submission status for multiple file requests.

10. The system of claim 9, wherein the submission status for each of the multiple file requests comprises at least one of a number of submissions to the file request, a number of late submissions to the file request, or a number of missing submissions to the file request.

11. The system of claim 7, further comprising instructions that, when executed by the at least one processor, cause the system to:
receive an indication of a user selection of a selectable element associated with a first electronic file submission from the list of electronic file submissions; and
provide, for display within the graphical user interface, the first electronic file submission.

12. The system of claim 7, further comprising instructions that, when executed by the at least one processor, cause the system to provide, for display within the submission summary, a submitter name associated with a submitted file submission status indicator that shows the receipt of a file submission corresponding to the file request.

13. A non-transitory computer-readable medium storing instructions that, when executed by at least one processor, cause a computing device to:
- receive, from a requester device, a file request to be distributed to a plurality of submitter devices associated with a corresponding plurality of submitters, the file request comprising file request information;
- based on the file request information and prior to receiving electronic file submissions, generate, in response to receiving the file request, a target collection folder in a folder hierarchy within a content management system account associated with the requester device;
- generate, for each submitter device of the plurality of submitter devices, a template file for the electronic file submissions;
- store the template file within the target collection folder;
- store, within the target collection folder, the electronic file submissions received in response to the file request;
- provide, to the requester device, a graphical user interface comprising a submission summary that lists the electronic file submissions within a single user interface view without visually referencing the folder hierarchy, wherein the submission summary lists the electronic file submissions received in response to the file request and at least one additional file from an additional file request within the single user interface view, and wherein the at least one additional file is stored in a different target collection folder; and
- after storing the electronic file submissions, deactivate the target collection folder to prevent further uploads of electronic files to the target collection folder.

14. The non-transitory computer-readable medium of claim 13, further comprising instructions that, when executed by the at least one processor, cause the computing device to provide, for display within the submission summary, a submitter name associated with a submitted file submission status indicator that shows the receipt of a file submission corresponding to the file request.

15. The non-transitory computer-readable medium of claim 13, further comprising instructions that, when executed by the at least one processor, cause the computing device to provide, for display within the submission summary, a submitter name associated with a submitted file submission status indicator that shows a lack of receipt of a file submission corresponding to the submitter name.

16. The non-transitory computer-readable medium of claim 13, further comprising instructions that, when executed by the at least one processor, cause the computing device to provide, for display within the submission summary, an option to filter a list of the plurality of submitters based on submission status corresponding to the file request.

17. The non-transitory computer-readable medium of claim 13, further comprising instructions that, when executed by the at least one processor, cause the computing device to:
- provide, for display within the submission summary, a selectable action element associated with each of the electronic file submissions; and
- provide, for display within the graphical user interface, a first electronic file submission based on receiving an indication of a user selection of a first selectable action element associated with the first electronic file submission.

18. The method of claim 1, further comprising rendering, within the single user interface view, a copy of a selected submission of the electronic file submissions.

19. The system of claim 7, further comprising instructions that, when executed by the at least one processor, cause the system to render, within the single user interface view, a copy of a selected submission of the electronic file submissions.

20. The non-transitory computer-readable medium of claim 13, further comprising instructions that, when executed by the at least one processor, cause the computing device to render, within the single user interface view, a copy of a selected submission of the electronic file submissions.

* * * * *